(12) United States Patent
Watanabe et al.

(10) Patent No.: US 7,505,104 B2
(45) Date of Patent: Mar. 17, 2009

(54) ANTIGLARE ANTIREFLECTIVE FILM, POLARIZING PLATE AND LIQUID CRYSTAL DISPLAY

(75) Inventors: Jun Watanabe, Minami-Ashigara (JP); Shinya Kato, Minami-Ashigara (JP)

(73) Assignee: FUJIFILM CORPORATION, Minato-Ku, Tokyo (JP)

(*) Notice: Subject to any disclaimer, the term of this patent is extended or adjusted under 35 U.S.C. 154(b) by 301 days.

(21) Appl. No.: 11/520,641

(22) Filed: Sep. 14, 2006

(65) Prior Publication Data

US 2007/0121211 A1 May 31, 2007

(30) Foreign Application Priority Data

Sep. 16, 2005 (JP) .............................. 2005-269877

(51) Int. Cl.
 *G02F 1/1335* (2006.01)
(52) U.S. Cl. ..................... 349/137; 349/112; 359/599; 359/601; 359/614
(58) Field of Classification Search .................. 349/137
See application file for complete search history.

(56) References Cited

U.S. PATENT DOCUMENTS

2006/0132922 A1* 6/2006 Takao et al. .................. 359/601
2007/0236631 A1* 10/2007 Ohtani et al. .................. 349/96

FOREIGN PATENT DOCUMENTS

| JP | 2003-107205 A | 4/2003 |
| JP | 3507719 A | 12/2003 |
| JP | 2005-92197 A | 4/2005 |

\* cited by examiner

*Primary Examiner*—Frank G Font
*Assistant Examiner*—Mary A El Shammaa
(74) *Attorney, Agent, or Firm*—Buchanan Ingersoll & Rooney PC

(57) ABSTRACT

An antiglare antireflective film is provided and includes: a transparent substrate; and at least one layer. The antiglare antireflective film having a surface having asperities in which: 15% to 70% of the total asperities are asperities, each having a tilt angle of 1° or below, which a line normal to each asperity profile form with a line normal to the transparent substrate; and at most 3% of the total asperities are asperities, each having the tilt angle of 10° or above.

17 Claims, 7 Drawing Sheets

ANTIGLARE ANTIREFLECTIVE FILM, POLARIZING PLATE AND LIQUID CRYSTAL DISPLAY

BACKGROUND OF THE INVENTION

1. Field of the Invention

The present invention relates to an antiglare antireflective film, and to a polarizing plate and a liquid crystal display each using such a film.

2. Description of Related Art

Antiglare films can be broadly divided into two groups: antiglare films having a surface scattering quality in a substantial sense and those having both surface scattering and internal scattering qualities. In a display, such as CRT, a plasma display panel (PDP), an electroluminescent display (ELD) and a liquid crystal display (LCD), an antiglare film is generally placed at the topmost surface of the display for the purpose of avoiding formation of reflected images by reflection of extraneous light.

With the recent trend moving notably toward higher-definition displays, the arts of antiglare films having internal scattering quality higher than usual in addition to surface scattering quality are disclosed in Japanese Patent No. 3507719 as measures to improve minute unevenness in brightness (referred to as "glare").

On the other hand, the art of scattering film which improves viewing angle characteristics of LCDs by not having surface scattering quality but having internal scattering quality alone is disclosed. In addition, it is known that films having both light scattering quality and an antireflective function in having effect on inhibition of surface reflection of extraneous light in a bright room are favorable when light scattering films are used at the topmost surfaces of displays.

Recent years have seen fast growth in the market of applications for viewing of big-screen displays, notably liquid crystal TV sets, from relatively distant positions. In such applications, the glare problem is relieved because the pixel size becomes larger as far as the definition is the same, and besides, the distances from viewers to displays become greater. Although the antiglare films having high internal scattering quality, which have been widely used as antiglare measures, have been used in those applications also, the high internal scattering quality causes a problem of lowering the resolutions of images (referred to as image blur), so the use of antiglare films is not always suitable for those applications.

For avoiding formation of reflected images by reflection of extraneous light, it is common to take a measure that the film surface is rendered uneven to blur the outlines of reflected images. By this measure, visibility from the direction of regular reflection of extraneous light is improved. When viewed from directions other than that of the regular reflection, however, black images take on whitish looks (referred to as white blur) because the diffraction of scattered light occurs in those directions. As attack on this problem, attempts to optimize the surface roughness and tilt angles at the film surface have been made. However, certain of those attempts (JP-A-2002-23870 and JP-A-2003-107205) are insufficient for performance improvements in all directions, and raise issues of productivity and cost.

For total performance improvement of a display unit, it is extremely important to optimize properties of an antiglare antireflective film after considering the viewing angle dependence of the display itself, such as a liquid crystal display.

As mentioned above, it is the present situation that any antiglare antireflective film having satisfying antiglare quality and ensuring satisfactory improvements in image blur and white blur at the same time is not proposed.

SUMMARY OF THE INVENTION

An object of an illustrative, non-limiting embodiment of the invention is to provide an antiglare antireflective film in which high antiglare quality and improvements in image blur and white blur are compatible with each other and a polarizing plate using such an antiglare antireflective film in high productivity.

A another object of an illustrative, non-limiting embodiment of the invention is to provide a high-definition liquid crystal display delivering consistent display performance without susceptibility to ambient brightness.

As a result of our intensive study, it has been found that the objects can be attained by giving aspects as described below to the subjects of our study, thereby achieving the invention.

In other words, the invention can attain its objects by exemplary embodiments as described below.

(1) An antiglare antireflective film comprising: a transparent substrate; and at least one layer, the antiglare antireflective film having a surface having asperities, wherein 15% to 70% of the total asperities are asperities, each having a tilt angle of 1° or below, which a line normal to each asperity profile form with a line normal to the transparent substrate; and at most 3% of the total asperities are asperities, each having the tilt angle of 10° or above.

(2) An antiglare antireflective film as described in (1), wherein when a frequency distribution of the tilt angle is plotted at intervals of 0.1°, the frequency distribution with respect to the tilt angle has an absolute value of a greatest slope of 0.1/degree or below.

(3) An antiglare antireflective film as described in (1) or (2), wherein when a frequency distribution of the tilt angles is plotted at intervals of 0.1°, the frequency distribution has a maximum frequency peak between 0.3° and 2.0° of the tilt angle.

(4) An antiglare antireflective film as described in any of (1) to (3), wherein a haze value attributable to scattering inside the antiglare antireflective film is from 0 to 35%, and a haze value attributable to scattering from the surface of the antiglare antireflective film is from 2 to 15%.

(5) An antiglare antireflective film as described in any of (1) to (4), which has a center-line-average surface roughness Ra of 0.08 to 0.30 μm.

(6) An antiglare antireflective film as described in any of (1) to (5), which has a transmission image definition, which conforms to JIS K7105-1981 (corresponding to ISO/TC61 DP7383), of 5% to 30% when measured under an optical comb width of 0.5 mm.

(7) An antiglare antireflective film as described in any of (1) to (6), wherein the at least one layer comprises an antiglare layer, the antiglare layer comprising a translucent resin and translucent particles.

(8) wherein the translucent resin has at least one of acrylate and methacrylate monomers with trifunctionality or more as a main repeating unit, and the translucent particles are particles of a cross-linked copolymer having an acrylic content of 50 to 100 mass % (weight %).

(9) An antiglare antireflective film as described in (7), wherein the translucent resin has at least one of acrylate and methacrylate monomers with trifunctionality or more as a main repeating unit, and the translucent particles are particles of a cross-linked acrylic-styrene copolymer having an acrylic content of 50 to less than 100 mass %.

(10) A polarizing plate comprising: a polarizer; and two protective films, the polarizer being between the two protective films, wherein at least one of the two protective films is an antiglare antireflective film as described in any of (1) to (9).

(11) A polarizing plate as described in (10), wherein at least one of the two protective films is an optical compensation film comprising an optically anisotropic layer.

(12) A polarizing plate as described in (10) or (11), wherein one of the two protective films is the antiglare antireflective film, and the other of the two protective films is an optical compensation film comprising an optically anisotropic layer in which orientation of a liquid crystalline compound is fixed.

(13) A polarizing plate as described in any of (10) to (12), wherein one of the two protective films is the antiglare antireflective film, and the other of the two protective films is an optical compensation film comprising an optically anisotropic layer on a side opposite to the polarizer, the optically anisotropic layer containing a compound having a discotic structural unit.

(14) A stacked polarizing plate comprising: an optical compensation film and a polarizing plate which are bonded together via a adhesive layer, wherein the polarizing plate is a polarizing plate as described in any of (10) to (13).

(15) A liquid crystal display comprising at least one polarizing plate as described in any of (10) to (14).

(16) A liquid crystal display comprising a polarizing plate, a liquid crystal cell for display and a backlight, a maximum brightness of 300 cd/m$^2$ or above and a darkroom contrast ratios of: 500 or above in white and black displays in a normal direction to the liquid crystal cell; 150 or above at an angle from 0° to 30° with respect to the normal direction; and 15 or above at an angle from 0° to 60° with respect to the normal direction., wherein the polarizing plate is a polarizing plate as described in any of (10) to (14) and placed at a viewer-side outermost surface of the liquid crystal display.

(17) A liquid crystal display as described in (15) or (16), having a display screen measuring 20 inches or above in diagonal.

BRIEF DESCRIPTION OF THE DRAWINGS

The features of the invention will appear more fully upon consideration of the exemplary embodiments of the invention, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, it is possible to provide an antiglare antireflective film having high antiglare quality and ensuring improvements in image blur and white blur at the same time, and to provide a polarizing plate and a liquid crystal display each using the antiglare antireflective film.

Exemplary embodiments of the invention are described below in detail. When numerical values represent physical properties or characteristic values in this specification, the term "(meth)acrylate" as used in this specification is intended to include at least either of acrylate and methacrylate. So is the term "(meth)acrylic acid".

0. Tilt Angle Distribution of Asperities on Film Surface

An antiglare antireflective film according to an exemplary embodiment has microscopic asperities at least on the surface, and its antiglare power is demonstrated by dispersing reflected images through light scattering and blurring away their outlines. In the invention, the tilt angles and proportions thereof are determined by the following methods.

First of all, vertexes of a triangle having an area of 0.5 to 2 square micrometers are supposed on a transparent substrate, and normal lines are extended vertically and upwardly from the vertexes (three lines normal to the substrate). A triangle is formed by connecting three points at which these three lines normal to the substrate intersect with the film surface. Then, an angle between a line normal to the triangle thus-formed and a normal line extended vertically and upwardly from the substrate surface is defined as a tilt angle.

The proportion of tilt angles are determined by the following method. An area of at least 250,000 square micrometers (0.25 square millimeters) on the substrate is divided into the above-mentioned triangles and the tilt angle measurement is made on every triangle. The proportion of measuring points of a tilt angle to all the measuring points is determined, and this proportion is defined as the proportion of the tilt angle. In the invention, the proportion of the tilt angle of 1° or below and the proportion of the tilt angle of 10° or above are determined.

Figure 1A:
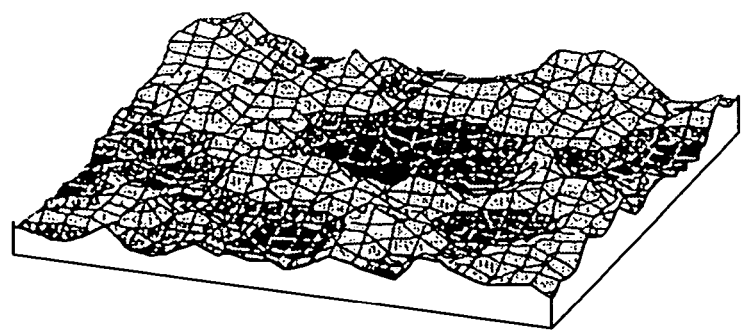
FIGS. 1A to 1C are schematic diagrams showing a method of measuring viewing angles of a film according to an exemplary embodiment of the invention.
Figure 1B:
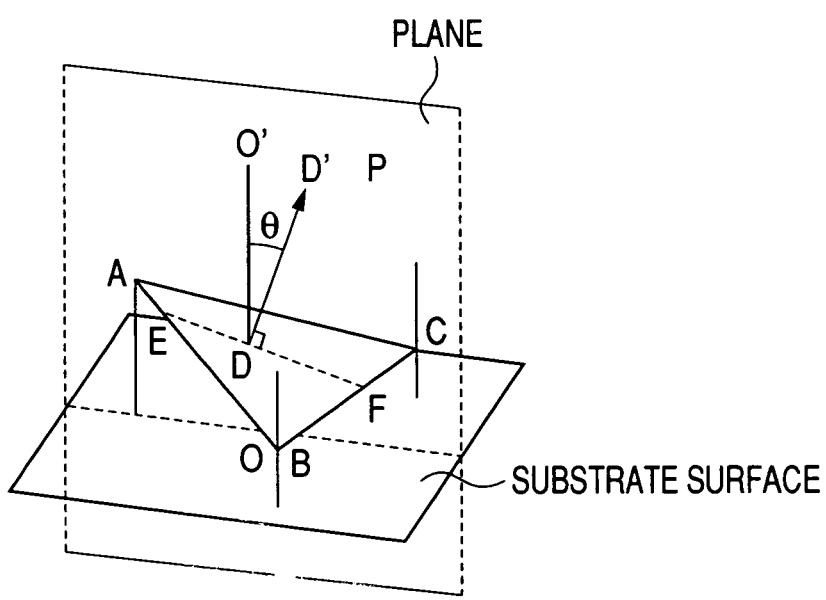
Figure 1C:
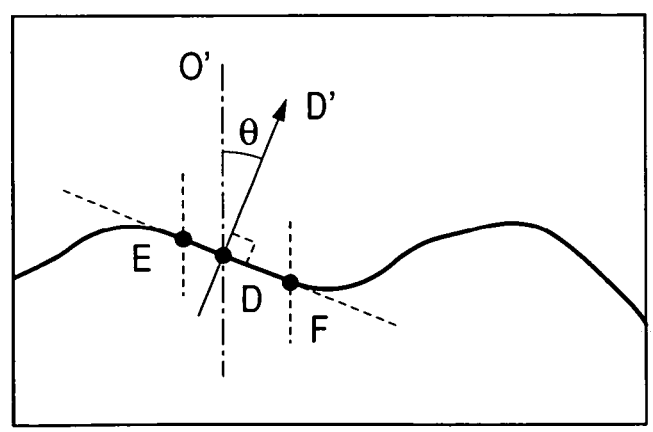

The method of measuring the tilt angle is described below in more detail. As shown in FIG. 1A, the substrate surface of the measurement sample is partitioned into meshes having areas of 0.5 to 2 square micrometers. FIG. 1B is a diagram showing three points of one triangle constituting a partitioned mesh. From these three points on the substrate, normal lines are extended vertically and upwardly. Three points at which these normal lines intersect with the film surface are indicated by letters A, B and C. The angle θ which the normal line DD' to the plane of the triangle ABC forms with the normal line DO' extending vertically and upwardly from the substrate is defined as the tilt angle. FIG. 1C is a cross-sectional diagram of the film cut through at the plane P in which the points O', D and D' lie. The segment EF is an intersection line of the triangle ABC and the plane P.

In the invention, the suitable area to be measured on the substrate is preferably at least 250,000 square micrometers (0.25 square millimeters), more preferably from 0.25 square millimeters to 1.0 square millimeters in view of measurement accuracy and measurement efficiency. The area of the triangle as a measurement unit is preferably from 0.5 to 2 square micrometers in view of assuring measurement accuracy.

There are several devices usable for these measurements. In the invention, Model SXM520-AS150 made by Micromap Corporation (USA) is preferably used. This device includes: a halogen lamp in which an interference filter having the central wavelength of 560 nm is incorporated; and an object lens having a power of 2.5× to 50×. Capturing data is performed with a ⅔ inch CCD having pixels of 640×480, which is a standard equipment of the device. When the object lens has a power of 10×, the measurement unit for the tilt angle is set to 0.8 square micrometers and the area to be measured is set to 500,000 square micrometers (0.5 square millimeters). Potentially, by increasing the power of the objective lens, the measurement unit and the area to be measured can be increased.

Data obtained from those measurements is analyzed by use of a software program, such as MAT-LAB made by Math Works, Inc. (USA), and the distribution of tilt angles can be calculated.

The results of tilt angle measurements made on such a specified area are assumed to be results regarding tilt angles on the whole film surface. Thus the proportion of tilt angles of 1° or below and the proportion of tilt angles of 10° or above can be determined with ease. In the invention, an interval between the tilt angles is preferably set to a degree as much as 0.01°.

The invention requires that the proportion of tilt angles of 1° or below be from 15% to 70% and the proportion of tilt angles of 10° or above be 3% or below. In the invention, the proportion of tilt angles of 1° or below is preferably from 30% to 70%, far preferably from 40% to 60%, and the proportion of tilt angles of 10° or above is preferably 2% or below, far preferably 1% or below. In the invention, the most preferred case is that the proportion of tilt angles of 1° or below is from 40% to 60% and the proportion of tilt angles of 10° or above is 2% or below. By adjusting the proportions of tilt angles as specified above, the film can satisfy the requirements for antiglare quality and improvements in image blur and white blur at a time.

Figure 2:
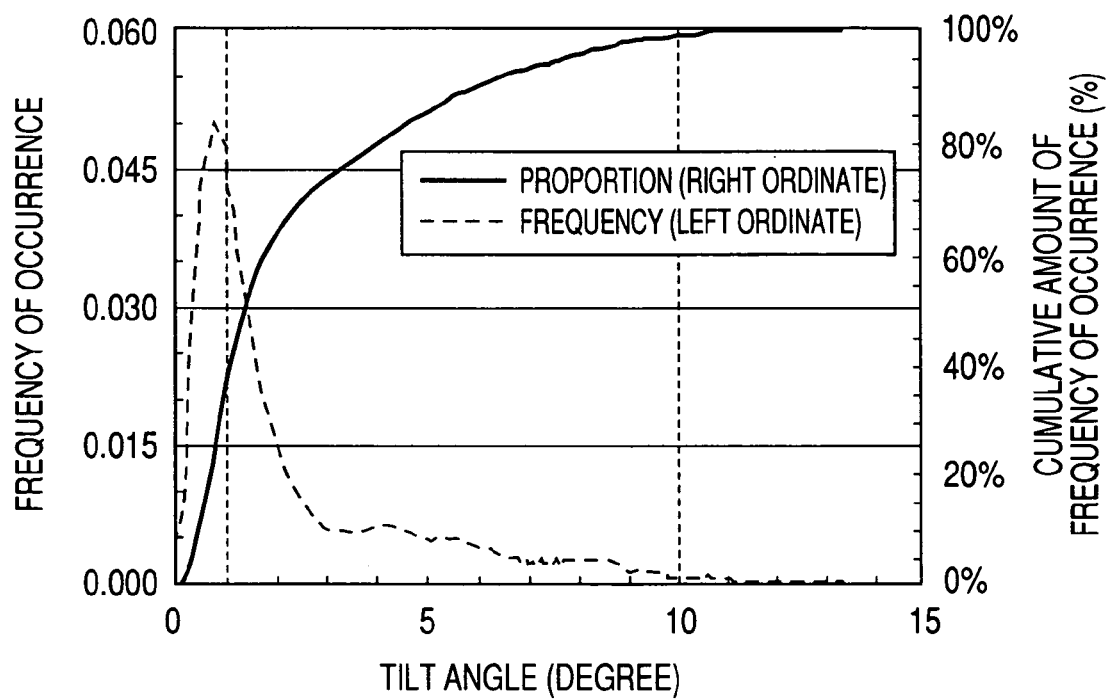
FIG. 2 is a graph showing an example of tilt angle distribution of a film.

The present antiglare antireflective film can aim to appropriately blur reflected images formed by extraneous light and thereby to render them invisible in a substantial sense. Therefore, it is undesirable that changes in viewing angle cause abrupt variations in reflection intensity. In other words, it is preferable that variations in tilt angle distribution on the surface are small. Specifically, as shown in FIG. 2, it is appropriate that, when a frequency distribution of the tilt angles is plotted by counting the measured tilt angles at intervals of 0.1°, the greatest slope of the frequency distribution vs. tilt angle plot be 0.1/degree or below in absolute-value terms, preferably 0.07/degree or below in absolute-value terms. Incidentally, the ordinate in FIG. 2 is the frequency of occurrence when the total number of points at which tilt angles are measured is taken as 1.

It is one of importance things to the present antiglare antireflective film that reflected light is not scattered at needlessly wide angles but diffused moderately within an angular range excepting the angle of regular reflection. Accordingly, it is appropriate that the maximum frequency peak in FIG. 2 lies in an angle range between the tilt angles of 0.3° and 2.0°, preferably from 0.5° to 1.5°. From the viewpoint of avoiding immediate change in reflection intensity, the maximum frequency in FIG. 2 is preferably 0.1 or below. Although the tilt angle distribution may have a plurality of maxima, such a distribution is not preferable as a surface profile of the present film. Examples of a method usable for achieving the tilt angles and their distribution as specified by the invention include a method of providing on a substrate a layer of translucent resin matrix in which fine particles are dispersed, and a method of providing a layer made up of a plurality of polymeric materials which are incompatible with one another and develop Benard cells at the time of drying the resin solution applied.

1. Constituents of the Invention

First, various kinds of compounds usable in the present film are described.

1-(1) Binder

The present film can be formed by cross-linking reaction or polymerization reaction of an ionizing radiation-curable compound. More specifically, the film can be formed by coating on a transparent substrate a coating composition containing an ionizing radiation-curable multifunctional monomer or oligomer as a binder (curable composition), and making the multifunctional monomer or oligomer undergo cross-linking reaction or polymerization.

As functional groups of the ionizing radiation-curable multifunctional monomer or oligomer, groups causing polymerization when exposed to light, electron beams or radiation are suitable. Of these groups, photo-polymerizable functional groups are preferred over the others.

Examples of a photo-polymerizable functional group include unsaturated polymerizable functional groups, such as a (meth)acryloyl group, a vinyl group, a styryl group and an allyl group. Of these groups, a (meth)acryloyl group is preferred over the others.

Examples of a photo-polymerizable multifunctional monomers having photo-polymerizable functional groups include neopentyl glycol acrylate, 1,6-hexanediol(meth)acrylate and (meth)acrylic acid diesters of alkylene glycols, such as propylene glycol di(meth)acrylate;

(meth)acrylic acid diesters of polyoxyalkylene glycols, such as triethylene glycol di(meth)acrylate, dipropylene glycol di(meth)acrylate, polyethylene glycol di(meth)acrylate and polypropylene glycol di(meth)acrylate;

(meth)acrylic acid diesters of polyhydric alcohols, such as pentaerythritol di(meth)acrylate; and (meth)acrylic acid diesters of ethylene oxide or propylene oxide adducts, such as 2,2-bis{4-(acryloxy-diethoxy)phenyl}propane and 2,2-bis{4-(acryloxy-polypropoxy)phenyl}propane.

Further, (meth)acrylates, urethane(meth)acrylates and polyester(meth)acrylates are also used suitably as photo-polymerizable multifunctional monomers.

Of those monomers, esters of polyhydric alcohols and (meth)acrylate are preferred, and polyfunctional monomers having 3 or more (meth)acryloyl groups per molecule are preferred by far. Examples of such monomers include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate and tripentaerythritol hexatriacrylate. In this specification, "(meth)acrylate", "(meth)acrylic acid" and "(meth)acryloyl" stand for "acrylate or methacrylate", "acrylic acid or methacrylic acid" and "acryloyl or methacryloyl", respectively.

As to the monomeric binder, monomers of different refractive indices can be used in order to control each layer's refractive index. Examples of a monomer of a high refractive index in particular include bis(4-methacryloylthiophenyl) sulfide, vinylnaphthalene, vinyl phenyl sulfide and 4-methacryloxyphenyl-4'-methoxyphenyl thioether.

In addition, the dendrimers disclosed in JP-A-2005-76005 and JP-A-2005-36105, and the norbornene ring-containing monomers as disclosed in JP-A-2005-60425 can also be used.

Multifunctional monomers may be used as combinations of two or more thereof.

Polymerization of those monomers having ethylenic unsaturated groups can be performed by irradiation with ionizing radiation or by heating in the presence of a photo radical initiator or a thermal radical initiator, respectively.

For polymerization reaction of photo-polymerizable multifunctional monomers, it is preferable to use a photopolymerization initiator. As to the photopolymerization initiator, a radical photopolymerization initiator and a cationic photopolymerization initiator are suitable, and the former is preferable by far.

1-(2) Polymeric Binder

As a binder for the present film, a polymer or a cross-linked polymer is usable. It is advantageous for the cross-linked polymer to have anionic groups. The cross-linked polymer having anionic groups has a structure that cross-links are formed between principal chains of its molecules.

Examples of the principal chain of such a polymer include polyolefin (saturated hydrocarbon), polyether, polyurea, polyurethane, polyester, polyamine, polyamide and melamine resin. Of these principal chains, polyolefin, polyether and polyurea are preferred, polyolefin and polyether are far preferred, and polyolefin is especially preferred.

The polyolefin principal chain includes a saturated hydrocarbon, and can be prepared, e.g., by addition polymerization reaction of unsaturated polymerizable groups. The polyether principal chain includes ether linkages (—O—) which bind repeating units together, and can be prepared, e.g., by ring-opening polymerization reaction of epoxy groups. The polyurea principal chain include urea linkages (—NH—CO—NH—) which bind repeating units together, and can be prepared, e.g., by polycondensation reaction of isocyanate groups with amino groups. The polyurethane principal chain includes urethane linkages (—NH—CO—O—) which bind repeating units together, and can be prepared, e.g., by polycondensation reaction of isocyanate groups with hydroxyl groups (including N-methylol groups). The polyester principal chain includes ester linkages (—CO—O—) which bind repeating units together, and can be prepared, e.g., by polycondensation reaction of carboxyl groups (including acid halide groups) with hydroxyl groups (including N-methylol groups). The polyamine principal chain includes imino linkages (—NH—) which bind repeating units together, and can be prepared by ring-opening polymerization reaction of ethyleneimine groups. The polyamide principal chain include amide linkages (—NH—CO—) which bind repeating units together, and can be prepared, e.g., by reaction of isocyanate groups with carboxyl groups (including acid halide groups). The melamine resin principal chain can be prepared, e.g., by polycondensation reaction of triazine groups (e.g., melamine) with aldehyde (e.g., formaldehyde). Incidentally, melamine resin has a cross-linked structure in its principal chain itself.

The anionic groups are bound directly to the principal chain of a polymer, or they are bond to the principal chain via linkage groups. It is preferable that the anionic groups are bound as side chains to the principal chain via linkage groups.

As the anionic groups, carboxylic acid groups (carboxyl), sulfonic acid groups (sulfo) and phosphoric acid groups (phosphono) are usable. Of these groups, sulfo and phosphono groups are preferred.

The anionic groups may be in a sate that they form salts. Cations forming salts together with the anionic groups are preferably alkali metal ions. In addition, protons of the anionic groups may be in a dissociated state.

The linkage groups binding anionic groups to the principal chain of a polymer are preferably divalent groups chosen from —CO—, —O—, alkylene groups, arylene groups or combinations of two or more of these groups.

The cross-linked structure is made up of two or more principal chains which are chemically (preferably covalently) linked together, and therein it is preferable that three or more principal chains are covalently bound together. The suitable cross-linkages present in such a structure include divalent or higher groups selected from —CO—, —O—, —S—, a nitrogen atom, a phosphorus atom, aliphatic residues, aromatic residues or combinations of two or more of the above-recited ones.

The cross-linked polymer having anionic groups is preferably a copolymer made up of repeating units having anionic groups and repeating units having cross-linked structures. The proportion of anionic group-containing repeating units in the copolymer is preferably from 2 to 96 mass %, far preferably from 4 to 94 mass %, particularly preferably from 6 to 92 mass %. Each of these repeating units may contain two or more anionic groups. The proportion of repeating units having cross-linked structures in the copolymer is preferably from 4 to 98 mass %, far preferably from 6 to 96 mass %, particularly preferably from 8 to 94 mass %.

The cross-linked polymer having anionic groups may contain both an anionic group and a cross-linked structure in each of its repeating units. Further, it may have other repeating units (repeating units having neither anionic groups nor cross-linked structures).

As the other repeating units, repeating units having amino or quaternary ammonium groups and repeating units having benzene rings are suitable. Likewise anionic groups, both amino group and quaternary ammonium group have the function of keeping inorganic particles in a dispersed state. Incidentally, an amino group, a quaternary ammonium group and a benzene ring can produce a similar effect even when each of them is contained in a repeating unit having an anionic group or in a repeating unit having a cross-linked structure. In the repeating unit having an amino group or a quaternary ammonium group, the amino group or the quaternary ammonium group is directly bound to the principal chain of a polymer, or it is bound to the principal chain via a linkage group. It is preferable to bind the amino or quaternary ammonium group as a side chain to the principal chain via a linkage group. The amino group or the quaternary ammonium group is preferably a secondary amino group, a tertiary amino group or a quaternary ammonium group, and far preferably a tertiary amino group or a quaternary ammonium group. The group or groups attached to the nitrogen atom of a secondary amino group, a tertiary amino group or a quaternary ammonium group are preferably alkyl groups, far preferably 1-12C alkyl groups, further preferably 1-6C alkyl groups. The counter ion of a quaternary ammonium group is preferably a halide ion. The linkage group linking an amino group or a quaternary ammonium group to the principal chain of a polymer is preferably a divalent group selected from —CO—, —NH—, —O—, alkylene groups, arylene groups or combinations of two or more of these groups. When the cross-linked polymer having anionic groups contains repeating units having amino or quaternary ammonium groups, the proportion of such repeating units is preferably from 0.06 to 32 mass %, far preferably from 0.08 to 30 mass %, particularly preferably from 0.1 to 28 mass %.

Examples of a structural unit mainly used for giving cross-linking reactivity include units represented by the following (A), (B) and (C).

(A): A structural unit obtained by polymerizing a monomer in which a self-cross-linkable functional group is introduced in advance, such as glycidyl(meth)acrylate or glycidyl vinyl ether.

(B): A structural unit obtained by polymerizing a monomer having a carboxyl group, a hydroxyl group, an amino group or a sulfo group (e.g., (meth)acrylic acid, methylol(meth)acrylate, hydroxyalkyl(meth)acrylate, allyl acrylate, hydroxyethyl vinyl ether, hydroxybutyl vinyl ether, maleic acid, crotonic acid).

(C): A structural unit obtained by allowing a compound having not only a group capable of reacting with the functional group included in (A) or (B) but also a cross-linkable functional group to react with the structural unit (A) or (B) (e.g., a structural unit synthesized using a technique of acting acrylic acid chloride on a hydroxyl group).

In the structural unit (C), it is preferable that the cross-linkable functional group is a photopolymerizable group. Examples of a photopolymerizable group include a (meth)acryloyl group, an alkenyl group, a cinnamoyl group, a cinnamylideneacetyl group, a benzalacetophenone group, a styrylpyridine group, an α-phenylmaleimido group, a phenylazido group, a sulfonylazido group, a carbonylazido group, a diazo group, an o-quinonediazido group, a furylacryloyl group, a coumarin group, a pyrone group, an anthracene group, a benzophenone group, a stilbene group, a dithiocarbamate group, a xanthate group, a 1,2,3-thiadiazole group, a cyclopropene group and an azadioxabicyclo group. Only one or two or more of these groups may be contained in the compound. Of these groups, the preferred are (meth)acryloyl and cinnamoyl, and the especially preferred is (meth)acryloyl.

Examples of a concrete method for preparing a copolymer having photopolymerizable groups include the following methods a to d, but the methods usable in the invention should not be construed as being limited to the following.

a. A method of performing esterification by allowing (meth)acrylic acid chloride to react with a copolymer containing hydroxyl groups as well as cross-linkable functional groups.

b. A method of performing urethanation by allowing a (meth)acrylic acid ester containing an isocyanate group to react with a copolymer containing hydroxyl groups as well as cross-linkable functional groups.

c. A method of performing esterification by allowing (meth)acrylic acid to react with a copolymer containing epoxy groups as well as cross-linkable functional groups.

d. A method of performing esterification by allowing (meth)acrylic acid ester containing an epoxy group to react with a copolymer containing carboxyl groups as well as cross-linkable functional groups.

Incidentally, the amount of photopolymerizable groups introduced can be controlled arbitrarily, and it is also advantageous for the carboxyl or hydroxyl groups to be left in a certain amount from the viewpoints of stability of coating surface condition, reduction of surface faults in the presence of inorganic particles, and film strength enhancement.

1-(3) Fluorine-containing Polymeric Binder

Of polymeric binders, fluorine-containing copolymer compounds can be preferably used in the invention, especially in a layer with a low refractive index.

Examples of a fluorine-containing vinyl monomer include fluoroolefins (e.g., fluoroethylene, vinylidene fluoride, tetrafluoroethylene, hexafluoropropylene), partially or wholly fluorinated alkyl ester derivatives of (meth)acrylic acid (e.g., Biscoat 6FM, trade name, a product of Osaka Organic Chemical Industry Ltd., and R-2020, trade name, a product of Daikin Industries, Ltd.), and wholly or partially fluorinated vinyl ethers. Of these monomers, perfluoroolefins are preferred over the others, and hexafluoropropylene is especially favorable in terms of refractive index, solubility, transparency and availability. Although the refractive index can be lowered by raising the fraction of such a fluorine-containing vinyl monomer, film strength is lowered, too. In the invention, therefore, it is appropriate that fluorine-containing monomers be introduced so that the fluorine content in the copolymer falls within the range of 20 to 60 mass %, preferably 25 to 55 mass %, particularly preferably 30 to 50 mass %.

From the viewpoints of adhesion to a substrate, polymer's Tg (contributing to film strength), solubility in solvents, transparency, slippability, dust resistance and soil resistance, copolymers usable in the invention can contain as comonomers other vinyl monomers in appropriate fractions in addition to repeating units derived from the fluorine-containing vinyl monomers as recited above and repeating units having (meth)acryloyl groups in side chains. A plurality of vinyl monomers combined according to the purpose intended may be introduced into such copolymers each, and the total proportion of combined vinyl monomers in each copolymer is preferably from 0 to 65 mole %, far preferably from 0 to 40 mole %, particularly preferably from 0 to 30 mole %.

The vinyl monomer units usable in combination have no particular restrictions, but examples thereof can include olefins (e.g., ethylene, propylene, isoprene, vinyl chloride, vinylidene chloride), acrylic acid esters (e.g., methyl acrylate, ethyl acrylate, 2-ethylhexyl acrylate, 2-hydroxyethyl acrylate), methacrylic acid esters (e.g., methyl methacrylate, ethyl methacrylate, butyl methacrylate, 2-hydroxyethyl methacrylate), styrene derivatives (e.g., styrene, p-hydroxymethylstyrene, p-methoxystyrene), vinyl ethers (e.g., methyl vinyl ether, ethyl vinyl ether, cyclohexyl vinyl ether, hydroxyethyl vinyl ether, hydroxybutyl vinyl ether), vinyl esters (e.g., vinyl acetate, vinyl propionate, vinyl cinnamate), unsaturated carboxylic acids (e.g., acrylic acid, methacrylic acid, crotonic acid, maleic acid, itaconic acid), acrylamides (e.g., N,N-dimethylacrylamide, N-tert-butylacrylamide, N-cyclohexylacrylamide), methacrylamides (e.g., N,N-dimethylmethacrylamide), and acrylonitrile.

Fluorine-containing polymers especially useful in the invention are random copolymers of perfluoroolefins and vinyl ethers or vinyl esters. And it is preferable that these copolymers have groups capable of causing cross-linking reaction by themselves (e.g., radical-reactive groups such as (meth)acryloyl group, ring opening-polymerizable groups such as epoxy group and oxetanyl group). It is preferable that the monomer units having groups causative cross-linking reaction make up 5 to 70 mol %, especially 30 to 60 mol %, of the total monomer units in such copolymers each. Suitable examples of such copolymers include those disclosed in JP-A-2002-243907, JP-A-2002-372601, JP-A-2003-26732, JP-A-2003-222702, JP-A-2003-294911, JP-A-2003-329804, JP-A-2004-4444 and JP-A-2004-45462.

For the purpose of contributing soil resistance to fluorine-containing polymers used in the invention, it is appropriate that polysiloxane structures be introduced into the polymers. No particular restriction is placed on the method of introducing polysiloxane structures, but the methods suitably adopted are the method of introducing polysiloxane as a block copolymer constituent by use of a silicone macroazo initiator as disclosed in JP-A-6-93100, JP-A-11-189621, JP-A-11-228631 or JP-A-2000-313709, and the method of introducing polysiloxane as a graft copolymer constituent by use of a silicone macromer as disclosed in JP-A-2-251555 or JP-A-2-308806. Examples of a compound used to particular advantage include the polymers disclosed in Examples 1, 2 and 3 of JP-A-11-189621 and the copolymers A-2 and A-3 disclosed in JP-A-2-251555. It is preferable that the proportions of polysiloxane constituents in those polymers is from 0.5 to 10 mass %, especially from 1 to 5 mass %.

The molecular weight of a polymer suitably used in the invention is preferably 5,000 or above, far preferably from 10,000 to 500,000, particularly preferably from 15,000 to 200,000, in mass-average terms. By using polymers having different average molecular weights in combination, it also becomes possible to improve coating surface conditions and scratch resistance.

In combination with the foregoing polymers, curing agents having polymerizable unsaturated groups as disclosed in JP-A-10-25388 and JP-A-2000-17028 may be used as appropriate. In addition, it is also preferable to use the foregoing polymers in combination with the compounds having fluorine-containing multifunctional polymerizable unsaturated groups as disclosed in JP-A-2002-14592. Examples of a compound having a multifunctional polymerizable unsaturated group include the multifunctional monomers recited hereinbefore. These compounds are favorable because they can produce great effect on improvement in scratch resistance, particularly when used in combination with polymers having polymerizable unsaturated groups in their main bodies.

1-(4) Organosilane Compound

In point of scratch resistance, it is preferable that hydrolysis products of an organosilane compound and/or partial condensation products thereof (the reaction solution obtained is also referred to as "sol component", hereinafter) are incorporated in the present film.

This sol component can function as a binder by forming a cured matter through condensation in drying and heating processes after application of the curable composition as mentioned above. When the curable composition contains a polyfunctional acrylate polymer, a binder having a three-dimensional structure is formed by irradiation with actinic rays.

As the organosilane compounds, those represented by the following formula (A) are suitable:

Formula (A)

In the above formula (A), $R^{10}$ represents a substituted or unsubstituted alkyl group, or a substituted or unsubstituted aryl group. Examples of such an alkyl group include methyl, ethyl, propyl, isopropyl, hexyl, decyl and hexadecyl. Of the alkyl groups, those containing 1 to 30 carbon atoms are preferred, those containing 1 to 16 carbon atoms are far preferred, and those containing 1 to 6 carbon atoms are especially preferred. Examples of such an aryl group include phenyl and naphthyl groups, and phenyl groups are preferable.

X represents a hydroxyl group or a group capable of undergoing hydrolysis, including an alkoxy group (preferably containing 1 to 5 carbon atoms, such as a methoxy or ethoxy group), a halogen atom and a group represented by $R^2COO$ (wherein $R^2$ is preferably a hydrogen atom or a 1-5C alkyl group), such as $CH_3COO$ or $C_2H_5COO$. Of these groups, an alkoxy group, especially a methoxy or ethoxy group, is preferred over the others.

m represents an integer of 1 to 3, preferably 1 or 2, particularly preferably 1.

When a plurality of $R^{10}$s or a plurality of Xs are present, $R^{10}$s or Xs may be the same or different.

The substituent which can be contained in $R^{10}$ has no particular restriction, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, t-butyl), an aryl group (e.g., phenyl, naphthyl), an aromatic heterocyclic group (e.g., furyl, pyrazolyl, pyridyl), an alkoxyl group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents may further be substituted.

When a plurality of $R^{10}$s are present, it is preferable that at least one of them is a substituted alkyl group or a substituted aryl group.

Of the organosilane compounds represented by formula (A), organosilane compounds having vinyl-polymerizable substituents as represented by the following formula (B) are preferred:

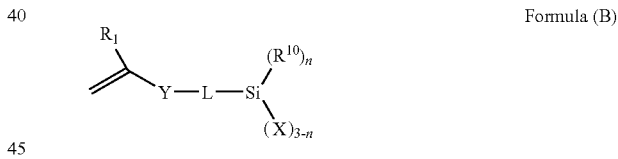

Formula (B)

In formula (B), $R^1$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. As the $R^1$, a hydrogen atom, a methyl group, a methoxy group, a methoxycarbonyl group, a cyano group, a fluorine atom or a chlorine atom is suitable, a hydrogen atom, a methyl group, a methoxycarbonyl group, a fluorine atom or a chlorine atom is more suitable, and a hydrogen atom or a methyl group is especially suitable.

Y represents a single bond, *—COO—**, *—CONH—** or *—O—**, preferably a single bond, *—COO—** or *—CONH—**, far preferably a single bond or *—COO—**, particularly preferably *—COO—**. Herein, * stands for the site at which Y is bound to =C(R1)-, and ** stands for the site at which Y is bound to L.

L represents a divalent linkage group. Examples of such a divalent linkage group include a substituted or unsubstituted alkylene group, a substituted or unsubstituted arylene group, a substituted or unsubstituted alkylene group having in the interior thereof a linkage group (e.g., an ether, ester or amide linkage group), and a substituted or unsubstituted arylene group having a linkage group in the interior thereof. Of these groups, a substituted or unsubstituted alkylene group, a substituted or unsubstituted arylene group and an alkylene group having a linkage group in the interior thereof are preferable, an unsubstituted alkylene group, an unsubstituted arylene group and an alkylene group having an ether or ester linkage group in the interior thereof are far preferable, and an unsubstituted alkylene group and an alkylene group having an ether or ester linkage group in the interior thereof are especially preferable. Examples of a substituent which can be contained in the linkage group L include a halogen, a hydroxyl group, a mercapto group, a carboxyl group, an epoxy group, an alkyl group and an aryl group. These substituents may further be substituted.

n represents 0 or 1. When a plurality of Xs are present, the Xs may be the same or different. n is preferably 0.

$R^{10}$ has the same meaning as in Formula (A), and it is preferably a substituted or unsubstituted alkyl group or an unsubstituted aryl group, far preferably an unsubstituted alkyl group or an unsubstituted aryl group.

X has the same meaning as in Formula (A), and it is preferably a halogen atom, a hydroxyl group or an unsubstituted alkoxy group, far preferably a chlorine atom, a hydroxyl group or an unsubstituted 1-6C alkoxy group, further preferably a hydroxyl group or a 1-3C alkoxy group, particularly preferably a methoxy group.

Compounds represented by formula (A) or (B) may be used as combinations of two or more thereof. Examples of a compound represented by formula (A) or (B) are illustrated below, but these examples should not be construed as limiting the scope of the invention.

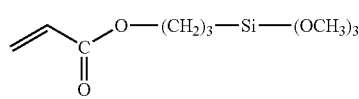

M-1

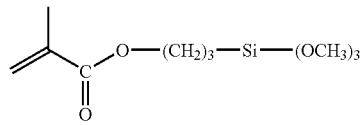

M-2

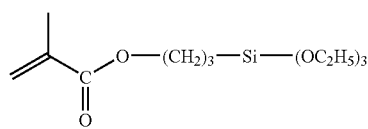

M-3

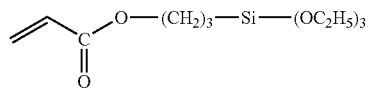

M-4

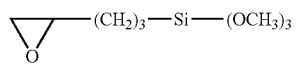

M-5

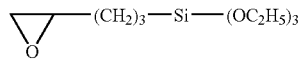

M-6

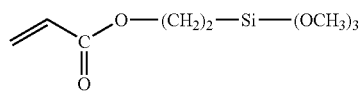

M-7

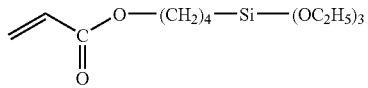

M-8

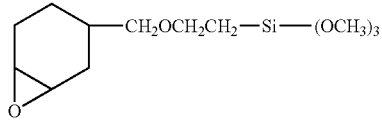

M-9

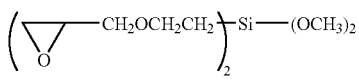

M-10

Of the compounds illustrated above, (M-1), (M-2) and (M-5) are preferred over the others.

Hydrolyzates and/or partial condensates of the organosilane compounds are generally produced by treating the organosilane compounds in the presence of a catalyst. Examples of a catalyst usable therein include inorganic acids, such as hydrochloric acid, sulfuric acid and nitric acid; organic acids, such as oxalic acid, acetic acid, formic acid, methanesulfonic acid and toluenesulfonic acid; inorganic salts, such as sodium hydroxide, potassium hydroxide and ammonia; organic salts, such as triethylamine and pyridine; metal alkoxides, such as aluminum triisopropoxide and zirconium tetrabutoxide; and metal-chelate compounds having at each individual center a metal such as Zr, Ti or Al. Of these catalysts, the metal-chelate compounds and the acid catalysts including inorganic acids and organic acids are preferably used in the invention. The inorganic acids preferred as the catalysts are hydrochloric acid and sulfuric acid. The organic acids preferred as catalysts are organic acids whose acid dissociation constants (pKa values at 25° C.) in water are 4.5 or below. Of these acids, hydrochloric acid, sulfuric acid and organic acids whose acid dissociation constants in water are 3.0 or below are preferable, hydrochloric acid, sulfuric acid and organic acids whose acid dissociation constants in water are 2.5 or below are preferable by far, and organic acids whose acid dissociation constants in water are 2.5 or below are particularly preferable. More specifically, methanesulfonic acid, oxalic acid, phthalic acid and malonic acid are used to particular advantage, and oxalic acid is the best.

As far as each of the metal-chelate compounds contains as ligands both alcohol represented by formula $R^3OH$ (wherein $R^3$ represents a 1-10C alkyl group) and a compound represented by formula $R^4COCH_2COR^5$ (wherein $R^4$ represents a 1-10C alkyl group and $R^5$ represents a 1-10C alkyl group or a 1-10C alkoxy group) and as the central metal a metal chosen from Zr, Ti or Al, it can be suitably used without any other particular restrictions. Two or more metal-chelate compounds may be used in combination as far as they fall under the aforesaid category. The metal-chelate compounds are preferably selected from a group of compounds represented by formulae $Zr(OR^3)_{p1}(R^4COCH_2COR^5)_{p2}$, $Ti(OR^3)_{q1}(R^4COCH_2COR^5)_{q2}$ and $Al(OR^3)_{r1}(R^4COCH_2COR^5)_{r2}$, respectively, and they have an accelerating action on condensation reaction of hydrolyzates and/or partial condensates of the organosilane compounds.

The groups $R^3$ and $R^4$ in each metal-chelate compound may be the same or different, and they are specifically 1-10C alkyl groups, with examples including ethyl, n-propyl, i-propyl, n-butyl, sec-butyl, t-butyl and n-pentyl groups, or phenyl groups. The group $R^5$ includes not only the same 1-10C alkyl groups as recited above but also 1-10C alkoxy groups, such as methoxy, ethoxy, n-propoxy, i-propoxy, n-butoxy, sec-butoxy and t-butoxy groups. Additionally, p1, p2, q1, q2, r1 and r2 in the metal-chelate compounds are integers determined so as to respectively satisfy the relations p1+p2=4, q1+q2=4 and r1+r2=3.

Examples of these metal-chelate compounds include zirconium-chelate compounds, such as tri-n-butoxyethylacetoacetatezirconium, di-n-butoxybis(ethylacetoacetate)zirconium, n-butoxytris(ethylacetoacetate)zirconium, tetrakis(n-propylacetoacetate)zirconium, tetrakis(acetylacetoacetate)zirconium and tetrakis(ethylacetoacetate)zirconium; titanium-chelate compounds, such as diisopropoxybis(ethylacetoacetate)titanium, diisopropoxybis(acetylacetate)titanium and diisopropoxybis(acetylacetone)titanium; and aluminum-chelate compounds, such as diisopropoxyethylacetoacetatealuminum, diisopropoxyacetylacetonatoaluminum, isopropoxybis(ethylacetoacetate)aluminum, isopropoxybis(acetylacetonato)aluminum, tris(ethylacetoacetate)aluminum, tris(acetylacetonato)aluminum and monoacetylacetonatobis(ethylacetoacetate)aluminum.

Of these metal-chelate compounds, tri-n-butoxyethylacetoacetatezirconium, diisopropoxybis(acetylacetonato)titanium, diisopropoxyethylacetoacetatealuminum and tris(ethylacetoacetate)aluminum are preferred over the others. Those metal-chelate compounds can be used alone, or as mixtures of two or more thereof. It is also possible to use partial hydrolysis products of those metal-chelate compounds.

Further, it is preferable in the invention to add a β-diketone compound and/or a β-ketoester compound to the curable composition. Further description of these compounds is given below.

The β-diketone and/or β-ketoester compound usable in the invention is represented by formula $R^4COCH_2COR^5$, and functions as a stability promoting agent of the curable composition used in the invention. Therein, $R^4$ represents a 1-10C alkyl group, and $R^5$ represents a 1-10C alkyl group or a 1-10C alkoxy group. More specifically, it is thought that these compounds inhibit the metal-chelate compounds (zirconium, titanium and/or aluminum compounds) from promoting the condensation reaction of hydrolyzates and/or partial condensates of organosilane compounds through coordination to the metal atoms in the metal-chelate compounds, and thereby exert a storage stability promoting action on the composition obtained. The groups $R^4$ and $R^5$ constituting the β-diketone and/or β-ketoester compound are the same as the groups $R^4$ and $R^5$ constituting the metal-chelate compound, respectively.

Examples of the β-diketone compound and/or the β-ketoester compound include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione and 5-methyl-hexanedione. Of these compounds, ethyl acetoacetate and acetylacetone are preferred over the others, and acetylacetone in particular is advantageous. These β-diketone and/or β-ketoester compounds can be used alone or as mixtures of two or more thereof. In the invention, it is preferable that these β-diketone and/or β-ketoester compounds are used in an amount of 2 moles or above, especially from 3 to 20 moles, per mole of metal-chelate compound. Their addition amount smaller than 2 moles is undesirable because the composition obtained may have inferior storage stability.

The amount of the organosilane compounds mixed is preferably 0.1 to 50 mass %, far preferably 0.5 to 20 mass %, particularly preferably 1 to 10 mass %, of the total solids in, e.g., a low refractive index layer.

Although the organosilane compounds may be added directly to a curable composition (a coating composition for an antiglare layer or a low refractive index layer), it is preferable to prepare hydrolyzates and/or partial condensates of the organosilane compounds by treating in advance the organosilane compounds in the presence of the catalyst as recited above and use the thus obtained reaction solution (sol solution) in preparation of the curable composition. In the invention, it is preferable to begin by preparing a composition containing hydrolyzates and/or partial condensates of the organosilane compounds and the metal-celate compounds as recited above, then add to this composition the β-diketone and/or β-ketoester compounds, further mix the resulting composition in a coating solution for at least either an antiglare layer or a low refractive index layer, and lastly apply the thus prepared coating solution.

1-(5) Initiator

Various kinds of monomers having ethylenic unsaturated groups can be polymerized by irradiation with ionizing radiation or heating in the presence of a photo radical initiator or a thermal radical initiator, respectively.

When the present film is formed, a photo initiator or a thermal initiator can be used concurrently.

<Photo Initiator>

Examples of a radical photopolymerization initiator include acetophenones, benzoins, benzophenones, phosphine oxides, ketals, anthraquinones, thioxanthones, azo compounds, peroxides (as disclosed in JP-A-2001-139663), 2,3-dialkyldione compounds, disulfide compounds, fluoroamine compounds, aromatic sulfoniums, lophine dimers, onium salts, borates, active esters, active halogen compounds, inorganic complexes and coumarins.

Examples of acetophenones include 2,2-dimethoxyacetophenone, 2,2-diethoxyacetophenone, p-dimethylacetophenone, 1-hydroxy-dimethylphenylketone, 1-hydroxydimethyl-p-isopropylphenylketone, 1-hydroxycyclohexylphenylketone, 2-methyl-4-methylthio-2-morpholinopropiophenone, 2-benzyl-2-dimethylamino-1-(4-morpholinophenyl)-butanone, 4-phenoxydicyloroacetophenone and 4-t-butyl-dichloroacetophenone.

Examples of benzoins include benzoin, benzoin methyl ether, benzoin ethyl ethar, benzoin isopropyl ether, benzyldimethylketal, benzoin benzenesulfonnic acid ester and benzoin toulenesulfonic acid ester.

Examples of benzophenones include benzophenone, hydroxybenzophenone, 4-benzoyl-4'-methyldiphenylsulfide, 2,4-dichlorobenzophenone, 4,4'-dichlorobenzophenone, p-chlorobenzophenone, 4,4'-dimethylaminobenzophenone (Michler's ketone), and 3,3',4,4'-tetra(t-butylperoxycarbonyl)benzophenone.

Examples of borates include the compounds described as organic borates in Japanese Patent No. 2764769, JP-A-2002-116539, and Kunz & Martin, *Rad Tech' 98. Proceeding April, 1998, Chicago*, pp. 19-22. Specifically, the compounds disclosed in JP-A-2002-116539, paragraph numbers [0022] to [0027], can be given as examples. As other examples of organic boron compounds, the organic boron-transition metal coordinated complexes as disclosed in JP-A-6-348011, JP-A-7-128785, JP-A-7-140589, JP-A-7-306527 and JP-A-7-292014 are given, and ion complexes of borates with cationic dyes are also included therein.

Examples of phosphine oxides include 2,4,6-trimethylbenzoyldiphenylphosphine oxide.

Examples of active esters include 1,2-octanedione, 1-[4-(phenylthio)-, 2-(O-benzoyloxime)], sulfonic acid esters and cyclic active ester compounds.

More specifically, Compounds 1 to 21 disclosed in Examples of JP-A-2000-80068 are particularly preferred.

Examples of onium salts include aromatic diazonium salts, aromatic iodonium salts and aromatic sulfonium salts.

Examples of active halogen compounds include the compounds described in Wakabayashi et al., *Bull. Chem. Soc. Japan*, vol. 42, p. 2924 (1969), U.S. Pat. No. 3,905,815, JP-A-5-27830, M. P. Hutt, *Journal of Heterocyclic Chemistry*, vol. 1, No. 3 (1970). Of these compounds, trihalomethyl-substituted oxazole compounds and s-triazine compounds are preferred over the others. And s-triazine derivatives having at least one monohalogenated, dihalogenated or trihalogenated methyl group on each individual s-triazine ring are preferable by far. As examples of such compounds, s-triazine and oxathiazole compounds are known, and therein are included 2-(p-methoxyphenyl)-4,6-bis(trichloromethyl)-s-triazine, 2-(p-styrylphenyl)-4,6-bis(trichloromethyl)-s-triazine, 2-(3-bromo-4-di(ethylacetate)amino)phenyl)-4,6-bis(trichloromethyl)-s-triazine and 2-trihalomethyl-5-(p-methoxyphenyl)-1,3,4-oxadiazoles. More specifically, the compounds disclosed in JP-A-58-15503, pp. 14-30, JP-A-55-77742; pp. 6-10, JP-B-60-27673, p. 287 (Compound Nos. 1 to 8), JP-A-60-239736, pp. 443-444 (Compound Nos. 1 to 17), and U.S. Pat. No. 4,701,399 (Compound Nos. 1 to 19) are especially preferable.

Examples of inorganic complexes include bis($\eta^5$-2,4-dichloropentadiene-1-yl)-bis(2,6-difluoro-3-(1H-pyrrole-1-yl)-phenyl)titanium.

Examples of coumarins include 3-ketocoumarin.

These initiators may be used alone or as mixtures of two or more thereof.

Various examples of photo initiators are also described in *Saishin UV Koka Gifutu*, p. 159, Technical Information Institute Co., Ltd. (1991), and Kiyosi Kato, *Shigaisen Koka Sisutemu*, pp. 65-148, Sogo Gijutsu Senta (1989), and they are useful in the invention.

Suitable examples of commercially available radical photopolymerization initiators include KAYACURE (DETX-S, BP-100, BDMK, CTX, BMS, 2-EAQ, ABQ, CPTX, EPD, ITX, QTX, BTC and MCA), products of Nippon Kayaku Co., Ltd.; IRGACURE (651, 184, 500, 819, 907, 369, 1173, 1870, 2959, 4265 and 4263), products of Ciba Specialty Chemicals; Esacure (KIP100F, KBI, EB3, BP, X33, KT046, KT37, KIP150 and TZT), products of Sartomer Company Inc.; and combinations of two or more thereof.

It is appropriate to use photopolymerization initiators in an amount range of 0.1 to 15 parts by mass, preferably 1 to 10 parts by mass, per 100 parts by mass of multifunctional monomer.

<Photosensitizer>

In addition to photopolymerization initiators, a photosensitizer may be used. Examples of a photosensitizer include n-butylamine, triethylamine, tri-n-butylphosphine, Michler's ketone and thioxanthone.

Further, such a photosensitizer may be used together with one or more of an assistant, such as an azide compound, a thourea compound or a mercapto compound.

Examples of a commercially available photosensitizer include KAYACURE (DMBI and EPA), products of Nippon Kayaku Co., Ltd.

<Thermal Initiator>

As thermal radical initiators, organic or inorganic peroxides and organic azo and diazo compounds can be used.

Examples of organic peroxides include benzoyl peroxide, halogenobenzoyl peroxides, lauroyl peroxide, acetyl peroxide, dibutyl peroxide, cumene hydroperoxide and butyl hydroperoxide, and examples of inorganic peroxides include hydrogen peroxide, ammonium persulfate and potassium persulfate. Examples of azo compounds include 2,2'-azobis (isobuyronitrile), 2,2'-azobis(propionitrile) and 1,1'-azobis (cyclohexanecarbonitrile), and examples of diazo compounds include diazoaminobenzene and p-nitrobenzenediazonium.

1-(6) Cross-linkable Compound

When the monomer or polymer for binder as a constituent of the present film does not have sufficient curing capability by itself, the required curing capability can be imparted thereto by mixing with a cross-linkable compound.

When the polymer body has, e.g., hydroxyl groups, it is preferable to use various kinds of amino compounds as a curing agent. Amino compounds used as cross-linkable compounds are, e.g., compounds which each have at least two groups chosen from either alkylamino groups, or alkoxyalkylamino groups, or both, with examples including melamine compounds, urea compounds, benzoguanamine compounds and glycoluril compounds.

The melamine compounds are generally known as compounds which each have a skeleton formed of a triazine ring and nitrogen atoms bound thereto. Examples thereof include melamine, alkylated melamine, methylolmelamine and alkoxylated methyl melamine. Of these compounds are preferred melamine compounds having in each individual molecule either at least two methylol groups, or at least two alkoxylated methyl groups, or at total of at least two groups including both methylol and alkoxylated methyl groups. More specifically, methylolmelamine obtained by reaction of melamine with formaldehyde under an alkaline condition, alkoxylated methyl melamine and derivatives thereof are preferred. The alkoxylated methyl melamine is especially favorable from the viewpoint of ensuring curable resin compositions satisfactory storage stability and excellent reactivity. The methylolmelamine and the alkoxylated methyl melamine used as cross-linkable compounds have no particular restriction, but it is also possible to use various kinds of resinous matters obtained by the methods described, e.g., in *Purasutikku Zairvo Koza [8] YuriaMeramin Jushi*, The Nikkan Kogyo Shinbun Ltd.

Examples of urea compounds include urea, polymethylolurea, alkoxylated methyl urea as a derivative thereof, and urone ring-containing methylolated urone and alkoxylated methyl urone. As to the compounds such as urea derivatives also, it is possible to use various resinous matters described in the above-cited reference.

1-(7) Curing Catalyst

In the present film, compounds generating radicals or acids by irradiation with ionizing radiation or heat can be used as curing catalysts for promotion of curing.

<Thermal Acid Generator>

Examples of a thermal acid generator include various aliphatic sulfonic acids and salts thereof, various aliphatic carboxylic acids, such as citric acid, acetic acid and maleic acid, and salts thereof, various aromatic carboxylic acids, such as benzoic acid and phthalic acid, and salts thereof, alkylbenzenesulfonic acids and ammonium, amine and various metal salts thereof, and phosphoric acid and phosphates of organic acids.

Examples of commercially available materials as thermal acid generators include Catalyst 4040, Catalyst 4050, Catalyst 600, Catalyst 602, Catalyst 500 and Catalyst 296-9, which are all products of Nihon Cytec Industries Inc.; NACURE Series 155, 1051, 5076 and 4054J and their blocked types, NACURE Series 2500, 5225, X49-110, 3525 and 4167, which are all products of King Industries.

It is appropriate that such thermal acid generators be used in proportions of 0.01 to 10 parts by mass, preferably 0.1 to 5 parts by mass, to 100 parts by mass of curing resin composition. As far as the addition amount is within the above range, the curing resin composition can have satisfactory storage stability and the coating formed therefrom can have satisfactory scratch resistance.

<Photosensitive Acid Generator and Photo-acid Generator>

Further, photo-acid generators usable as photopolymerization initiators are described below in detail.

Examples of acid generators include compounds known as photo initiators for cationic photopolymerization, photodecoloring agents for dyes, photodiscoloring agents and known acid generators used in microresist, and mixtures of two or more thereof. In addition, organic halogen compounds and disulfone compounds and onium compounds are also usable as acid generators.

Examples of photosensitive acid generators include (1) various types of onium salts, such as iodonium salts, sulfonium salts, phosphonium salts, diazonium salts, ammonium salts and pyridinium salts; (2) β-keto esters and sulfone compounds including β-sulfonylsulfones and α-diazo compounds thereof, (3) sulfonic acid esters, such as alkylsulfonates, haloalkylsulfonates, arylsulfonates and iminosulfonates; (4) sulfonimide compounds; and (5) diazomethane compounds.

Examples of onium compounds include diazonium salts, ammonium salts, iminium salts, phosphonium salts, iodonium salts, sulfonium salts, arsonium and selenonium salts. Of these onium salts, diazonium salts, iodonium salts, sulfonium salts and iminium salts are preferred over the others from the viewpoints of photosensitivity about initiation of photopolymerization and their material stabilities. Examples of these salts include the compounds disclosed in JP-A-2002-29162, paragraph Nos. [0058] to [0059].

It is appropriate that the photosensitive acid generators be used in proportions of 0.01 to 10 parts by mass, preferably 0.1 to 5 parts by mass, to 100 parts by mass of curing resin composition.

For more specific compounds and their usage, the descriptions in JP-A-2005-43876 can be referred to.

1-(8) Translucent Particles

In the present film, especially in an antiglare layer and a hard coating layer, various types of translucent particles can be used in order to give an antiglare quality (surface scattering quality) and an internal scattering quality.

The translucent particles may be organic particles, or they may be inorganic particles. The smaller dispersion in the sizes of particles results in the smaller variations in scattering characteristics, so it can make the design of haze values easier. As the translucent particles, plastic beads are suitable, and it is preferable that their transparency is high and the difference in refractive index between the binder and the plastic bead is within the range as mentioned below.

Examples of organic particles usable herein include polymethyl methacrylate particles (refractive index: 1.49), cross-linked acrylic-styrene copolymer particles (refractive index: 1.54), melamine resin particles (refractive index: 1.57), polycarbonate particles (refractive index: 1.57), polystyrene particles (refractive index: 1.60), cross-linked polystyrene particles (refractive index: 1.61), polyvinyl chloride particles (refractive index: 1.60) and benzoguanamine-melamine-formaldehyde particles (refractive index: 1.68).

Examples of inorganic particles usable herein include silica particles (refractive index: 1.44), alumina particles (refractive index: 1.63), zirconia particles, titania particles and inorganic particles having hollows and pores.

Of the particles recited above, cross-linked polystyrene particles, cross-linked poly((meth)acrylate) particles and cross-linked copoly(acrylic-styrene) particles are used to advantage. By adjusting the refractive index of a binder to suit the refractive index of each translucent particle chosen from these particles, the internal haze, the surface haze and the center-line average surface roughness specified by the invention can be attained.

Further, it is preferable to use a combination of a binder containing as a main component a (meth)acrylate monomer with trifunctionality or more (which has a refractive index of 1.50 to 1.53 after curing) and translucent particles formed from cross-linked (meth)acrylate polymer having an acrylic fraction of 50 to 100 mass %, especially a combination of the binder and translucent particles (refractive index: 1.48 to 1.54) formed from cross-linked styrene-acrylic copolymer having an acrylic fraction of 50 to 100 mass %.

In the invention, the refractive index of binder (translucent resin) and that of translucent particles are preferably from 1.45 to 1.70, far preferably from 1.48 to 1.65. In order to bring the refractive index into such a range, it will suffice to choose the kinds and mixing proportions of binders and those of translucent particles as appropriate. What choices should be made can be easily known in advance by experiments.

In addition, the difference in refractive index between a binder and translucent particles used in the invention (translucent particles' refractive index minus binder's refractive index) is preferably from 0.001 to 0.030, far preferably from 0.001 to 0.020, further preferably from 0.001 to 0.015, in absolute-value terms. When this difference is greater than 0.030, there occur troubles of having blurred characters on the film, lowering darkroom contrast and rendering the film surface whitish.

Herein, binder's refractive index can be quantitatively evaluated by direct measurement with an Abbe refractometer, reflection spectrum measurement or spectroscopic ellipsometry. The refractive index of translucent particles can be determined as follows: Translucent particles are dispersed into an equivalent amount of solvent mixture which is made up of two kinds of solvents different in refractive index. While varying the refractive index of the solvent mixture by changing the mixing ratio of those two kinds of solvents, turbidity measurements are made, and the refractive index of the solvent mixture at the time of showing the minimum turbidity is measured with an Abbe refractometer, thereby determining the refractive index of the translucent particles.

In the case of translucent particles as recited above, they are apt to cause sedimentation in binders, so inorganic fillers such as silica may be added for prevention of sedimentation. Although the addition of inorganic filler in a greater amount is the more effective in preventing sedimentation of translucent particles, it has the more adverse effect on transparency of a coating formed. Therefore, it is appropriate that an inorganic filler measuring 0.5 μm or below in particle diameter be added to a binder in a proportion lower than 0.1 mass % so as not to impair the transparency of a coating formed.

The average particle diameter of translucent particles is preferably from 0.5 to 10 μm, far preferably from 2.0 to 6.0 μm. When the average particle diameter is smaller than 0.5

μm, the angle distribution of light scattering is spread out to wide angles, so there occurs an undesirable phenomenon that characters on a display are blurred. On the other hand, when the average particle diameter is greater than 10 μm, there arises a problem that addition of such particles to a layer requires an increase in layer thickness to result in curling and an increase in cost.

Additionally, two or more kinds of translucent particles having different particle diameters may be used together. The use of translucent particles greater in particle diameter can give an antiglare quality, while the use of translucent particles smaller in particle diameter can reduce a gritty feeling of the surface.

The content of translucent particles in a layer to which they are added is adjusted to be from 3% to 30% by mass, preferably from 5% to 20% by mass, of the total solids in the layer. When the content is lower than 3% by mass, the addition effect is insufficient. When the content is increased beyond 30% by mass, on the other hand, there arise problems that images are blurred and the layer surface becomes whitish and glaring.

The density of translucent particles is preferably from 10 to 1,000 mg/m$^2$, far preferably from 100 to 700 mg/m$^2$.

<Preparation and Classification of Translucent Particles>

Examples of a method of preparing the translucent particles relating to the invention include a suspension polymerization method, an emulsion polymerization method, a soap-free emulsion polymerization method, a dispersion polymerization method and a seed polymerization method, and any of these methods may be adopted in the invention. For details of these preparation methods, descriptions in Takayuki Otsu & Masayoshi Kinoshita, *Kobunshi Gosei no Jikkenho*, p. 130 and pp. 146-147, Kagakudojin Co., Ltd.; *Gosei Kobunshi*, vol. 1, pp. 246-290, and vol. 3, pp. 1-108; Japanese Patent Nos. 2543503, 3508304, 2746275, 3521560 and 3580320; JP-A-10-1561, JP-A-7-2908, JP-A-5-297506 and JP-A-2002-145919 can be referred to.

It is preferable for the translucent particles to have a monodisperse distribution of sizes in view of the control of haze values and diffusibility and the uniformity of coating surface condition. When the particles having particle diameters greater than the average particle diameter by 20% or above are defined as coarse particles, the proportion of these coarse particles in the total particles is preferably at most 1% by number, far preferably at most 0.1% by number, further preferably at most 0.01% by number. In order to obtain particles having such a particle size distribution, classification after preparation or synthesis reaction can be adopted as a useful method. By increasing the number of times the classification is carried out or enhancing the extent of classification, a desirable particle distribution can be obtained.

For the classification, it is appropriate to adopt a wind classification method, a centrifugal classification method, a sedimentation classification method, a filtration classification method or an electrostatic classification method.

1-(9) Inorganic Particles

In the invention, various kinds of inorganic particles can be used for the purpose of improving physical properties including hardness and optical properties including reflectivity and scattering quality.

Such inorganic particles are particles of the oxide of at least one metal selected from among silicon, zirconium, titanium, aluminum, indium, zinc, tin and antimony, with examples including $ZrO_2$, $TiO_2$, $Al_2O_3$, $In_2O_3$, $ZnO$, $SnO_2$, $Sb_2O_3$ and ITO. In addition, particles of $BaSO_4$, $CaCO_3$, talc or kaoline are also be usable as the inorganic particles.

As to the diameters of inorganic particles used in the invention, it is preferable that the particles are made as fine as possible in a dispersion medium. The mass average diameter of inorganic particles is preferably from 1 to 200 nm, far preferably from 5 to 150 nm, further preferably from 10 to 100 nm, especially preferably from 10 to 80 nm. By use of the inorganic particles fined so as to have diameters of 100 nm or below, films without loss of transparency can be formed. The diameters of inorganic particles can be determined using a light scattering method or electron micrographs.

The specific surface area of inorganic particles is preferably from 10 to 400 m$^2$/g, far preferably from 20 to 200 m$^2$/g, especially preferably from 30 to 150 m$^2$/g.

It is preferable that inorganic particles for use in the invention are dispersed into a dispersion medium and then added to a coating solution for forming a layer in which they are used.

The dispersion medium suitable for inorganic particles is a liquid having a boiling point of 60 to 170° C. Examples of such a dispersion medium include water, alcohol (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofuran) and ether alcohol (e.g., 1-methoxy-2-propanol). Of these dispersion media, toluene, xylene, methyl ethyl ketone, methyl isobutyl ketone, cyclohexanone and butanol are preferred over the others.

The dispersion media used to particular advantage are methyl ethyl ketone, methyl isobutyl ketone and cyclohexanone.

The inorganic particles are dispersed with a dispersing machine. Examples of a dispersing machine include a sand grinder mill (e.g., a pin-attached beads mill), a high-speed impeller mill, a pebble mill, a roller mill, an attrition mill and a colloid mill. Of these mills, a sand grinder mill and a high-speed impeller mill are preferred over the others. In addition, pre-dispersion treatment may be carried out. Examples of a dispersing machine used for pre-dispersion treatment include a ball mill, a three-rod roll mill, a kneader and an extruder.

<High Refractive Index Particles>

For the purpose of giving a high refractive index to a layer making up the present film, it is suitable to use the cured matter of a composition in which a monomer, an initiator and an organic group-substituted silicon compound are contained and further inorganic particles with a high refractive index are dispersed.

As the inorganic particles in this case, $ZrO_2$ and $TiO_2$ are used to particular advantage from the viewpoint of refractive index. For imparting a high refractive index to a hard coating layer, $ZrO_2$ is most suitable. And $TiO_2$ fine particles are most suitable as particles for high and medium refractive index layers.

As the $TiO_2$ particles, inorganic particles containing $TiO_2$ as a main component and further containing at least one element chosen from cobalt, aluminum or zirconium are especially suitable. The term "a main component" as used herein means a component having the highest content (mass %) of all the components making up the particles.

It is appropriate in the invention that the refractive index of particles containing $TiO_2$ as a main component be from 1.90 to 2.80, preferably from 2.10 to 2.80, particularly preferably from 2.20 to 2.80.

The mass-average diameter of primary particles of particles containing $TiO_2$ as a main component is preferably from 1 to 200 nm, far preferably from 1 to 150 nm, further preferably from 1 to 100 nm, particularly preferably from 1 to 80 nm.

As to the crystal structure of particles containing $TiO_2$ as a main component, it is preferable that the rutile-type, rutile/anatase mixture-type, anatase-type or amorphous-type structure is a main component, and it is especially preferable that the rutile-type structure is a main component. The term "a main component" as used herein means a component having the highest content (mass %) of all the components making up the particles.

By containing at least one element chosen from Co (cobalt), Al (aluminum) or Zr (zirconium) in particles containing $TiO_2$ as a main component, the photo-catalyst activity of $TiO_2$ can be reduced, and thereby the weather resistance of the present film can be enhanced.

Of those elements, Co (cobalt) is most suitable. The combined use of two or more elements is also favorable.

The inorganic particles containing $TiO_2$ as a main component may have a core/shell structure by undergoing surface treatment as described in JP-A-2001-166104.

The total amount of a monomer and inorganic particles added to a layer is preferably from 10 to 90% by mass, far preferably from 20 to 80% by mass, of the total binder. Two or more kinds of inorganic particles may be used in the layer.

<Low Refractive Index Particles>

It is preferable that the inorganic particles incorporated in a low refractive index layer have a low refractive index. Examples of such inorganic particles include magnesium fluoride particulates and silica particulates. From the viewpoints of refractive index, dispersion stability and cost, silica particulates are especially preferred.

The average particle diameter of silica particulates is preferably from 30% to 150%, far preferably from 35% to 80%, further preferably from 40% to 60%, of thickness of the low refractive index layer. Specifically, when the thickness of the low refractive index layer is, e.g., 100 nm, the average particle diameter of silica particulates is preferably from 30 nm to 150 nm, far preferably from 35 nm to 80 nm, further preferably from 40 nm to 60 nm.

Herein, the average particle diameter of inorganic particles is measured with a Coulter counter.

When the diameter of silica particulates used is too small, the particulates produce little effect on scratch-resistance improvement; while, when the diameter is too large, fine asperities are formed on the surface of the low refractive index layer, so there occur deterioration in the outward appearance, such as deep blacks, and lowering of integrated reflectance. The silica particulates may be in a crystalline or amorphous state, and they may be monodisperse particles or aggregate particles so long as they meet the particle diameter requirements. While their best shape is a spherical shape, they may be indefinite in shape.

In addition, it is preferable that at least one type of silica particulates having an average particle diameter smaller than 25% of the thickness of the low refractive index layer (referred to as "silica particulates of small-size type") is used in combination with the silica particulates having the average particle diameter specified above (referred to as "silica particulates of large-size type").

Since silica particulates of small-size type can fill in gaps between silica particulates of large-size type, they can function as a holding agent for the silica particulates of large-size type.

When the low refractive index layer has a thickness of, e.g., 100 nm, the average particle diameter of the silica particulates of small-size type is preferably from 1 nm to 20 nm, far preferably from 5 nm to 15 nm, particularly from 10 nm to 15 nm. The use of such silica particulates is favorable from the viewpoints of the cost of raw materials and their holding effect.

The coverage of the particles with a low refractive index is preferably from 1 $mg/m^2$ to 100 $mg/m^2$, far preferably from 5 $mg/m^2$ to 80 $mg/m^2$, further preferably from 10 $mg/m^2$ to 60 $mg/m^2$. When the coverage is too low, scratch resistance improving effect is reduced; while, when the coverage is too high, fine asperities are formed on the surface of the low refractive index layer, and thereby deterioration in the outward appearance, such as deep blacks, and lowering of integrated reflectance are caused.

<Hollow Silica Particles>

For further reduction in refractive index, it is favorable to use hollow silica particulates. The refractive index of hollow silica particulates is preferably from 1.15 to 1.40, far preferably from 1.17 to 1.35, especially preferably from 1.17 to 1.30. The refractive index specified herein represents the refractive index that the particles have in their entirety, and it does not represent the refractive index of only the outer shells forming hollow silica particles. When the radius of a cavity in each particle is taken as "a" and the radius of an outer shell of each particle as "b", the porosity x is calculated from the following mathematical expression (VIII).

$$x=(4\pi a^3/3)/(4\pi b^3/3)\times 100 \quad \text{(Mathematical Expression VIII)}$$

The porosity x is preferably from 10% to 60%, far preferably from 20% to 60%, particularly preferably 30% to 60%. When it is intended to allow hollow silica particles to have a lower refractive index and a greater porosity, the outer shell thickness is reduced and the particle strength is lowered. Therefore, particles having a refractive index lower than 1.15 are undesirable in point of scratch resistance.

Manufacturing methods of hollow silica are disclosed, e.g., in JP-A-2001-233611 and JP-A-2002-79616. Particles having hollows on the inside of their individual shells whose pores are blocked up are used to particular advantage. The refractive index of these hollow silica particles can be calculated according to the method disclosed in JP-A-2002-79616.

The coverage of hollow silica is preferably from 1 $mg/m^2$ to 100 $mg/m^2$, far preferably from 5 $mg/m^2$ to 80 $mg/m^2$, further preferably from 10 $mg/m^2$ to 60 $mg/m^2$. When the coverage is too low, effects of further lowering a refractive index and improving scratch resistance are reduced; while, when the coverage is too high, fine asperities are formed on the surface of the low refractive index layer to result in deterioration in the outward appearance, such as deep blacks, and integrated reflectance.

The average particle diameter of hollow silica is preferably from 30% to 150%, far preferably from 35% to 80%, further preferably from 40% to 60%, of thickness of the low refractive index layer. Specifically, when the thickness of the low refractive index layer is, e.g., 100 nm, the average particle diameter of silica particulates is preferably from 30 nm to 150 nm, far preferably from 35 nm to 80 nm, further preferably from 40 nm to 60 nm.

When the particle diameter of silica particulates is too small, the proportion of the hollow part is reduced, and no lowering of refractive index is expected; while, when the particle diameter is too large, fine asperities are formed on the surface of the low refractive index layer to result in deterioration in the outward appearance, such as deep blacks, and integrated reflectance. The silica particulates may be in a crystalline or amorphous state, and they are preferably monodisperse particles. While their best shape is a spherical shape, they may be indefinite in shape.

Additionally, two or more kinds of hollow silica different in average particle size may be used in combination. The average particle size of hollow silica can be determined from electron micrographs.

The specific surface area of hollow silica for use in the invention is preferably from 20 to 300 $m^2/g$, far preferably from 30 to 120 $m^2/g$, especially preferably from 40 to 90 $m^2/g$. The specific surface area can be determined using nitrogen in accordance with BET method.

In the invention, solid silica particles can be used in combination with hollow silica. The suitable particle size of solid silica is from 30 nm to 150 nm, preferably from 35 nm to 100 nm, especially preferably from 40 nm to 80 nm.

1-(10) Electrically Conductive Particles

For giving electrical conductivity to the present film, various electrically conductive particles can be used.

The electrically conductive particles are preferably formed of metal oxide or metal nitride. Examples of metal oxide and metal nitride include tin oxide, indium oxide, zinc oxide and titanium nitride. Tin oxide and indium oxide in particular are preferred. Inorganic particles with electrical conductivity contain such oxide or nitride as a main component and can further contain other elements. The term "a main component" as used herein means a component having the highest content (mass %) of all the components making up the particles. Examples of other elements include Ti, Zr, Sn, Sb, Cu, Fe, Mn, Pb, Cd, As, Cr, Hg, Zn, Al, Mg, Si, P, S, B, Nb, In, V and halogen atoms. For enhancing the electrical conductivity of tin oxide and indium oxide, addition of Sb, P, B, Nb, In, V or/and halogen atoms is suitable. Of such oxides, Sb-containing tin oxide (ATO) and Sn-containing indium oxide (ITO) in particular are preferred. The Sb content in ATO is preferably from 3 to 20% by mass, and the Sn content in ITO is preferably from 5 to 20% by mass.

The average particle diameter of primary particles of electrically conductive inorganic particles used for an antistatic layer is preferably from 1 to 150 nm, far preferably from 5 to 100 nm, especially preferably from 5 to 70 nm. The average particle diameter of electrically conductive inorganic particles in an antistatic layer formed is from 1 to 200 nm, preferably from 5 to 150 nm, far preferably from 10 to 100 nm, especially preferably from 10 to 80 nm. The average particle diameter of electrically conductive inorganic particles is an average diameter obtained using the mass of each particle as a weight, and can be determined by a light scattering method or electron micrographs.

The specific surface area of electrically conductive inorganic particles is preferably from 10 to 400 $m^2/g$, far preferably from 20 to 200 $m^2/g$, especially preferably from 30 to 150 $m^2/g$.

The electrically conductive inorganic particles may receive surface treatment. The surface treatment is carried out using an inorganic compound or an organic compound. Examples of an inorganic compound used for the surface treatment include alumina and silica. Silica treatment in particular is favorable. Examples of an organic compound used in the surface treatment include polyol, alkanolamine, stearic acid, a silane coupling agent and a titanate coupling agent. Of these compounds, a silane coupling agent is most favorable. Combination of two or more kinds of surface treatment may be carried out.

As shapes of electrically conductive inorganic particles, a rice-grain shape, a spherical shape, a cubic shape, a spindle shape or an amorphous shape is suitable.

Two or more kinds of conductive particles may be used together in a specified layer or as a film.

The proportion of electrically conductive inorganic particles in the antistatic layer is preferably from 20 to 90% by mass, far preferably from 25 to 85% by mass, especially preferably from 30 to 80% by mass.

The electrically conductive inorganic particles can be used in a state of dispersion for formation of the antistatic layer.

1-(11) Surface Treatment Agent

For the purpose of aiming at dispersion stability in a dispersion or coating solution or enhancing affinity or unitedness with a binder component, the inorganic particles used in the invention may undergo physical surface treatment, such as plasma discharge treatment or corona discharge treatment, or chemical surface treatment using a surfactant or a coupling agent.

The surface treatment can be carried out using a surface treatment agent made up of an inorganic compound or organic compound. Examples of an inorganic compound used in the surface treatment include cobalt-containing inorganic compounds (e.g., $CoO_2$, $Co_2O_3$, $Co_3O_4$), aluminum-containing inorganic compounds (e.g., $Al_2O_3$, $Al(OH)_3$), zirconium-containing inorganic compounds (e.g., $ZrO_2$, $Zr(OH)_4$), silicon-containing inorganic compounds (e.g., $SiO_2$) and iron-containing inorganic compounds (e.g., $Fe_2O_3$).

Of these compounds, cobalt-containing inorganic compounds, aluminum-containing inorganic compounds and zirconium-containing inorganic compounds are preferred over the others, and cobalt-containing inorganic compounds, $Al(OH)_3$ and $Zr(OH)_4$ in particular are used to advantage.

Examples of an organic compound used in the surface treatment include polyol, alkanolamine, stearic acid, a silane coupling agent and a titanate coupling agent. Of these compounds, a silane coupling agent is preferred over the others. It is especially preferable that the surface treatment is carried out using at least one compound chosen from a silane coupling agent (an organosilane compound), partial hydrolysis products thereof or condensates thereof.

Examples of a titanate coupling agent include metal alkoxides, such as tetramethoxytitanium, tetraethoxytitanium and tetraisopropoxytitanium, and PLENACT (KR-TTS, KR-46B, KR-55 and KR-41, products of Ajinomoto Fine-Techno Co., Inc.).

Suitable examples of an organic compound used in the surface treatment include polyol, alkanolamine and organic compounds having anionic groups. Of these compounds, organic compounds having carboxyl groups, sulfonic acid groups or phosphoric acid groups are preferred over the others. More specifically, stearic acid, lauric acid, oleic acid, linoleic acid and linolenic acid are used to advantage over the others.

It is preferable that the organic compounds used in the surface treatment further have cross-linkable or polymerizable functional groups. Examples of a cross-linkable or polymerizable functional group include ethylenic unsaturated groups capable of undergoing radical species-induced addition reaction or polymerization reaction (e.g., an (meth)acryl group, an allyl group, a styryl group, a vinyloxy group), cationic polymerizable groups (e.g., an epoxy group, an oxathanyl group, a vinyloxy group) and polycondensation reactive groups (e.g., a hydrolyzable silyl group, an N-methylol group). Of these groups, groups having ethylenic unsaturated groups are preferred over the others.

These surface treatment agents can be used as combinations of two or more thereof, and the combined use of an aluminum-containing inorganic compound and a zirconium-containing inorganic compound is especially favorable.

When the inorganic particles are silica, the use of a coupling agent is especially favored. Examples of a coupling agent include metal alkoxide compounds (such as a titan coupling agent and a silane coupling agent). The treatment effective in particular is silane coupling treatment.

Although such a coupling agent is used as a surface treatment agent of an inorganic filler to be incorporated in a low refractive index layer for giving surface treatment to the inorganic filler in advance of the preparation of a coating solution for the layer, it is preferable that the coupling agent is further added as an additive to the coating solution for the layer at its preparation time and thereby incorporated in the layer.

Dispersion of silica particulates into a medium in advance of surface treatment is favorable for lightening the load on surface treatment.

Examples of specific compounds as surface treatment agents and catalysts for surface treatment which can be suitably used in the invention include the organosilane compounds and the catalysts disclosed in WO 2004/017105.

1-(12) Dispersing Agent

Various types of dispersing agents can be used for dispersion of particles used in the invention.

It is preferable that such a dispersing agent further contains a cross-linkable or polymerizable functional group. Examples of a cross-linkable or polymerizable functional group include ethylenic unsaturated groups capable of undergoing radical species-induced addition reaction or polymerization reaction (e.g., an (meth)acryloyl group, an allyl group, a styryl group, a vinyloxy group), cationic polymerizable groups (e.g., an epoxy group, an oxathanyl group, a vinyloxy group) and polycondensation reactive groups (e.g., a hydrolyzable silyl group, an N-methylol group). Of these groups, functional groups having ethylenic unsaturated groups are preferred over the others.

For dispersion of inorganic particles, especially inorganic particles containing $TiO_2$ as a main component, it is suitable to use a dispersing agent having an anionic group, preferably a dispersing agent having not only an anionic group but also a cross-linkable or polymerizable functional group, particularly preferably a dispersing agent having a cross-linkable or polymerizable functional group in its side chain.

The group effective as an anionic group is a group having a acidic proton, such as a carboxyl group, a sulfonic acid group (sulfo), a phosphoric acid group (phosphono) or a sulfonamido group, or a salt thereof. Of these groups, carboxyl, sulfo, phosphono groups or salts thereof are preferred, and carboxyl and phosphono groups in particular are preferred. The number of anionic groups contained in a dispersing agent may be more than one per molecule, preferably on average two or more per molecule, far preferably 5 or more per molecule, particularly preferably 10 or more per molecule. Two or more types of anionic groups may be contained in one molecule of dispersing agent.

As to the dispersing agent having anionic groups in its side chains, the fraction of repeating units containing the anionic groups is from $10^{-4}$ to 100 mol %, preferably from 1 to 50 mol %, particularly preferably from 5 to 20 mol %, of the total repeating units.

It is preferable that the dispersing agent further contains a cross-linkable or polymerizable functional group. Examples of a cross-linkable or polymerizable functional group include ethylenic unsaturated groups capable of undergoing radical species-induced addition reaction or polymerization reaction (e.g., an (meth)acryloyl group, an allyl group, a styryl group, a vinyloxy group), cationic polymerizable groups (e.g., an epoxy group, an oxathanyl group, a vinyloxy group) and polycondensation reactive groups (e.g., a hydrolyzable silyl group, an N-methylol group). Of these groups, functional groups having ethylenic unsaturated groups are preferred over the others.

The number of cross-linkable or polymerizable functional groups contained in one molecule of dispersing agent may be preferably on average two or more, far preferably 5 or more, particularly preferably 10 or more. Two or more types of cross-linkable or polymerizable functional groups may be contained in one molecule of dispersing agent.

In a dispersing agent suitably used in the invention, repeating units having a poly-1,2-butadiene or poly-1,2-isoprene structure, or (meth)acrylic acid ester or amide repeating units which each a particular residue (an R group of —COOR or —CONHR) is attached to, can be utilized as repeating units having ethylenic unsaturated groups in their side chains. Examples of the particular residue (R group) include —$(CH_2)_n$—, —$CR^{21}$=$CR^{22}R^{23}$, —$(CH_2O)_n$—$CH_2CR^{21}$=$CR^{22}CR^{23}$, —$(CH_2CH_2O)_n$—$CH_2CR^{21}$=$CR^{22}CR^{23}$, —$(CH_2)_n$—NH—CO—O—$CH_2CR^{21}$=$CR^{22}CR^{23}$, —$(CH_2)_n$—O—CO—$CR^{21}$=$CR^{22}CR^{23}$ and —$(CH_2CH_2O)_2$—X (wherein $R^{21}$ to $R^{23}$ each represent a hydrogen atom, a halogen atom, a 1-20C alkyl group, an aryl group, an alkoxy group or an aryloxy group, or $R^{21}$ and $R^{22}$ or $R^{23}$ may combine with each other to form a ring, n is an integer of 1 to 12, and X is a dichloropentadiethyl residue). Examples of an ester residue R include —$CH_2CH$=$CH_2$ (corresponding to the allyl(meth)acrylate polymer disclosed in JP-A-64-17047), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—NHCOO—$CH_2CH$=$CH_2$ and —$CH_2CH_2O$—X (wherein X is a dicyclopentadienyl residue). Examples of the amide residue R include —$CH_2CH$=$CH_2$, —$CH_2CH_2$—Y (wherein Y is a 1-cyclohexenyl group), —$CH_2CH_2$—O—CO—CH=$CH_2$ and —$CH_2CH_2$—OCO—$C(CH_3)$=$CH_2$.

In the case of a dispersing agent having ethylenic unsaturated groups, free radicals (polymerization initiating radicals or growth radicals in the polymerization process of a polymerizable compound) are added to the unsaturated groups to cause addition polymerization between molecules directly or via polymerization linkages of the polymerizable compound, and thereby cross-links are formed between molecules to result in curing. In another way, atoms in molecules (e.g., hydrogen atoms on the carbon atoms adjacent to groups having unsaturated bonds) are drawn out by free radicals to produce polymeric radicals, and these radicals combine with each other to form cross-links between molecules and cause curing.

The mass-average molecular weight (Mw) of a dispersing agent which not only has anionic groups and cross-linkable or polymerizable functional groups but also contains the cross-linkable or polymerizable functional groups in its side chains has no particular limitation, but it is preferably 1,000 or above. The mass-average molecular weight (Mw) of the dispersing agent is far preferably from 2,000 to 1,000,000, further preferably from 5,000 to 200,000, particularly preferably from 10,000 to 100,000.

The units containing cross-linkable or polymerizable functional groups may constitute all repeating units except anionic group-containing repeating units, but they preferably constitute 5 to 50 mol %, especially 5 to 30 mol %, of all the cross-linking or repeating units.

Such a dispersing agent may be a copolymer of a monomer containing a cross-Irinkable or polymerizable functional group, a monomer containing an anionic group and an appropriate monomer other than the aforesaid monomers. The last copolymerizing component has no particular limitation, but it is selected from the viewpoints of dispersion stability, compatibility with the other monomeric components and strength of a film formed. Suitable examples of such a copolymerizing component include methyl(meth)acrylate, n-butyl(meth) acrylate, t-butyl(meth)acrylate, cyclohexyl(meth)acrylate and styrene.

Such a dispersing agent has no particular restriction as to the configuration thereof, but it is preferably a block copolymer or a random copolymer. From the viewpoints of cost and ease of synthesis, it is especially advantageous for the dispersing agent to be a random copolymer.

The proportion of a dispersing agent used for inorganic particles is preferably from 1 to 50 mass %, far preferably from 5 to 30 mass %, especially preferably from 5 to 20 mass %. Additionally, two or more types of dispersing agents may be used in combination.

Examples of a dispersing agent suitably used in the invention are illustrated below, but the dispersing agents usable in the invention should not be construed as being limited to these examples. The copolymers illustrated below are random copolymers unless otherwise indicated.

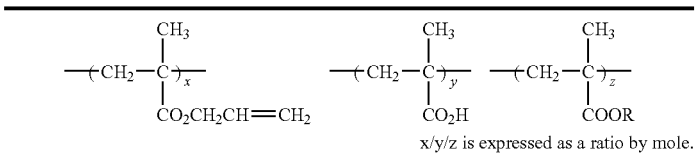

x/y/z is expressed as a ratio by mole.

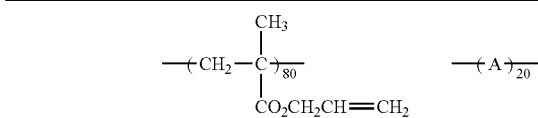

-continued

| | | Mw |
|---|---|---|
| P-(14) | $-CH_2-C(CH_3)(CO_2CH_2CH_2SO_3H)-$ | 20,000 |
| P-(15) | $-CH_2-C(CH_3)(CO_2CH_2CH_2OP(=O)(OH)_2)-$ | 50,000 |
| P-(16) | $-CH_2-CH(CO_2CH_2CH_2O-(CH_2)_5-OP(=O)(OH)_2)-$ | 15,000 |

$-(A)_{80}-$  $-(CH_2-C(CH_3)(COOH))_{20}-$

| | A | Mw |
|---|---|---|
| P-(17) | $-CH_2-C(CH_3)(COOCH_2CH_2OCH=CH-C_6H_5)-$ | 20,000 |
| P-(18) | $-CH_2-CH(COOCH_2CH_2OC(=O)CH_2CH=CH_2)-$ | 25,000 |
| P-(19) | $-CH_2-C(CH_3)(COO-CH_2-C_6H_4-CH=CH_2)-$ | 18,000 |
| P-(20) | $-CH_2-CH(-C_6H_4-OC(=O)CH_2CH=CH_2)-$ | 20,000 |
| P-(21) | $-CH_2-CH(CONHCH_2CH_2OC(=O)CH=CH_2)-$ | 35,000 |

$-(CH_2-C(CH_3)(COOR^1))_x-$  $-(CH_2-C(CH_3)(COOH))_y-$  $-(CH_2-C(CH_3)(COOR^2))_z-$

| | $R^1$ | $R^2$ | x | y | z | Mw |
|---|---|---|---|---|---|---|
| P-(22) | $CH_2CH_2OC(=O)CH=CH_2$ | $C_4H_9(n)$ | 10 | 10 | 80 | 25,000 |
| P-(23) | $CH_2CH_2OC(=O)CH=CH_2$ | $C_4H_9(t)$ | 10 | 10 | 80 | 25,000 |

-continued
| | | | | | | |
|---|---|---|---|---|---|---|
| P-(24) | 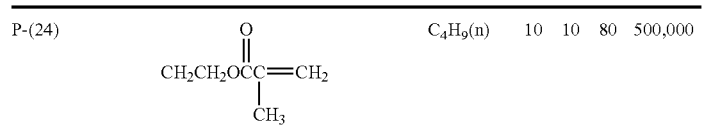 | C$_4$H$_9$(n) | 10 | 10 | 80 | 500,000 |
| P-(25) | 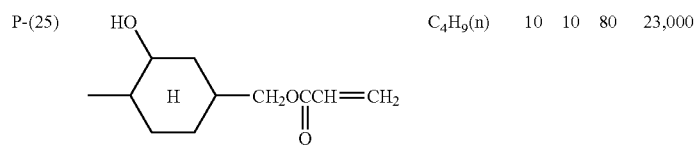 | C$_4$H$_9$(n) | 10 | 10 | 80 | 23,000 |
| P-(26) | 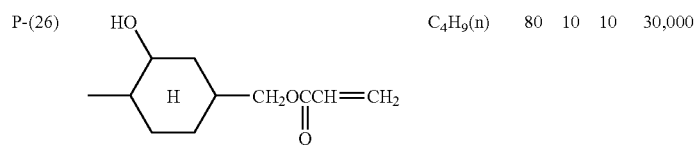 | C$_4$H$_9$(n) | 80 | 10 | 10 | 30,000 |
| P-(27) | 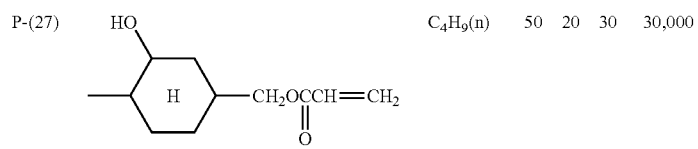 | C$_4$H$_9$(n) | 50 | 20 | 30 | 30,000 |
| P-(28) | 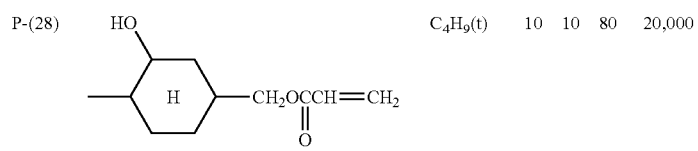 | C$_4$H$_9$(t) | 10 | 10 | 80 | 20,000 |
| P-(29) | 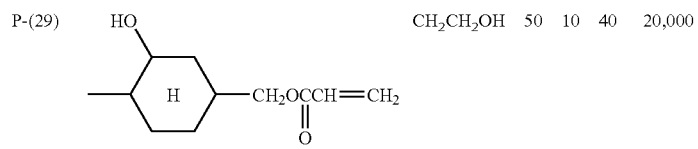 | CH$_2$CH$_2$OH | 50 | 10 | 40 | 20,000 |
| P-(30) | 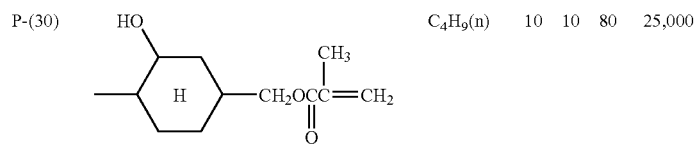 | C$_4$H$_9$(n) | 10 | 10 | 80 | 25,000 |
P-(31)
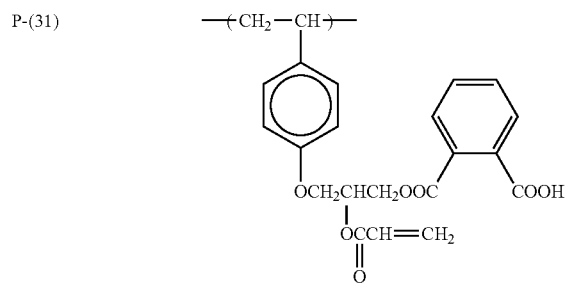
Mw = 60,000
P-(32)
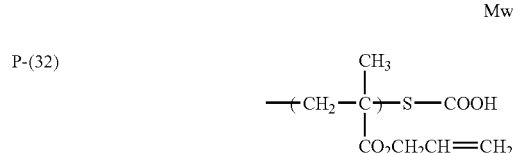
Mw = 10,000

-continued

P-(33) 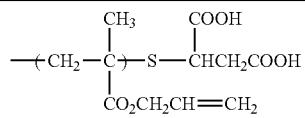

Mw = 20,000

P-(34) 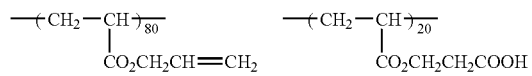

Mw = 30,000
(block copolymer)

P-(35) 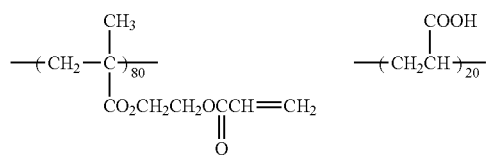

Mw = 15,000
(block copolymer)

P-(36) 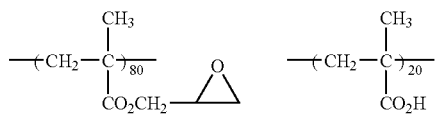

Mw = 8,000

P-(37) 

Mw = 5,000

P-(38) 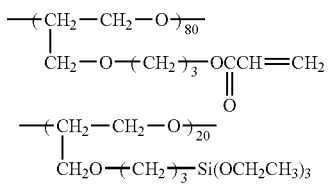

Mw = 10,000

1-(13) Anti-soiling Agent

To the present film, especially to the topmost layer of the film, it is preferable to add a known silicone-type or fluorine-containing anti-soiling or slipping agent as appropriate for the purpose of giving properties including soil resistance, water resistance, chemical resistance and slipping quality.

In the case of adding such an additive, the suitable addition amount thereof is within the range of 0.01 to 20 mass %, preferably 0.05 to 10 mass %, particularly preferably 0.1 to 5 mass %, of the total solids in the low refractive index layer.

Suitable examples of the silicone-type compound include compounds which each contain as repeating units a plurality of dimethylsilyloxy units and have substituents at the chain ends and/or in side chains. In a compound chain having dimethylsilyloxy units as repeating units, structural units other than the dimethylsilyloxy units may be contained. The substituents may be the same or different, and the number thereof is preferably two or more. Suitable examples of a substituent include an acryloyl group, a methacryloyl group, a vinyl group, an aryl group, a cinnamoyl group, an epoxy group, an oxethanyl group, a hydroxyl group, a fluoroalkyl group, a polyoxyalkylene group, a carboxyl group and amino group. Such a silicone-type compound has no particular limitation on the molecular weight, but the molecular weight thereof is preferably $1.0 \times 10^5$ or below, far preferably $5 \times 10^4$ or below, further preferably from 3,000 to 30,000, especially preferably from 10,000 to 20,000. The content of silicon atoms in the silicone-type compound has no particular limitation, but it is preferably 18.0 mass % or above, far preferably from 25.0 to 37.8 mass %, particularly preferably from 30.0 to 37.0 mass %. Examples of a suitable silicone-type compound include commercially available compounds such as X-22-174DX, X-22-2426, X-22-164B, X-22-164C, X-22-170DX, X-22-176D and X-22-1821 (which are trade names and produced by Shin-Etsu Chemical Co., Ltd.), FM-0725, FM-7725, FM-4421, FM-5521, FM-6621 and FM-1121 (which are products of Chisso Corporation), DMS-U22, RMS-033, RMS-083, UMS-182, DMS-H21, DMS-H31, HMS-301, FMS121, FMS123, FMS131, FMS141 and FMS221 (which are trade names and produced by Gelest Inc.), but these examples should not be construed as limiting silicone compounds usable in the invention.

The fluorine-containing compound suitably used for the foregoing purpose is a compound containing a fluoroalkyl group. The fluoroalkyl group is preferably a 1-20C fluoroalkyl group, far preferably a 1-10C fluoroalkyl group, and may have a straight-chain structure (e.g., $-CF_2CF_3$, $-CH_2(CF_2)_4H$, $-CH_2(CF_2)_8CF_3$, $-CH_2CH_2(CF_2)_4H$), or a branched structure (e.g., $-CH(CF_3)_2$, $-CH_2CF(CF_3)_2$, $-CH(CH_3)CF_2CF_3$, $-CH(CH_3)(CF_2)_5CF_2H$), or an alicyclic structure (preferably a 5- or 6-membered ring structure, such as a perfluorocyclohexyl group, a perfluorocyclopentyl group or alkyl groups substituted by these groups), or a structure including an ether linkage (e.g., $-CH_2OCH_2CF_2CF_3$, $-CH_2CH_2OCH_2C_4F_8H$, $-CH_2CH_2OCH_2CH_2C_8F_{17}$, $-CH_2CH_2OCF_2CF_2OCF_2CF_2H$). Two or more of the fluoroalkyl groups as recited above may be contained in one and the same molecule.

It is preferable that such a fluorine-containing compound further has substituents which contribute linkage formation or compatibility with a coating of low refractive index layer. The substituents may be the same or different, and the number thereof is preferably at least two. Suitable examples of such substituents include an acryloyl group, a methacryloyl group, a vinyl group, an aryl group, a cinnamoyl group, an epoxy group, an oxethanyl group, a hydroxyl group, a polyoxyalkylene group, a carboxyl group and an amino group. The fluorine-containing compound may be a polymer or oligomer containing a fluorine-free compound as a comonomeric component, and has no particular molecular-weight limits. The fluorine atom content in the fluorine-containing compound has no particular limits, but it is preferably at least 20 mass %, far preferably from 30 to 70 mass %, especially preferably from 40 to 70 mass %. Suitable examples of such a fluorine-containing compound include R-2020, M-2020, R-3833 and M-3833 (which are trade names and products of Daikin Industries Ltd.), Megafac F-171, F-172 and F-179A, and Defensa MCF-300 (which are trade names and products of Dainippon Ink and Chemicals Incorporated), but they should not be construed as being limited to these products.

A dust repellent and an antistatic agent, such as a known cationic surfactant or polyoxyalkylene compound, can also be added as appropriate with the intention of giving properties including dust resistance and an antistatic property. The silicone-type and fluorine-containing compounds as recited above may contain as part of their functions structural units of the dust repellent and the antistatic agent. When these agents are added as additives, their addition amount is preferably 0.01 to 20% by mass, far preferably 0.05 to 10% by mass, particularly preferably 0.1 to 5% by mass, of the total solids in a low refractive index layer. Examples of compounds suitable as such agents include Megafac F-150 (trade name) produced by Dainippon Ink and Chemicals Incorporated, and SH-3748 (trade name) produced by Dow Corning Toray Co., Ltd., but they should not be construed as being limited to these products.

1-(14) Surfactant

For the purpose of ensuring uniformity of surface condition in the present film by avoiding unevenness in coating and drying and spot flaws in particular, it is appropriate that either a fluorine-containing surfactant, or a silicone-type surfactant, or both be mixed in a coating composition for forming a light diffusing layer. The use of fluorine-containing surfactants in particular is preferred because, with addition in a smaller amount, they can produce effects on improvement of unevenness in coating and drying and on reduction of faults in surface condition, such as spot flaws. And they can increase productivity by imparting suitability for high-speed coating while enhancing uniformity of surface condition.

Suitable examples of a fluorine-containing surfactant include copolymers containing fluorinated aliphatic groups (which are abbreviated as "fluoropolymers"), and useful fluoropolymers are acrylic or methacrylic resins characterized by inclusion of repeating units derived from the following monomers (i) and copolymers of these monomers and the following vinyl monomers (ii) copolymerizable therewith.

(i) Fluorinated Aliphatic Group-containing Monomers Represented by the Following Formula (a):

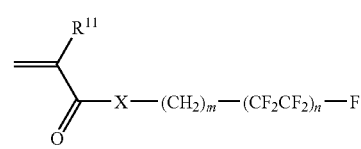

Formula (a)

In formula (a), $R^{11}$ represents a hydrogen atom or a methyl group, X represents an oxygen atom, a sulfur atom or $-N(R^{12})-$, m represents an integer of 1 to 6, and n represents an integer of 2 to 4. $R^{12}$ represents a hydrogen atom or a 1-4C alkyl group, specifically a methyl group, an ethyl group, a propyl group or a butyl group, but it is preferably a hydrogen atom or a methyl group. X is preferably an oxygen atom.

(ii) Monomers Copolymerizable with Foregoing Monomers (i) and Represented by the Following Formula (b):

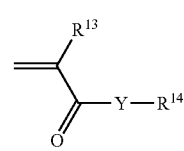

Formula (b)

In formula (b), $R^{13}$ represents a hydrogen atom or a methyl group, Y represents an oxygen atom, a sulfur atom or $-N(R^{15})-$. R15 represents a hydrogen atom or a 1-4C alkyl group, specifically a methyl group, an ethyl group, a propyl group or a butyl group, but it is preferably a hydrogen atom or a methyl group. Y is preferably an oxygen atom, $-N(H)-$ or $-N(CH_3)-$.

$R^{14}$ represents a 4-20C straight-chain, branched or cyclic alkyl group, which may have a substituent. Examples of a substituent of the alkyl group include a hydroxyl group, an alkylcarbonyl group, an arylcarbonyl group, a carboxyl group, an alkyl ether group, an aryl ether group, a halogen atom such as a fluorine atom, a chlorine atom or a bromine atom, a nitro group, a cyano group and an amino group, but they should not be construed as being limited to these substituents. Examples of suitably used 4-20C straight-chain, branched and cyclic alkyl groups include butyl groups, pentyl groups, hexyl groups, heptyl groups, octyl groups, nonyl groups, decyl groups, undecyl groups, dodecyl groups, tridecyl groups, tetradecyl groups, pentadecyl groups, octadecyl groups and eicosanyl groups, which each may be linear or branched; monocyclic cycloalkyl groups such as a cyclohexyl group and a cycloheptyl group, and polycyclic cycloalkyl groups such as a bicycloheptyl group, a bicyclodecyl group, a tricycloundecyl group, a tetracyclodecyl group, an adamantyl group, a norbornyl group and a tetracyclodecyl group.

The amount of those fluorinated aliphatic group-containing monomers of formula (a) present in a fluoropolymer used in the invention is at least 10 mole %, preferably from 15 to 70 mole %, far preferably from 20 to 60 mole %, based on all the monomers in the fluoropolymer.

The suitable mass-average molecular weight of a fluoropolymer used in the invention is from 3,000 to 100,000, preferably from 5,000 to 80,000.

The suitable amount of a fluoropolymer used in the invention added to a coating solution is from 0.001 to 5 mass %, preferably from 0.005 to 3 mass %, far preferably from 0.01 to 1 mass %, based on the coating solution. The addition of a fluoropolymer in an amount smaller than 0.001 mass % produce insufficient effect, while the addition in an amount greater than 5 mass % fails to perform sufficient drying of the coating formed or produces adverse effects on properties (e.g., reflectance and scratch resistance) of the coating formed.

Examples of the specific structure of a fluoropolymer including fluorinated aliphatic group-containing monomers represented by formula (a) are illustrated below, but fluoropolymers usable in the invention should not be construed as being limited to those illustrated below. The figures in each structural formula indicate mole fractions of constituent monomers. Mw stands for mass-average molecular weight.

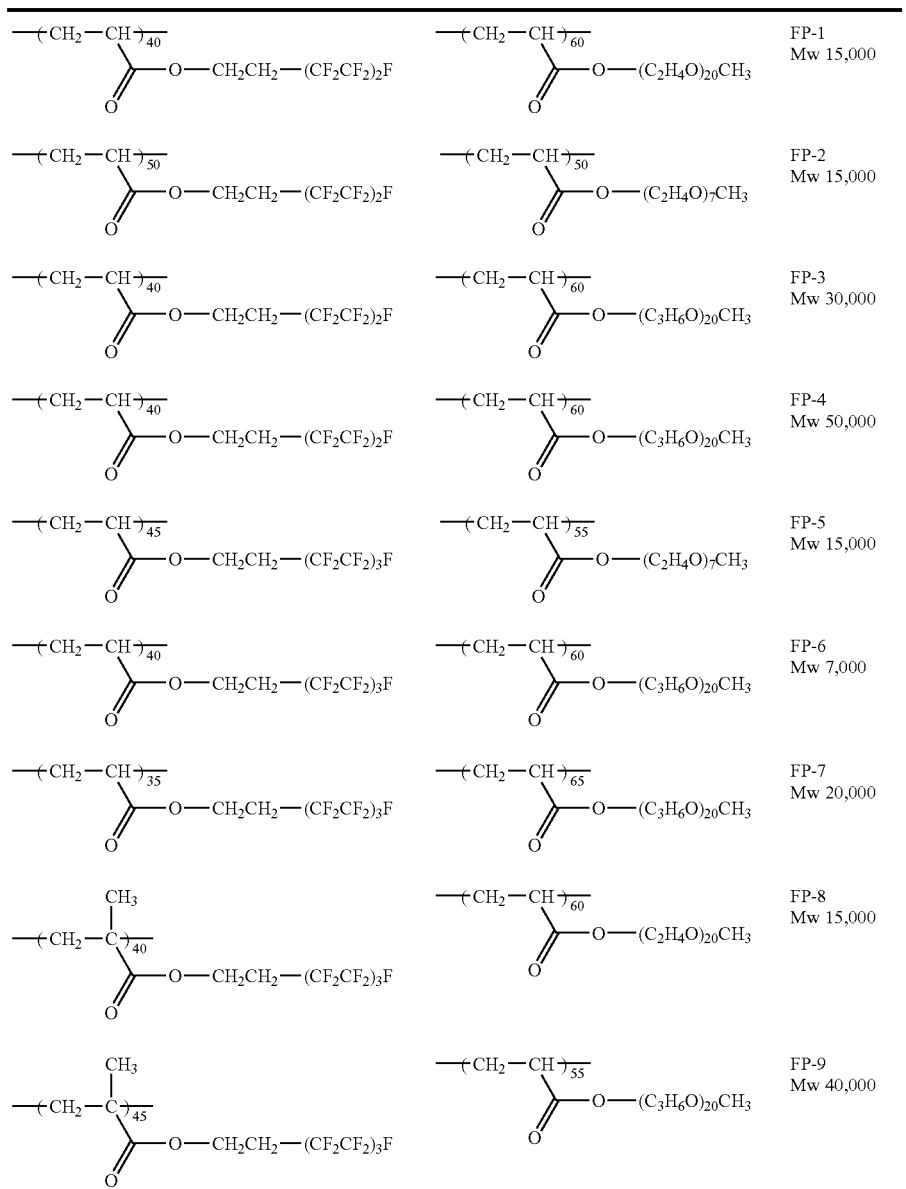

-continued

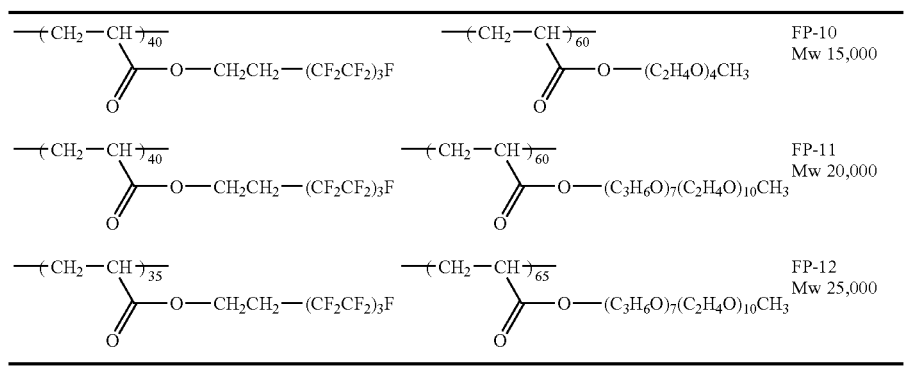

| | |
|---|---|
| | FP-10 Mw 15,000 |
| | FP-11 Mw 20,000 |
| | FP-12 Mw 25,000 |

However, the use of fluoropolymers as recited above brings about segregation of fluorine-containing functional groups in a surface part of antiglare layer to result in lowering of surface energy of the antiglare layer. As a result, a problem of degrading antireflection efficiency is caused when the antiglare layer is overcoated with a low refractive index layer. It is thought that this problem results from aggravation of microscopic unevenness incapable of visual observation on the low refractive index layer which is consequent on deterioration in wettability of a curable composition used for formation of the low refractive index layer. For solving such a problem, it is found to be effective that the surface energy of the antiglare layer is controlled to within a certain range, preferably the range of 20 mN·m$^{-1}$ to 50 mN·m$^{-1}$, far preferably the range of 30 mN·m$^{-1}$ to 40 mN·m$^{-1}$, by adjusting the structure and addition amount of a fluoropolymer used. For achieving the surface energy as specified above, it is required that F/C as the ratio between a peak of fluorine origin and a peak of carbon origin, as measured by X-ray photoelectron spectroscopy, be from 0.1 to 1.5.

Alternatively, it is possible to achieve the purpose of controlling the surface energy of the antiglare layer before coating of a low refractive index layer to within the range as specified above by selection of a fluoropolymer extractable with a solvent for forming an upper layer in the case of coating the upper layer, which makes it possible to avoid uneven distribution of the fluoropolymer at the lower layer surface (interface) and contribute to adhesion between the upper layer and the lower layer, and thereby avoid reduction in surface free energy permitting formation of a low refractive index layer with uniform surface condition and strong scratch resistance even in high-speed coating. Examples of such a material are acrylic or methacrylic resins characterized by inclusion of repeating units derived from the following monomers (iii) and copolymers of these monomers and the following vinyl monomers (iv) copolymerizable therewith.

(iii) Fluorinated Aliphatic Group-containing Monomer Represented by the Following Formula (c):

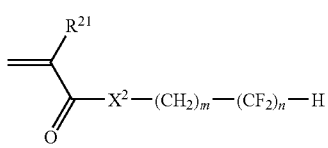

Formula (c)

In formula (c), R$^{21}$ represents a hydrogen atom, a halogen atom or a methyl group, preferably a hydrogen atom or a methyl group. X$^2$ represents an oxygen atom, a sulfur atom or —N(R$^{22}$)—, preferably an oxygen atom or —N(R$^{22}$)—, far preferably an oxygen atom. m represents an integer of 1 to 6 (preferably 1 to 3, far preferably 1), and n represents an integer of 1 to 18 (preferably 4 to 12, far preferably 6 to 8). R$^{22}$ represents a hydrogen atom or a 1-8C alkyl group which may have a substituent, preferably a hydrogen atom or a 1-4C alkyl group, far preferably a hydrogen atom or a methyl group. X$^2$ is preferably an oxygen tom.

Additionally, two or more varieties of fluorinated aliphatic group-containing monomers represented by formula (c) may be contained as constituents in such a fluoropolymer as defined above.

(iv) Monomer copolymerizable with (iii) and Represented by the Following Formula (d):

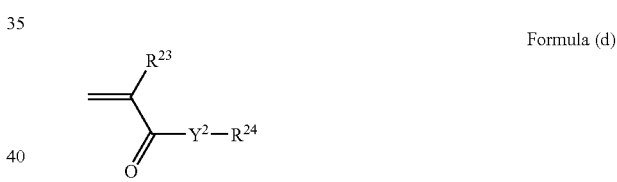

Formula (d)

In formula (d), R$^{23}$ represents a hydrogen atom, a halogen atom or a methyl group, preferably a hydrogen atom or a methyl group. Y$^2$ represents an oxygen atom, a sulfur atom or —N(R$^{25}$)—, preferably an oxygen atom or —N(R$^{25}$)—, far preferably an oxygen atom. R$^{25}$ represents a hydrogen atom or a 1-8C alkyl group, preferably a hydrogen atom or a 1-4C alkyl group, far preferably a hydrogen atom or a methyl group.

R$^{24}$ represents a 1-20C straight-chain, branched or cyclic alkyl group which may have a substituent, a poly(alkyleneoxy) group-containing alkyl group, or an aromatic group which may have a substituent (e.g., a phenyl or naphthyl group). Of these groups, 1-12C straight-chain, branched and cyclic alkyl groups and aromatic groups each containing 6 to 18 carbon atoms in total are preferred over the others, and 1-8C straight-chain, branched and cyclic alkyl groups in particular are favorable.

Examples of the specific structure of a fluoropolymer containing repeating units corresponding to fluorinated aliphatic group-containing monomers represented by formula (c) are illustrated below, but such a fluoropolymer should not be construed as being limited to those illustrated below. The figures in each structural formula indicate mole fractions of constituent monomers. Mw stands for mass-average molecular weight.

$$-(CH_2-C(R))_{100}-$$
$$CO_2-CH_2-(CF_2)_n-H$$

| | R | n | Mw |
|---|---|---|---|
| P-1 | H | 4 | 8000 |
| P-2 | H | 4 | 16000 |
| P-3 | H | 4 | 33000 |
| P-4 | CH$_3$ | 4 | 12000 |
| P-5 | CH$_3$ | 4 | 28000 |
| P-6 | H | 6 | 8000 |
| P-7 | H | 6 | 14000 |
| P-8 | H | 6 | 29000 |
| P-9 | CH$_3$ | 6 | 10000 |
| P-10 | CH$_3$ | 6 | 21000 |
| P-11 | H | 8 | 4000 |
| P-12 | H | 8 | 16000 |
| P-13 | H | 8 | 31000 |
| P-14 | CH$_3$ | 8 | 3000 |

$$-(CH_2-C(R^1))_x-(CH_2-C(R^2))_{100-x}-$$
$$CO_2-(CH_2)_p-(CF_2)_q-H \quad CO_2-(CH_2)_r-(CF_2)_s-H$$

| | x | R$^1$ | p | q | R$^2$ | r | s | Mw |
|---|---|---|---|---|---|---|---|---|
| P-15 | 50 | H | 1 | 4 | CH$_3$ | 1 | 4 | 10000 |
| P-16 | 40 | H | 1 | 4 | H | 1 | 6 | 14000 |
| P-17 | 60 | H | 1 | 4 | CH$_3$ | 1 | 6 | 210000 |
| P-18 | 10 | H | 1 | 4 | H | 1 | 8 | 11000 |
| P-19 | 40 | H | 1 | 4 | H | 1 | 8 | 16000 |
| P-20 | 20 | H | 1 | 4 | CH$_3$ | 1 | 8 | 8000 |
| P-21 | 10 | CH$_3$ | 1 | 4 | CH$_3$ | 1 | 8 | 7000 |
| P-22 | 50 | H | 1 | 6 | CH$_3$ | 1 | 6 | 12000 |
| P-23 | 50 | H | 1 | 6 | CH$_3$ | 1 | 6 | 22000 |
| P-24 | 30 | H | 1 | 6 | CH$_3$ | 1 | 6 | 5000 |

$$-(CH_2-C(R^1))_x-(CH_2-C(R^2))_{100-x}-$$
$$CO_2-CH_2-(CF_2)_n-H \quad CO_2-R^3$$

| | x | R$^1$ | n | R$^2$ | R$^3$ | Mw |
|---|---|---|---|---|---|---|
| FP-148 | 80 | H | 4 | CH$_3$ | CH$_3$ | 11000 |
| FP-149 | 90 | H | 4 | H | C$_4$H$_9$(n) | 7000 |
| FP-150 | 95 | H | 4 | H | C$_6$H$_{13}$(n) | 5000 |
| FP-151 | 90 | CH$_3$ | 4 | H | CH$_2$CH(C$_2$H$_5$)C$_4$H$_9$(n) | 15000 |
| FP-152 | 70 | H | 6 | CH$_3$ | C$_2$H$_5$ | 18000 |
| FP-153 | 90 | H | 6 | CH$_3$ | ⌬ | 12000 |
| FP-154 | 80 | H | 6 | H | C$_4$H$_9$(sec) | 9000 |
| FP-155 | 90 | H | 6 | H | C$_{12}$H$_{25}$(n) | 21000 |
| FP-156 | 60 | CH$_3$ | 6 | H | CH$_3$ | 15000 |
| FP-157 | 60 | H | 8 | H | CH$_3$ | 10000 |
| FP-158 | 70 | H | 8 | H | C$_2$H$_5$ | 24000 |
| FP-159 | 70 | H | 8 | H | C$_4$H$_9$(n) | 5000 |
| FP-160 | 50 | H | 8 | H | C$_4$H$_9$(n) | 16000 |
| FP-161 | 80 | H | 8 | CH$_3$ | C$_4$H$_9$(iso) | 13000 |
| FP-162 | 80 | H | 8 | CH$_3$ | C$_4$H$_9$(t) | 9000 |
| FP-163 | 60 | H | 8 | H | ⌬ | 7000 |
| FP-164 | 80 | H | 8 | H | CH$_2$CH(C$_2$H$_5$)C$_4$H$_9$(n) | 8000 |
| FP-165 | 90 | H | 8 | H | C$_{12}$H$_{25}$(n) | 6000 |
| FP-166 | 80 | CH$_3$ | 8 | CH$_3$ | C$_4$H$_9$(sec) | 18000 |
| FP-167 | 70 | CH$_3$ | 8 | CH$_3$ | CH$_3$ | 22000 |
| FP-168 | 70 | H | 10 | CH$_3$ | H | 17000 |
| FP-169 | 90 | H | 10 | H | H | 9000 |
| FP-170 | 95 | H | 4 | CH$_3$ | —(CH$_2$CH$_2$O)$_2$—H | 18000 |
| FP-171 | 80 | H | 4 | H | —(CH$_2$CH$_2$O)$_2$—CH$_3$ | 16000 |
| FP-172 | 80 | H | 4 | H | —(C$_3$H$_6$O)$_7$—H | 24000 |
| FP-173 | 70 | CH$_3$ | 4 | H | —(C$_3$H$_6$O)$_{13}$—H | 18000 |
| FP-174 | 90 | H | 6 | H | —(CH$_2$CH$_2$O)$_2$—H | 21000 |
| FP-175 | 90 | H | 6 | CH$_3$ | —(CH$_2$CH$_2$O)$_8$—H | 9000 |
| FP-176 | 80 | H | 6 | H | —(CH$_2$CH$_2$O)$_2$—C$_4$H$_9$(n) | 12000 |
| FP-177 | 80 | H | 6 | H | —(C$_3$H$_6$O)$_7$—H | 34000 |
| FP-178 | 75 | F | 6 | H | —(C$_3$H$_6$O)$_{13}$—H | 11000 |
| FP-179 | 85 | CH$_3$ | 6 | CH$_3$ | —(C$_3$H$_6$O)$_{20}$—H | 18000 |
| FP-180 | 95 | CH$_3$ | 6 | CH$_3$ | —CH$_2$CH$_2$OH | 27000 |
| FP-181 | 80 | H | 8 | CH$_3$ | —(CH$_2$CH$_2$O)$_8$—H | 12000 |
| FP-182 | 95 | H | 8 | H | —(CH$_2$CH$_2$O)$_9$—CH$_3$ | 20000 |
| FP-183 | 90 | H | 8 | H | —(C$_3$H$_6$O)$_7$—H | 8000 |
| FP-184 | 95 | H | 8 | H | —(C$_3$H$_6$O)$_{20}$—H | 15000 |
| FP-185 | 90 | F | 8 | H | —(C$_3$H$_6$O)$_{13}$—H | 12000 |
| FP-186 | 80 | H | 8 | CH$_3$ | —(CH$_2$CH$_2$O)$_2$—H | 20000 |
| FP-187 | 95 | CH$_3$ | 8 | H | —(CH$_2$CH$_2$O)$_9$—CH$_3$ | 17000 |
| FP-188 | 90 | CH$_3$ | 8 | H | —(C$_3$H$_6$O)$_7$—H | 34000 |
| FP-189 | 80 | H | 10 | H | —(CH$_2$CH$_2$O)$_3$—H | 19000 |
| FP-190 | 90 | H | 10 | H | —(C$_3$H$_6$O)$_7$—H | 8000 |
| FP-191 | 80 | H | 12 | H | —(CH$_2$CH$_2$O)$_7$—CH$_3$ | 7000 |
| FP-192 | 95 | CH$_3$ | 12 | H | —(C$_3$H$_6$O)$_7$—H | 10000 |

$$-(CH_2-C(R^1))_x-(CH_2-C(R^2))_{100-x}-$$
$$CO_2-(CH_2)_p-(CF_2)_q-H \quad CO_2-R^3$$

| | x | R$^1$ | p | q | R$^2$ | R$^3$ | Mw |
|---|---|---|---|---|---|---|---|
| FP-193 | 80 | H | 2 | 4 | H | C$_4$H$_9$(n) | 18000 |
| FP-194 | 90 | H | 2 | 4 | H | —(CH$_2$CH$_2$O)$_9$—CH$_3$ | 16000 |
| FP-195 | 90 | CH$_3$ | 2 | 4 | F | C$_6$H$_{13}$(n) | 24000 |
| FP-196 | 80 | CH$_3$ | 1 | 6 | F | C$_4$H$_9$(n) | 18000 |
| FP-197 | 95 | H | 2 | 6 | H | —(C$_3$H$_6$O)$_7$—H | 21000 |
| FP-198 | 90 | CH$_3$ | 3 | 6 | H | —CH$_2$CH$_2$OH | 9000 |
| FP-199 | 75 | H | 1 | 8 | F | CH$_3$ | 12000 |
| FP-200 | 80 | H | 2 | 8 | H | CH$_2$CH(C$_2$H$_5$)C$_4$H$_9$(n) | 34000 |
| FP-201 | 90 | CH$_3$ | 2 | 8 | H | —(C$_3$H$_6$O)$_7$—H | 11000 |
| FP-202 | 80 | H | 3 | 8 | CH$_3$ | CH$_3$ | 18000 |
| FP-203 | 90 | H | 1 | 10 | F | C$_4$H$_9$(n) | 27000 |
| FP-204 | 95 | H | 2 | 10 | H | —(CH$_2$CH$_2$O)$_9$—CH$_3$ | 12000 |
| FP-205 | 85 | CH$_3$ | 2 | 10 | CH$_3$ | C$_4$H$_9$(n) | 20000 |
| FP-206 | 80 | H | 1 | 12 | H | C$_6$H$_{13}$(n) | 8000 |
| FP-207 | 90 | H | 1 | 12 | H | —(C$_3$H$_6$O)$_{13}$—H | 15000 |
| FP-208 | 60 | CH$_3$ | 3 | 12 | CH$_3$ | C$_2$H$_5$ | 12000 |
| FP-209 | 60 | CH$_3$ | 1 | 16 | H | CH$_2$CH(C$_2$H$_5$)C$_4$H$_9$(n) | 20000 |
| FP-210 | 80 | CH$_3$ | 1 | 16 | H | —(CH$_2$CH$_2$O)$_2$—C$_4$H$_9$(n) | 17000 |
| FP-211 | 90 | H | 1 | 18 | H | —CH$_2$CH$_2$OH | 34000 |
| FP-212 | 60 | H | 3 | 18 | CH$_3$ | CH$_3$ | 19000 |

1-(15) Thickener

In the present film, a thickener may be used for adjustment to the viscosity of a coating solution.

The term "thickener" as used herein means a compound which brings about an increase in viscosity of a solution when added thereto, and the increment in viscosity of a coating solution by addition of a thickener is preferably from 0.05 to 50 cP (0.05 to 50 mPa·s), far preferably from 0.10 to 20 cP (0.10 to 20 mPa·s), especially preferably from 0.10 to 10 cP (0.10 to 10 mPa·s).

Examples of such a thickener include the following compounds, but thickeners usable herein should not be construed as being limited to these examples.

Poly-ε-caprolactone
Poly-ε-caprolactone diol
Poly-ε-caprolactone triol
Polyvinyl acetate
Poly(ethylene adipate)
Poly(1,4-butylene adipate)
Poly(1,4-butylene glutarate)
Poly(1,4-butylene succinate)
Poly(1,4-butylene terephthalate)
Poly(ethylenetere phthalate)
Poly(2-methyl-1,3-propylene adipate)
Poly(2-methyl-1,3-propylene glutarate)
Poly(neopentyl glycol adipate)
Poly(neopentyl glycol sebacate)
Poly(1,3-propylene adipate)
Poly(1,3-propylene glutarate)
Polyvinyl butyral
Polyvinyl formal
Polyvinyl acetal
Polyvinyl propanal
Polyvinyl hexanal
Polyvinyl pyrrolidone
Polyacrylic acid ester
Polymethacrylic acid ester
Cellulose acetate
Cellulose propionate
Cellulose acetate butyrate In addition to these compounds, known viscosity adjusters and thixotropic nature-imparting agents, including smectite, fluorotetrasilicon mica, bentonite, silica, montmorillonite and sodium polyacrylate as disclosed in JP-A-8-325491, and ethyl cellulose, polyacrylic acid and organic clay as disclosed in JP-A-10-219136, can be used.

1-(16) Coating Solvent

A wide variety of solvents chosen in view of solubility or dispersibility of various components, easiness with which uniformity of a coating surface condition is attained in coating and drying processes, possibility of ensuring stability of solutions and possession of moderate saturation vapor pressure can be used as solvents for coating compositions to form various layers constituting the present film.

A mixture of two or more kinds of solvents may be used. Form the viewpoint of drying load in particular, it is preferable that a solvent having a boiling point of 100° C. or below at room temperature under normal pressure is used as a main component and mixed with a small amount of solvent having a boiling point higher than 100° C. for making adjustment to drying speed.

Examples of a solvent having a boiling point of 100° C. or below include hydrocarbons, such as hexane (bp 68.7° C.), heptane (bp 98.4° C.), cyclohexane (bp 80.7° C.) and benzene (bp 80.1° C.); halogenated hydrocarbons, such as dichloromethane (bp 39.8° C.), chloroform (bp 61.2° C.), carbon tetrachloride (bp 76.8° C.), 1,2-dichloroethane (bp 83.5° C.) and trichloroethylene (bp 87.2° C.); ethers, such as diethyl ether (bp 34.6° C.), diisopropyl ether (bp 68.5° C.), dipropyl ether (90.5° C.) and tetrahydrofuran (bp 66° C.); esters, such as ethyl formate (bp 54.2° C.), methyl acetate (bp 57.8° C.), ethyl acetate (bp 77.1° C.) and isopropyl acetate (89° C.); ketones, such as acetone (bp 56.1° C.) and 2-butanone (the same as methyl ethyl ketone, bp 79.6° C.); alcohol compounds, such as methanol (bp 64.5° C.), ethanol (bp 78.3° C.), 2-propanol (bp 82.4° C.) and 1-propanol (97.2° C.); cyano compounds, such as acetonitrile (bp 81.6° C.) and propionitrile (bp 97.4° C.); and carbon disulfide (bp 46.2° C.). Of these solvents, ketones and esters, especially ketones, are preferred over the others. Of ketones, 2-butanone in particular is favored.

Examples of a solvent having a boiling point higher than 100° C. include octane (bp 125.7° C.), toluene (bp 110.6° C.), xylene (bp 138° C.), tetrachloroethylene (bp 121.2° C.), chlorobenzene (p 131.7° C.), dioxane (bp 101.3° C.), dibutyl ether (bp 142.4° C.), isobutyl acetate (bp 118° C.), cyclohexanone (bp 155.7° C.), 2-methyl-4-pentanone (the same as MIBK, bp 115.9° C.), 1-butanol (bp 117.7° C.), N,N-dimethylformamide (bp 153° C.), N,N-dimethylacetamide (bp 166° C.) and dimethyl sulfoxide (bp 189° C.). Of these solvents, cyclohexanone and 2-methyl-4-pentanone are preferred over the others.

1-(17) Others

In addition to the foregoing components, resin, a coupling agent, a coloring inhibitor, a coloring agent (pigment or dye), a defoaming agent, a leveling agent, a flame retardant, a UV absorbent, an IR absorbent, an adhesiveness imparting agent, a polymerization inhibitor, an antioxidant and a surface reformer can be added to the present film.

1-(18) Substrate

The substrate of the present film has no particular restriction, but any of transparent resin film, a transparent resin plate, a transparent resin sheet and transparent glass may be used. Examples of a transparent resin film usable as the substrate include cellulose acylate film (e.g., cellulose triacetate film (refractive index 1.48), cellulose diacetate film, cellulose acetate butyrate film, cellulose acetate propionate film), polyethylene terephthalate film, polyethersulfone film, polyacrylic resin film, polyurethane resin film, polyester film, polycarbonate film, polysulfone film, polyether film, polymethylpentene film, polyether ketone film, (meth)acrylonitrile and polynorbornene resin film (e.g., Arton and Zeonex, trade names).

<Cellulose Acylate Film>

Of the transparent resin films, cellulose acylate films, a cellulose acetate film in particular, generally used as protective films of polarizing plates are preferred over the others because of their high transparency, less birefringence and easiness of production. The thickness of a transparent substrate is generally adjusted to the 25- to 1,000-μm range.

For the cellulose acylate film used in the invention, cellulose acetate having an acetylation degree of 59.0% to 61.5% is used to advantage.

The term "acetylation degree" as used herein means the amount of acetic acid combined per unit mass of cellulose. The acetylation degree conforms to the acetylation degree measurement and calculation based on ASTM: D-817-91 (a testing method for cellulose acetate and the like).

The viscosity-average polymerization degree of cellulose acylate is preferably 250 or above, far preferably 290 or above.

In addition, it is preferable that the cellulose acylate used in the invention has a Mw/Mn value (where Mw is mass-average molecular weight and Mn is number-average molecular weight) close to 1.0 as determined by gel permeation chromatography, namely a narrow molecular-weight distribution. More specifically, the value of Mw/Mn is preferably from 1.0 to 1.7, far preferably from 1.3 to 1.65, especially preferably from 1.4 to 1.6.

In acyl substitution for hydroxyl groups at the 2-, 3- and 6-positions, acyl groups are not always equally distributed to every three positions at a rate of ⅓ the total substitution degree, but there is a tendency to reduce the degree of substitution for 6-position hydroxyl groups. In the invention, however, it is preferable that the substitution degree on the 6-position hydroxyl groups in cellulose acylate is high, compared with each of the substitution degrees on the 2- and 3-position hydroxyl groups.

The degree of acyl substitution on the 6-position hydroxyl groups makes up at least 32%, preferably at least 33%, particularly preferably at least 34%, of the total substitution degree. Further, it is preferable that the degree of acyl substitution on the 6-positions of cellulose acylate is 0.88 or above. Besides being substituted with acetyl groups, the 6-position hydroxyl groups may be substituted with acyl groups containing 3 or more carbon atoms, such as propionyl, butyroyl, valeroyl, benzoyl and acryloyl groups. The substitution degree of each position can be determined by NMR.

Cellulose acylates usable in the invention include the cellulose acetates prepared by the methods described in JP-A-11-5851, Synthesis Example 1 (paragraphs [0043] and [0044]), Synthesis Example 2 (paragraphs [0048] and [0049]) and Synthesis Example 3 (paragraphs [0051] and [0052]).

<Making of Cellulose Acylate Film>

Cellulose acylate films usable in the invention can be made using a solvent cast method (a method for film formation from a solution). In the solvent cast method, film is made using a solution (dope) containing cellulose acylate in an organic solvent.

The organic solvent used therein preferably includes a solvent chosen from 3-12C ethers, 3-12C ketones, 3-12C esters or 1-6C halogenated hydrocarbons. Two or more of these solvents may be used in a mixed state.

Those ethers, ketones and esters may have cyclic structures. A compound having two or more of the ether, ketone and ester functional groups (namely —O—, —CO— and —COO—) can also be used as the organic solvent. The organic solvent may further have other functional groups, such as an alcoholic hydroxyl group. In the case of the organic solvent having two or more different functional groups, it is good enough for the number of carbon atoms contained therein to be within the suitable range of the number specified above with respect to the compounds containing any one kind of the functional groups.

Examples of 3-12C ethers include diisopropyl ether, dimethoxymethane, dimethoxyethane, 1,4-dioxane, 1,3-dioxolane, tetrahydrofuran, anisole and phenetole.

Examples of 3-12C ketones include acetone, methyl ethyl ketone, diethyl ketone, diisobutyl ketone, cyclohexanone and methylcyclohexanone.

Examples of 3-12C esters include ethyl formate, propyl formate, pentyl formate, methyl acetate, ethyl acetate and pentyl acetate.

Examples of organic solvents each having two or more different functional groups include 2-ethoxyethyl acetate, 2-methoxyethanol and 2-butoxyethanol.

The number of carbon atoms in a halogenated hydrocarbon is preferably 1 or 2, especially preferably 1. The halogen of a halogenated hydrocarbon is preferably chlorine. The proportion of halogen substituting for hydrogen atoms in the halogenated hydrocarbon is preferably from 25% to 75% by mole, far preferably from 30% to 70% by mole, further preferably from 35% to 65% by mole, especially preferably from 40% to 60% by mole. Methylene chloride is a representative halogenated hydrocarbon.

Preparation of a cellulose acylate solution (dope) can be carried out using an ordinary method. The expression "ordinary method" means that treatments are carried out at temperatures of 0° C. or above (ordinary temperatures or higher). The solution can be prepared using a dope-preparing method and apparatus as adopted in the usual solvent cast method. In the case of the ordinary method, it is preferable to use a halogenated hydrocarbon (especially methylene chloride) as the organic solvent. Alternatively, non-halogenic solvents can also be used, and examples thereof include those described in *Journal of Technical Disclosure*, Kogi No. 2001-1745, Japan Institute of Invention and Innovation.

The amount of cellulose acylate contained in a solution prepared is adjusted to a range of 10% to 40% by mass, preferably 10% to 30% by mass. To an organic solvent (main solvent), any of the additives as recited below may be added in advance.

The solution can be prepared by mixing cellulose acylate and the organic solvent with stirring at ordinary temperatures (0 to 40° C.). In order to prepare a solution with a high concentration of cellulose acylate, the stirring may be carried out under pressure and heating. More specifically, both cellulose acylate and organic solvent are placed in a pressure vessel and hermetically sealed therein, and stirred under pressure as they are heated at temperatures higher than the boiling point of the solvent under normal atmospheric pressure and not causing boiling of the solvent. The heating temperature is generally 40° C. or above, preferably from 60° C. to 200° C., far preferably from 80° C. to 110° C.

Individual ingredients may be roughly mixed in advance, and then placed in the vessel. Alternatively, they may be placed one after another in the vessel. The vessel is required to be structured to permit stirring. To the vessel, pressure can be applied by injecting an inert gas such as a nitrogen gas, or by utilizing a rise in vapor pressure of the solvent through application heat. Alternatively, individual ingredients may be added under pressure after the vessel is sealed.

When the heating is carried out, the vessel is preferably heated from the outside. For instance, a jacket-type heating device can be used. Alternatively, it is possible to heat the vessel in its entirety by placing a plate heater outside the vessel and circulating a liquid by installation of piping.

It is preferable that an impeller is installed inside the vessel and the ingredients are stirred therewith. The impeller which can be used suitably has such a blade length as to reach the vicinity of the vessel wall. Further, it is preferable that each blade end of the impeller is equipped with a scraping blade for renewal of a liquid film on the vessel wall.

The vessel may be equipped with gauges including a pressure gauge and a temperature gauge. Individual ingredients are dissolved in a solvent inside the vessel. The dope prepared is taken out from the vessel after cooling, or cooled by use of a heat exchanger after it is taken out.

It is also possible to prepare solutions by use of a cold dissolution method. According to a cold dissolution method, it is possible to dissolve cellulose acylate even in organic solvents resistant dissolving cellulose acylate so long as the usual dissolution method is applied. Additionally, even in the case of solvents capable of dissolving cellulose acetate by use of the usual dissolution method, the cold dissolution method can produce an effect of enabling rapid preparation of homogenous solutions.

In the cold dissolution method, it is done in the first place to gradually add cellulose acylate to an organic solvent with stirring at room temperature.

The amount of cellulose acylate dissolved is adjusted to be contained in a proportion of 10% to 40% by mass, preferably 10% to 30% by mass, in the resulting mixture. Further, any of the additives recited below may be previously added to the mixture.

In the next place, the mixture is cooled to temperatures ranging from −100° C. to −10° C. (preferably from −80° C. to −10° C., far preferably from −50° C. to −20° C., especially preferably from −50° C. to −30° C.). The cooling can be performed in a dry ice-methanol bath (−75° C.) or a diethylene glycol bath (−30° C. to −20° C.). By undergoing such cooling, the cellulose acylate-organic solvent mixture is solidified.

The cooling speed is preferably 4° C./min or above, far preferably 8° C./min or above, especially preferably 12° C./min or above. Although the higher cooling speed will bring about the better results, the theoretical upper limit is 10,000° C./min, the technological upper limit is 1,000° C., and the practical upper limit is 100° C./min. Incidentally, the cooling speed is defined as the value obtained by dividing the difference between a temperature at the cooling start time and a final cooling temperature by a time required for reaching from the cooling start temperature to the final cooling temperature.

Further, this solidified matter is heated to temperatures ranging from 0 to 200° C. (preferably from 0 to 150° C., far preferably from 0 to 120° C., especially preferably from 0 to 50° C.) to result in dissolution of cellulose acylate in the organic solvent. The rise of temperature may be carried out by allowing the solidified matter to stand at room temperature, or by heating it in a hot-water bath.

The heating speed is preferably 4° C./min or above, far preferably 8° C./min or above, especially preferably 12° C./min or above. Although the higher heating speed will bring about the better results, the theoretical upper limit is 10,000° C./min, the technological upper limit is 1,000° C., and the practical upper limit is 100° C./min. Incidentally, the heating speed is defined as the value obtained by dividing the difference between a temperature at the heating start time and a final heating temperature by a time required for reaching from the heating start temperature to the final heating temperature.

In the manner as mentioned above, a homogeneous solution can be obtained. When the dissolution is insufficient, cooling and heating operations may be repeated. Whether the dissolution is sufficient or not can be known only by a visual check of the solution obtained.

In the cold dissolution method, it is preferable to use a hermetically sealed vessel in order to avoid contamination by water ascribable to condensation occurring under cooling. In the cooling and heating operations, the time required for dissolution can be shortened by applying pressure during the cooling and reducing the pressure during the heating. In order to carry out the application and reduction of pressure, it is desirable to use a pressure-resistant vessel.

According to examinations by differential scanning calorimetry (DSC), a 20 mass % solution prepared by dissolving cellulose acetate (acetylation degree: 60.9%, viscosity-average polymerization degree: 299) in accordance with the cold dissolution method has a sol-gel pseudo phase transition point in the vicinity of 33° C. and moves into a homogenous gel state when the temperature is lowered to no higher than such a transition point. Therefore, it is required to keep the solution at temperatures higher than the pseudo phase transition temperature, preferably higher than the gel phase transition temperature by about 10° C. Incidentally, this pseudo phase transition temperature varies according to the acetylation degree and viscosity-average polymerization degree of cellulose acetate dissolved, the concentration the solution prepared has, and the organic solvent used.

A cellulose acylate film is made from the thus prepared cellulose acylate solution (dope) in accordance with a solvent cast method.

The dope is flow-cast onto a drum or a band, and the solvent is made to evaporate, thereby forming a film. As to the dope before flow casting, it is preferable that the dope concentration is adjusted to the range of 18 to 35% on a solids basis.

The drum or band surface is preferably polished to a mirror-smooth surface. Details of flow-casting and drying manners in the solvent cast method are described in U.S. Pat. Nos. 2,336,310, 2,367,603, 2,492,078, 2,492,977, 2,492,978, 2,607,704, 2,739,069 and 2,739,070, GB Patent Nos. 640,731 and 736,892, JP-B-45-4554, JP-B-49-5614 and JP-B-62-115035.

The dope is preferably flow-cast onto a drum or band having a surface temperature of 10° C. or below. And it is preferable that the dope thus flow-cast is dried for at least 2 seconds by airing. After the film thus made is peeled away from the drum or band, it is also possible to evaporate the residual solvent by drying with a hot air the temperature of which is changed sequentially from 100° C. to 160° C. Such a process is described in JP-B-5-17844. According to this process, the time period from the flow-cast to the peeling can be shortened. In order to carry out this process, the dope is required to cause gelation at the surface temperature of a drum or band under flow-casting.

A plurality of prepared cellulose acylate solutions (dope) can also be flow-cast in the form of two or more layers by use of the solvent cast method. In this case, the dopes are flow-cast on a drum or band, and form a film through evaporation of their solvent(s). The dope before flow casting is preferably adjusted to have a concentration ranging from 1 to 40 mass % on a solids basis. The drum or band surface is preferably polished to a mirror-smooth surface.

In the case of flow-casting a plurality of cellulose acylate solutions, a film may be formed as the cellulose acylate-containing solutions are flow-cast respectively from a plurality of casting ports, which enables flow-cast of a plurality of cellulose acylate solutions and are provided at intervals along the traveling direction of the support, and superposed on top of each other in layers. To this case, the methods disclosed, e.g., in JP-A-61-158414, JP-A-1-122419 and JP-A-11-198285 are applicable. In addition, the cellulose acylate solutions may be formed into a film by flow casting from two casting ports. This film formation can be performed, e.g., according to the methods disclosed in JP-B-60-27562, JP-A-61-94724, JP-A-61-104813, JP-A-61-158413 and JP-A-6-134933. In accordance with another flow casting method disclosed in JP-A-56-162617, a cellulose acylate film may be formed by a flow of high-viscosity cellulose acylate solution being wrapped up in a low-viscosity cellulose acylate solution and both the high- and low-viscosity cellulose acylate solutions being extruded at the same time.

In still another method, it is possible to make a film by using two casting ports, forming a film on a support by use of a solution from the first casting port and stripping the film off the support, and flow-casting a solution from the second casting port onto the support-contact surface of the film. This is the method disclosed, e.g., in JP-B-44-20235. The flow-cast cellulose acylate solutions may be the same or different, and there is no particular limitations thereto. In order to impart functions to a plurality of cellulose acylate layers, it is enough to extrude cellulose acylate solutions having the corresponding functions from their respective casting ports.

Additionally, the cellulose acylate solution can be flow-cast simultaneously with solutions for other functional layers (e.g., an adhesive layer, a dye layer, an antistatic layer, an antihalation layer, a UV absorbing layer, a polarization layer), thereby achieving the simultaneous formation of film and functional layers.

For attaining the required film thickness by a single-layer solution, it is necessary to extrude a cellulose acylate solution of high concentration and high viscosity. Since such a cellulose acylate solution is poor in stability, solid matter tends to develop therein and often causes a problem that the film formed has pimple trouble or poor planarity. An answer to such a problem consists in flow-casting a plurality of cellulose acylate solutions from casting ports. By doing so, not only solutions of high viscosity can be extruded onto a support at the same time to result in formation of film with improved planarity and excellent surface condition, but also thick cellulose acylate solutions can be used to result in reduction in drying load and speedup in film production.

To the cellulose acylate film, plasticizers can be added for the purpose of improving mechanical properties or increasing the drying speed after flow casting for the film making. As plasticizers, phosphoric acid esters or carboxylic acid esters can be used. Examples of phosphoric acid esters include triphenyl phosphate (TPP), diphenylbiphenyl phosphate and tricresyl phosphate (TCP). Representatives of carboxylic acid esters are phthalic acid esters and citric acid esters. Examples of phthalic acid esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of citric acid esters include triethyl O-acetylcitrate (OACTE) and tributyl O-acetylcitrate (OACTB). Phthalate plasticizers (DMP, DEP, DBP, DOP, DPP, DEHP) are used to advantage. DEP and DPP in particular are favorable.

The amount of plasticizers added is preferably 0.1% to 25% by mass, far preferably 1% to 20% by mass, especially preferably 3% to 15% by mass, of the amount of cellulose acylate used.

To the cellulose acylate film, deterioration inhibitors (e.g., antioxidants, peroxide decomposing agents, radical forbidding agents, metal deactivating agents, acid scavengers, amines) may be added. Details of deterioration inhibitors are described in JP-A-3-199201, JP-A-5-197973, JP-A-5-194789, JP-A-5-271471 and JP-A-6-107854. With consideration given to deterioration inhibitors' effect and bleed-out (ooze-out) of deterioration inhibitors toward the film surface, the addition amount of deterioration inhibitors is preferably 0.01% to 1% by mass, far preferably 0.01% to 0.2% by mass, of the solution prepared (dope). Examples of deterioration inhibitors preferred in particular include butylhydroxytoluene (BHT) and tribenzylamine (TBA).

In the cellulose acylate film, a retardation modifier can be used, if needed, for making an adjustment to film's retardation. It is preferable that the film's retardation is from 0 to 300 nm in the thickness direction and from 0 to 1,000 nm in the in-plane direction.

The compound suitable as a retardation elevating agent is an aromatic compound having at least two aromatic rings, and such an aromatic compound is used in an amount of 0.01 to 20 parts by mass per 100 parts by mass of cellulose acylate. In the case of cellulose acetate, it is preferable that such an aromatic compound is used in an amount of 0.05 to 15 parts by mass, especially 0.1 to 10 parts by mass, per 100 parts by mass of cellulose acetate. Two or more of such aromatic compounds may be used in combination.

Details of such agents are described in JP-A-2000-111914, JP-A-2000-275434, JP-A-2002-236215 and WO 00/065384 pamphlet.

<Stretch Processing of Cellulose Acylate Film>

By further undergoing stretch processing, the cellulose acylate film formed can be improved in unevenness developing under drying, nonuniformity of film thickness caused by drying shrinkage and surface roughness profile. In addition, the stretch processing can also be utilized for retardation adjustment.

The stretch processing in the width direction has no particular restriction as to the method applicable thereto, but as an example thereof the stretch processing with a tenter can be given.

It is further preferable to carry out longitudinal stretching in the length direction of roll, and the longitudinal stretching becomes possible between pass rolls for feeding a roll film by controlling a draw ratio of each individual pass roll (rotation ratio between pass rolls).

<Polyethylene Terephthalate Film>

In the invention, polyethylene terephthalate film is also used to advantage because of its outstanding transparency, mechanical strength, planarity, chemical resistance and moisture resistance, and besides, its cheapness.

For the purpose of enhancing adhesion force between a transparent plastic film and a hard coating layer provided thereon, it is preferable by far that the transparent plastic film used is a film having undergone ease-of-adhesion treatment.

Examples of a commercially available optical PET film coated with ease-of-adhesion layer include COSMOSHINE A4100 and A4300, made by Toyobo Co., Ltd.

2. Layers Constituting Film

The present film can be obtained by mixing a wide variety of compounds as recited above as various combinations and applying them into layers. Next the layers constituting the present film are described below.

2-(1) Hard Coating Layer

For the purpose of giving physical strength to the present film, a hard coating layer is preferably provided on one surface of a transparent substrate.

It is preferable to make up an antireflective film by providing a low refractive index layer on the hard coating layer, and it is preferable by far that a medium refractive index layer and a high refractive index layer are further provided between the hard coating layer and the low refractive index layer.

The hard coating layer may be a layered product of two or more layers.

From a viewpoint of optical design for obtaining an antireflective film in the invention, the refractive index of the hard coating layer is preferably from 1.48 to 2.00, far preferably from 1.52 to 1.90, especially preferably from 1.55 to 1.80. Since at least one low refractive index layer is present on the hard coating layer in the invention, there are tendencies to reduce antireflective properties when the refractive index is below the foregoing range and intensify the color of reflected light when the refractive index is beyond the foregoing range.

From the viewpoints of giving sufficient durability and impact resistance to the film, the thickness of the hard coating layer is generally from 0.5 μm to 50 μm, preferably from 1 μm to 20 μm, far preferably from 2 μm to 10 μm, especially preferably from 3 μm to 7 μm.

In addition, the strength of the hard coating layer, as evaluated by pencil hardness testing, is preferably at least H, far preferably at least 2H, especially preferably at least 3H.

Further, in the Taber test performed in compliance with JIS K5400, the lower the abrasion loss determined from sample pieces after and before the test, the more suitable as hard coating layer the sample tested.

The hard coating layer is preferably formed by cross-linking reaction or polymerization reaction of ionizing radiation curable compound. More specifically, the hard coating layer can be formed by applying a coating composition containing an ionizing radiation curable multifunctional monomer or oligomer to a transparent substrate and subjecting the multifunctional monomer or oligomer to cross-linking reaction or polymerization reaction.

As functional groups of an ionizing radiation curable multifunctional monomer or oligomer, photo-, electron beam- or radiation-polymerizable functional groups, especially photo-polymerizable functional groups, are suitable.

Examples of a photo-polymerizable functional group include unsaturated polymerizable functional groups, such as a (meth)acryloyl group, a vinyl group, a styryl group and an allyl group. Of these groups, a (meth)acryloyl group is preferred over the others.

For the purpose of contributing an internal scattering property, matting particles having an average diameter of 1.0 to 10.0 μm, preferably 1.5 to 7.0 μm, formed of an inorganic compound or resin, may be included in the hard coating layer.

For the purpose of controlling the refractive index of the hard coating layer, a high refractive index monomer or inorganic particles, or both can be added to a binder of the hard coating layer. The addition of inorganic particles has an effect of reducing curing shrinkage by cross-linking reaction besides a refractive index controlling effect. In the invention, an integrated whole that is made up of a polymer produced by polymerization of the multifunctional monomer and/or high refractive index monomer and inorganic particles dispersed in the polymer is referred to as the binder.

2-(2) Antiglare Layer

An antiglare layer is formed for the purpose of contributing not only an antiglare quality by surface scattering but also a quality as a hard coating, preferably by enhancing film's scratch resistance, to the film.

As to methods utilizable for creating an antiglare quality, there are known the method as disclosed in JP-A-6-16851, wherein a mat-form pattered film having microscopic asperities on the surface is stacked to create an antiglare quality; the method as disclosed in JP-A-2000-206317, wherein an antiglare quality is created by curing shrinkage of ionizing radiation curable resin caused by difference in dose of ionizing radiation; the method as disclosed in JP-A-2000-338310, wherein translucent particulates and a translucent resin are solidified while gelling them through reduction in mass ratio of a good solvent for the translucent resin by drying, thereby forming asperities on the coating surface; and the method as disclosed in JP-A-2000-275404, wherein surface roughness is formed by external pressure.

The antiglare layer usable in the invention contains as essential components a binder capable of contributing a hard coating quality, translucent particles capable of contributing an antiglare quality and a solvent, and it is preferable that individual translucent particles or aggregates each including a plurality of particles form protrusions on the surface to result in surface roughness.

An antiglare layer formed by dispersion of matting particles is made up of a binder and translucent particles dispersed therein. The antiglare layer having an antiglare quality preferably combines an antiglare quality and a hard coating quality.

Examples of the matting particles include particles of inorganic compounds, such as silica particles and $TiO_2$ particles; and resin particles, such as acrylic resin particles, cross-linked acrylic resin particles, polystyrene particles, cross-linked styrene particles, melamine resin particles and benzoguanamine resin particles. Of these particles, cross-linked styrene particles, cross-linked acrylic resin particles and silica particles are preferred over the others.

The matting particles usable herein may have either a spherical shape or an irregular shape. Two or more types of matting particles different in particle diameter may be used in combination. It is possible to contribute an antiglare quality by use of matting particles greater in particle diameter and other optical properties by use of matting particles smaller in particle diameter. For instance, when an antiglare antireflective film is stacked on a high-definition display of 133 ppi or above, there sometimes occurs the defective condition referred to as "glare" in terms of displayed image quality. Such a "glare" originates from a loss in uniformity of brightness through magnification or reduction of picture elements by asperities present on the antiglare antireflective film surface, and it can be improved significantly by additional use of matting particles smaller in particle size than the matting particles for giving an antiglare quality and different in refractive index from the binder.

The matting particles are incorporated into the antiglare layer so as to have a content in the antiglare layer formed within the range of 10 to 1,000 $mg/m^2$, preferably 100 to 700 $mg/m^2$.

The particle size distribution of the matting particles is determined by Coulter Counter method, and the distribution determined is converted into the particle count distribution.

The thickness of the antiglare layer is preferably from 1 to 10 μm, far preferably from 1.2 to 8 μm. When the antiglare layer is too thin, its hard coating quality deteriorates; while, when it is too thick, there sometimes occurs reduction in working suitability through aggravation of curling and brittleness.

On the other hand, the center-line average roughness (Ra) of the antiglare layer surface is preferably from 0.10 to 0.40 μm. When Ra is greater than 0.40 μm, there arise problems of glare and surface whitening at the time of reflection of external light. In addition, the definition of transmission images is preferably from 5 to 60%.

The strength of the antiglare layer, as evaluated by pencil hardness testing, is preferably at least H, far preferably at least 2H, especially preferably at least 3H.

2-(3) High Refractive Index Layer and Medium Refractive Index Layer

By having a high refractive index layer and a medium refractive index layer in the present film, antireflection of the film can be enhanced.

Hereinafter, the high refractive index layer and the medium refractive index layer are sometimes collectively called high refractive index layers. Incidentally, the adjectives "high", "medium" and "low" in the terms "high refractive index layer", "medium refractive index layer" and "low refractive index layer" signify a relative magnitude relation among refractive indexes of layers. As for a refractive index relation with the transparent substrate, it is preferable to satisfy the relations:

Transparent substrate>Low refractive index layer, and High refractive index layer>Transparent substrate.

Sometimes in this specification a high refractive index layer, a medium refractive index layer and a low refractive index layer are collectively called "antireflective layer".

In the case of forming an antireflective layer by providing a low refractive index layer on a high refractive index layer, the refractive index of the high refractive index layer is preferably from 1.55 to 2.40, far preferably from 1.60 to 2.20, further preferably from 1.65 to 2.10, especially preferably from 1.80 to 2.00.

In the case of forming an antireflective layer by providing a medium refractive index layer, a high refractive index layer and a low refractive index layer in order of increasing distance from the substrate, the refractive index of the high refractive index layer is preferably from 1.65 to 2.40, far preferably from 1.70 to 2.20. The refractive index of the medium refractive index layer is adjusted to a value intermediate between the refractive index of the low refractive index layer and that of the high refractive index layer. The refractive index of the medium refractive index layer is preferably from 1.55 to 1.80.

For formation of the high refractive index layer and the medium refractive index layer, inorganic particles containing $TiO_2$ as a main component are used in a state of dispersion. The inorganic particles are dispersed into a dispersion medium in the presence of a dispersing agent.

The high refractive index layer and the medium refractive index layer for use in the invention are preferably formed in the following manner: A coating composition for each of the high refractive index layer and the medium refractive index layer is prepared by adding a binder, preferably binder precursors required for matrix formation (e.g., ionizing radiation curable multifunctional monomers or oligomers) and a photo polymerization initiator, to a dispersion of inorganic particles dispersed in a dispersion medium, and applied to a transparent substrate, and further cured through cross-linking reaction or polymerization reaction of the ionizing radiation curable compounds (e.g., the multifunctional monomers or oligomers), thereby forming each of the high refractive index layer and the medium refractive index layer.

Further, it is preferable that the binders for the high refractive index layer and the medium refractive index layer are made to undergo cross-linking reaction or polymerization reaction with dispersing agents simultaneously with or subsequently to coating of the layers.

The thus prepared binders for the high refractive index layer and the medium refractive index layer have a structure that anionic groups of the preferable dispersing agents as recited hereinbefore are integrated into the binders by cross-linking or polymerization reaction of the dispersing agents with ionizing radiation curable multifunctional monomers or oligomers. Further, the anionic groups in such binders of the high refractive index layer and the medium refractive index layer have a function of holding a dispersion state of inorganic particles and the cross-linked or polymerized structure contributes film forming power to the binders, thereby resulting in enhancement of mechanical strength, chemical resistance and weather resistance of the inorganic particles-incorporated high and medium refractive index layers.

In the high refractive index layer, the amount of binder added is 5 to 80% by mass of the total solids content in a coating composition for the layer.

The content of inorganic particles in the high refractive index layer is preferably 10 to 90% by mass, far preferably 15 to 80% by mass, particularly preferably 15 to 75% by mass, of the high refractive index layer. Two or more kinds of inorganic particles may be used as a combination in the high refractive index layer.

In the case of having a low refractive index layer on the high refractive index layer, it is preferable that the refractive index of the high refractive index layer is higher than the refractive index of a transparent substrate.

In the high refractive index layer, a binder obtained by cross-linking reaction or polymerization reaction of an ionizing radiation curable compound containing an aromatic ring, an ionizing ration curable compound containing a halogenation element other than fluorine (e.g., Br, I, Cl), or an ionizing radiation curable compound containing an S, N or P atom can also be used to advantage.

The thickness of the high refractive index layer can be designed appropriately according to its intended use. When the high refractive index layer is used as an optical interference layer as described below, the thickness thereof is preferably from 30 to 200 nm, far preferably from 50 to 170 nm, particularly preferably from 60 to 150 nm.

As to haze of the high refractive index layer, the lower the better unless the layer contains particles adding an antiglare function thereto. The haze is preferably 5% or below, far preferably 3% or below, particularly preferably 1% or below.

The high refractive index layer is preferably formed on the transparent substrate directly or via another layer.

2-(4) Low Refractive Index Layer

For reduction in reflectance of the present film, it is required to use a low refractive index layer.

The refractive index of the low refractive index layer is preferably from 1.20 to 1.46, far preferably from 1.25 to 1.46, particularly preferably from 1.30 to 1.46.

The thickness of the low refractive index layer is preferably from 50 to 200 nm, far preferably from 70 to 100 nm. The haze of the low refractive index layer is preferably 3% or below, far preferably 2% or below, especially preferably 1% or below. The strength of the low refractive index layer, as evaluated by the pencil hardness test under a load of 500 g, is preferably at least H, far preferably at least 2H, especially preferably at least 3H.

In addition, for improvement in soil resistance of the optical film, it is appropriate that the contact angle of the film surface with respect to water be 90° or above, preferably 95° or above, particularly preferably 100° or above.

The curable composition for forming the low refractive index layer is preferably a composition containing (A) a fluorine-containing polymer as recited hereinbefore, (B) inorganic particles and (C) an organosilane compound.

In the low refractive index layer, a binder is used for dispersion and fixation of the fine particles according to the invention. Although the binders recited in the description of the hard coating layer are usable, it is preferable to use a binder which has a low refractive index in itself, such as a fluorine-containing polymer or a fluorine-containing sol-gel material. The material suitable as a fluorine-containing polymer or a fluorine-containing sol-gel material is a material capable of forming cross-links by application of heat or ionizing radiation and ensuring a kinetic friction coefficient of 0.03 to 0.30 and a water contact angle of 85° to 120° at the surface of the low refractive index layer formed.

2-(5) Antistatic Layer or Conductive Layer

In the invention, formation of an antistatic layer is favorable from the viewpoint of preventing static buildup on the film surface. Examples of a method for forming an antistatic layer include methods hitherto known, such as a method of coating a conductive coating solution containing conductive particulates and a reactive cure resin and a method of forming a conductive thin film by evaporating or sputtering a metal or metal oxide capable forming a transparent film. A conductive layer can be formed on a substrate directly or via a primer layer for promoting adhesion to the substrate. Alternatively, it is also possible to use an antistatic layer as a part of the antireflective film. In this case, sufficient static protection can be given to the film by using an antistatic layer as a layer located near the topmost layer even when the film thickness is small.

The thickness of an antistatic layer is preferably from 0.01 to 10 μm, far preferably from 0.03 to 7 μm, further preferably from 0.05 to 5 μm. The surface resistance of an antistatic layer is preferably from $10^5$ to $10^{12}$ Ω/sq, far preferably from $10^5$ to $10^9$ Ω/sq, especially preferably from $10^5$ to $10^8$ Ω/sq. The surface resistance of an antistatic layer can be determined by a 4-tip probe method.

It is appropriate that the antistatic layer be transparent in a substantial sense. In the concrete, the haze of the antistatic layer is preferably 10% or below, far preferably 5% or below, further preferably 3% or below, especially preferably 1% or below. It is advantageous for the antistatic layer to have a transmittance of 50% or above, preferably 60% or above, far preferably 65% or above, especially preferably 70% or more, with respect to light of a wavelength of 550 nm.

It is favorable in the invention that the antistatic layer has high strength. The specific strength of the antistatic layer, as evaluated by the pencil hardness test under a load of 1 kg, is preferably at least H, far preferably at least 2H, further preferably at least 3H, especially preferably at least 4H.

2-(6) Soil-resistant Layer

A soil-resistant layer can be provided as the topmost layer of the present film. The soil-resistant layer is a layer lowering the surface energy of an antireflective layer and resisting adhesion of hydrophilic or lipophilic soil.

The soil-resistant layer can be formed by use of a fluorine-containing polymer or an anti-soiling agent.

The thickness of the soil-resistant layer is preferably from 2 to 100 nm, far preferably from 5 to 30 nm.

2-(7) Interference Unevenness (Rainbow-hued Unevenness) Preventive Layer

When there is a substantial difference in refractive index (0.03 or above) between the transparent substrate and the hard coating layer, or between the transparent substrate and the antiglare layer, reflections of light occur at the interface between the transparent substrate and the hard coating layer, or at the interface between the transparent substrate and the antiglare layer. This reflected light interferes with the light reflected off the antireflective layer surface, and sometimes gives rise to interference unevenness attributable to subtle unevenness in thickness of the hard coating layer (or the antiglare layer). With the intention of preventing such interference unevenness, it is possible to provide an interference unevenness preventive layer having a medium refractive index np and a thickness dp satisfying the following equation between the transparent substrate and the hard coating layer (or the antiglare layer):

$$dp=(2N-1)\times\lambda/(4np)$$

wherein λ is a wavelength of visible light, which may be any value within the range of 450 to 650 nm, and N is a natural number.

When the antireflective film is bonded to an image display, a pressure-sensitive adhesive layer (or an adhesive layer) is sometimes stacked on the side of the transparent substrate where the antireflective layer is not stacked. In this mode, reflections of light occur at the interface between the transparent substrate and the pressure-sensitive adhesive layer (or an adhesive layer) when a substantial difference in refractive index (0.03 or above) is present between the transparent substrate and the pressure-sensitive adhesive layer (or the adhesive layer), and this reflected light interferes with the light reflected off the antireflective layer surface and, in some cases, gives rise to interference unevenness attributable to unevenness in thickness of the substrate and the hard coating layer as in the above case. With the intention of preventing such interference unevenness, it is possible to provide the same interference unevenness preventive layer as mentioned above on the side of the transparent substrate opposite to the antireflection layer's side.

Details of such an interference unevenness preventive layer are described in JP-A-2004-345333, and the interference unevenness preventive layers presented in therein can be used in the invention also.

2-(8) Ease-of-Adhesion Layer

The present film can have a coating of easy-of-adhesion layer. The term "ease-of-adhesion layer" refers to the layer having a function of contributing ease of adhesion between the protective film for a polarizing plate and its adjacent layer, or between the hard coating layer and the substrate.

Such an ease-of-adhesion treatment includes treatment that provides an ease-of-adhesion layer on a transparent plastic film by use of an ease-of-adhesion agent, such as polyester, acrylic acid ester, polyurethane, polyethyleneimine or a silane coupling agent.

An example of an ease-of-adhesion layer preferably used in this art is a layer that contains a high-molecular compound having —COOM groups (wherein M is a hydrogen atom or a cation), and a preferred embodiment thereof is in that a layer containing a high-molecular compound having —COOM groups is provided on the film's substrate side and, in a state of being adjacent thereto, a layer containing a hydrophilic high-molecular compound as a main component is provided on the polarizer's side. Examples of the high-molecular compound having —COOM groups include a styrene-maleic acid copolymer having —COOM groups, a vinyl acetate-maleic acid copolymer having —COOM groups, and a copolymer of vinyl acetate, maleic acid and maleic acid anhydride. Of these copolymers, a vinyl acetate-maleic acid copolymer having —COOM groups is preferred over the others. These high-molecular compounds may be used alone or as combinations of two or more thereof. The suitable mass-average molecular weight of such a high-molecular compound may be from about 500 to about 500,000. Especially suitable examples of a high-molecular compound having —COOM groups include those disclosed in JP-A-6-094915 and JP-A-7-333436.

Examples of a hydrophilic high-molecular compound suitably used therein include hydrophilic cellulose derivatives (e.g., methyl cellulose, carboxymethyl cellulose, hydroxyl cellulose), polyvinyl alcohol derivatives (e.g., polyvinyl alcohol, vinyl acetate-vinyl alcohol copolymers, polyvinyl acetal, polyvinyl formal, polyvinyl benzal), natural high-molecular compounds (e.g., gelatin, casein, gum arabic), hydrophilic polyester derivatives (e.g., partially sulfonated polyethylene terephthalate), and hydrophilic polyvinyl derivatives (e.g., poly-N-vinyl pyrrolidone, polyacrylamide, polyvinyl indazole, polyvinyl pyrazole). These hydrophilic compounds are used alone or as combinations of two or more thereof.

The thickness of such an ease-of-adhesion layer is preferably from 0.05 to 1.0 μm. When the layer is thinner than 0.05 μm, sufficient adhesion effect is difficult to obtain; while, when the layer is thicker than 1.0 μm, adhesion effect becomes saturated.

2-(9) Anticurl Layer

Anticurl coating can be given to the film according to the present art. The term "anticurl coating" as used herein means the processing capable of contributing the function of curling with the processed surface of the film inside. By giving this anticurl coating, there arises a function of preventing a transparent resin film from curling with the anticurl coating's side inside when some surface processing is given to one side of the film to cause differences in degree and kind of processing given to either side.

As a mode of giving the anticurl coating, the mode can be adopted in which an anticurl layer is provided on the side of a substrate opposite to the side having an antiglare layer or an antireflective layer. Alternatively, since there is a case in which an ease-of-adhesion layer is provided on one side of a transparent resin film, the mode in which the anticurl coating is given to the opposite side may be adopted.

Examples of a specific method for the anticurl coating include a method of applying a solvent and a method of coating with a layer of a solvent and a transparent resin, such as cellulose triacetate, cellulose diacetate or cellulose acetate propionate. More specifically, the method of applying a solvent is carried out by application of a composition containing a solvent capable of dissolving or swelling a cellulose acylate film used as a protective film for use on a polarizing plate. As the composition for the layer having an anticurl function, therefore, it is preferable to use a coating solution containing an organic solvent of ketone or ester type. Suitable examples of a ketone-type organic solvent include acetone, methyl ethyl ketone, methyl isobutyl ketone, cyclohexanone, ethyl lactate, acetyl acetone, diacetone alcohol, isophorone, ethyl n-butyl ketone, diisopropyl ketone, diethyl ketone, di-n-propyl ketone, methylcyclohexanone, methyl n-butyl ketone, methyl n-propyl ketone, methyl n-hexyl ketone and methyl n-heptyl ketone, and suitable examples of an ester-type organic solvent include methyl acetate, ethyl acetate, butyl acetate, methyl lactate and ethyl lactate. However, there may be a case where the composition contains a mixture of solvents for dissolution and/or solvents for swelling, and further contains solvents inhibiting dissolution. In this case, these solvents are mixed in appropriate proportions according to the curling degree and kind of a transparent resin film coated therewith and applied at an appropriate coverage, thereby performing the anticurl coating. In addition to such coating, the anticurl function can also be attained by carrying out transparent hard coating and antistatic coating.

2-(10) Water Absorption Layer

In the present film, a water absorbent can be used. The water absorbent can be chosen from compounds having a function of absorbing water, notably alkaline-earth metal compounds. Examples of such compounds include BaO, SrO, CaO and MgO. Further, the water absorbent can be chosen from metal elements, such as Ti, Mg, Ba and Ca. These absorbents are used in particle sizes of preferably 100 nm or below, far preferably 50 nm or below.

The layer containing such a water absorbent may be formed by a vacuum evaporation method as in the case of a barrier layer, or nano-sized particles formed by various methods may be used. The layer thickness is preferably from 1 to 100 nm, far preferably from 1 to 10 nm. The layer containing a water absorbent may be arranged between a substrate and a layered product (a layered product of a barrier layer and an organic layer), as the topmost layer of a layered product or between layered products, or a water absorbent may be added to an organic layer or barrier layer in a layered product. When the water absorbent is added to the organic layer, a co-evaporation method is used to advantage.

2-(11) Primer Layer and Inorganic Thin-film Layer

The present film can enhance its gas barrier quality by providing a known primer layer or inorganic thin-film layer between a substrate and a layered product.

Although an acrylic resin, an epoxy resin, a urethane resin or a silicone resin may be used for the primer layer, it is preferable in the invention that the primer layer used is a hybrid organic-inorganic layer and the inorganic thin-film layer used is an evaporated inorganic layer or a closely packed inorganic thin coating formed by a sol-gel method. As the evaporated inorganic layer, a layer formed by evaporation of silica, zirconia or alumina is suitable. The evaporation can be performed by a vacuum evaporation method or a sputtering method.

3. Layer Structure of Film

Figure 3A:
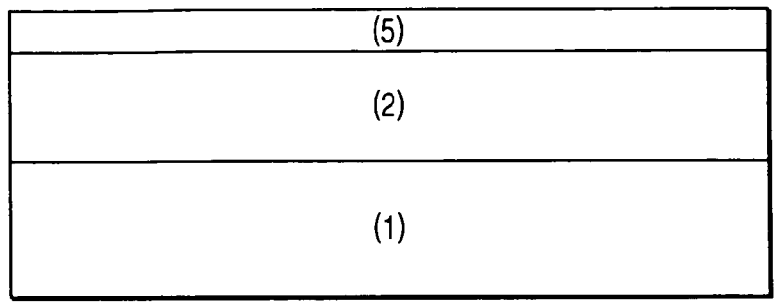
FIGS. 3A to 3D are all diagrammatic cross-section sketches schematically showing exemplary embodiments of the present film.
Figure 3B:
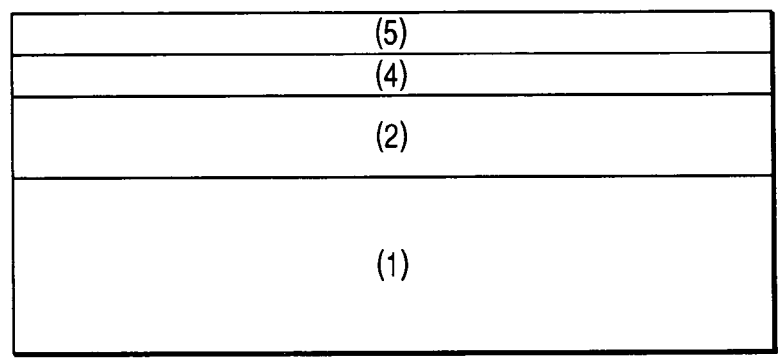
Figure 3C:
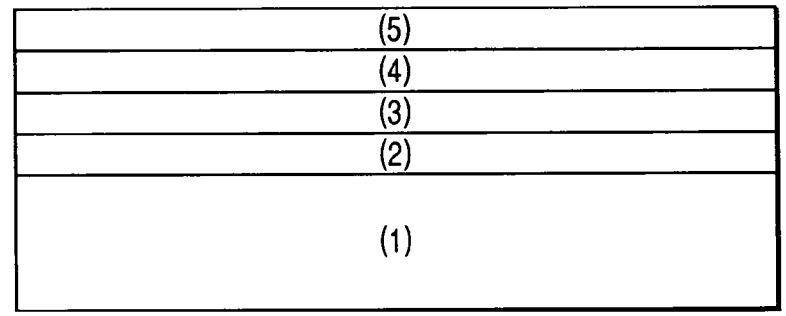
Figure 3D:
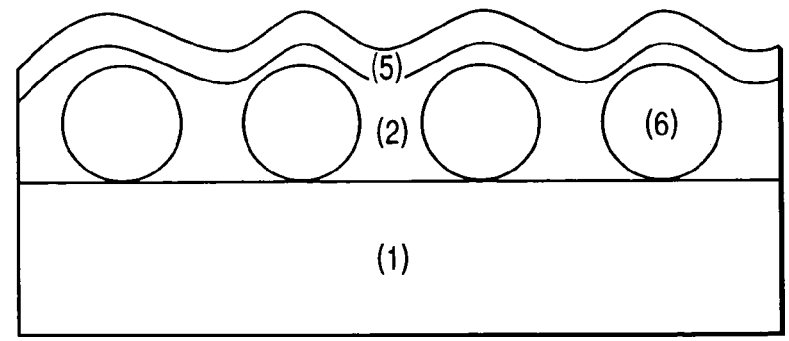
Figure 4:
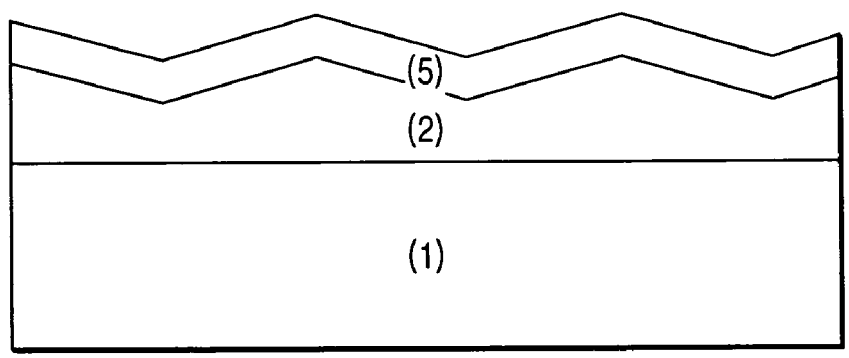
FIG. 4 is a diagrammatic cross-section sketch schematically showing another exemplary embodiment of the present film.

The present film can be configured to have any of known layer structures by use of layers as described above. Specifically, the following are representatives of layer structures:

a. Substrate/hard coating layer b. Substrate/hard coating layer/low refractive index layer (FIG. 3A)

c. Substrate/hard coating layer/high refractive index layer/low refractive index layer (FIG. 3B)

d. Substrate/hard coating layer/medium refractive index layer/high refractive index layer/low refractive index layer (FIG. 3C)

A layered structure formed by coating a hard coating layer (2) on a substrate (1) and further providing thereon a low refractive index layer (5), as shown in the layer structure b (FIG. 3A), can be used suitably as an antireflective film. When the low refractive index layer (5) is formed to have a thickness of around ¼ the wavelengths of light on the hard coating layer (2), surface reflections can be reduced on the principle of thin-film interference.

In addition, as shown in the layer structure c (FIG. 3B), a layered product formed by coating a hard coating layer (2) on a substrate (1) and further providing thereon a high refractive index layer (4) and a low refractive index layer (5) can also be used suitably as an antireflective film. Further, the reflectance can be reduced to 1% or below by setting up the layer structure (as shown in FIG. 3C) in which a substrate (1), a hard coating layer (2), a medium refractive index layer (3), a high refractive index layer (4) and a low refractive index layer are stacked in the order of mention.

In the layer structures a to d, the hard coating layer (2) can be designed to have an antiglare quality and function as an antiglare layer also. The antiglare quality may be created by dispersion of matting particles (6) as shown in FIG. 3($d$), or by surface patterning such as embossing. The antiglare layer formed by dispersing matting particles (6) is made up of a binder and translucent particles dispersed therein. The antiglare layer preferably has both antiglare and hard coating qualities, and may be made up of a plurality of layers, e.g., 2 to 4 layers.

Examples of a layer which may be provided between a transparent substrate and a layer arranged on the front side of the substrate, or as the topmost of layers arranged above the substrate include an interference unevenness (rainbow-hued unevenness) preventive layer, an antistatic layer (when reduction in surface resistance is required from the display side, or adhesion of dirt to the surface becomes a problem), another hard coating layer (when one hard coating or antiglare layer is insufficient to meet the required hardness), a gas barrier layer, a water absorption layer (a moisture-proof layer), a adhesion enhancing layer and a soil-resistant layer (a dirt preventive layer).

Further, it is preferable in the invention that the following relation is satisfied among individual refractive indexes of layers constituting an antiglare antireflective film having an antireflective layer:

Refractive index of hard coating layer>Refractive index of transparent substrate>Refractive index of low refractive index layer.

4. Manufacturing Method

The present film can be formed using the following methods, but these methods should not be construed as limiting the scope of the invention in any way.

4-(1) Preparation of Coating Solution

<Preparation>

A coating solution containing ingredients for forming each constituent layer is prepared. Herein, a rise in water content in the coating solution can be suppressed by controlling the vaporized solvent quantity to the minimum. The water content in each coating solution is preferably 5% or below, far preferably 2% or below. Control of the vaporized solvent quantity can be attained by enhancing the airtightness under the stirring after charging all ingredients into a tank and minimizing the air contact area of each coating solution during the solution transfer operation. Alternatively, a device for reducing the water content in each coating solution may be set to work during, or both before and after the coating operation.

<Physical Properties of Coating Solution>

In the coating method adopted in the invention, the upper limit of the speed at which the coating is possible is greatly influenced by physical properties of a coating solution used. Therefore, it is required to control the physical properties of the coating solution at the instant of coating, notably viscosity and surface tension.

The viscosity is preferably adjusted to 2.0 [mPa·sec] or below, far preferably 1.5 [mPa·sec] or below, especially preferably 1.0 [mPa·sec] or below. Since there are cases where coating solutions change their viscosities with shear rate, the viscosity values described above are values measured at a shear rate at the instant of coating. Addition of a thixotropic agent to a coating solution is advantageous because the thixotropic agent can make the viscosity low at coating time when high shear is imposed on the coating solution, while it can make the viscosity high at drying time when almost no shear is imposed; as a result, unevenness hardly develops at the drying time.

Although it is not included in physical properties of a coating solution, the amount of a coating solution applied to a transparent substrate exerts an influence on the upper limit of a speed at which the application is possible. The amount of a coating solution applied to a transparent substrate is preferably from 2.0 to 5.0 [ml/m$^2$]. Increase in amount of a coating solution applied to a transparent substrate is favorable because it can elevate the upper limit of a speed at which the application is possible, but excessive increase in amount of a coating solution applied to a transparent substrate causes an increase in load on drying. Therefore, it is preferable to determine the optimum amount of a coating solution applied to a transparent substrate according to the formula of the coating solution and process conditions.

The surface tension of a coating solution is preferably from 15 to 36 [mN/m]. It is preferable to add a leveling agent for lowering the surface tension from the viewpoint of prevention of unevenness at the time of drying. On the other hand, too low surface tension lowers the upper limit of a speed at which the application is possible. So the surface tension range of 17 to 32 [mN/m] is preferred by far, and that of 19 to 26 [mN/m] in particular is advantageous.

<Filtration>

The coating solution is preferably filtered prior to application. As the filter used for filtration, it is preferable to use a filter as small as possible in pore diameter within the range that permits passage of ingredients in the coating solution. For the filtration, it is preferable to use a filter having an absolute filtration accuracy of 0.1 to 10 μm, and it is far preferable to use a filter having an absolute filtration accuracy of 0.1 to 5 μm. The filter thickness is preferably from 0.1 to 10 mm, far preferably from 0.2 to 2 mm. In this case, the filtration is performed appropriately under a filtration pressure of 1.5 MPa or below, preferably 1.0 MPa or below, far preferably 0.2 MPa or below.

A filter member used for filtration has no particular restriction so far as it exerts no influence upon the coating solution. Specifically, the same filtration member as used for the wet dispersion of inorganic compound can be used herein.

Additionally, it is preferable to subject the filtered coating solution to ultrasonic dispersion just before application and thereby assist in eliminating bubbles and retaining a dispersoid-dispersed state.

4-(2) Treatment Before Coating

The substrate for use in the invention is preferably subjected to surface treatment before coating. Examples of the surface treatment include corona discharge treatment, glow discharge treatment, flame treatment, acid treatment, alkali treatment and UV irradiation treatment. In addition, as disclosed in JP-A-7-333433, formation of a subbing layer on the substrate is advantageously utilized.

Examples of a dust removal method applied in a dust removal process as another preprocess carried out before the coating process include dry dust-removal methods, such as the method of pressing nonwoven cloth or a blade against a film surface as disclosed in JP-A-59-150571, the method of peeling attached dust off a film surface by blowing air of high cleanliness at high speed and sucking the dust into a nearby suction opening as disclosed in JP-A-10-309553, and the method of peeling attached dust by blowing ultrasonically vibrating compressed air on the dust and sucking the dust (with a New Ultra Cleaner, made by Shinko Co., Ltd.) as disclosed in JP-A-7-333613.

Alternatively, it is possible to use wet dust-removal methods, such as the method of bringing the film into a cleaning tank and peeling attached dust off the film with a ultrasonic vibrator, the method of supplying a cleaning solution to the film and then blowing high-speed air thereon and carrying out suction as disclosed in JP-B-49-13020, and the cleaning method of continuously rubbing web with a roll wetted with a liquid and then directing a jet of washing liquid at the rubbed surface as disclosed in JP-A-2001-38306. Of these dust removal methods, the dust removal methods using ultrasonic waves and wet dust-removal methods are especially preferred in point of dust removal effect.

Further, removal of static electricity on the substrate film prior to those dust removal processes is particularly advantageous from the viewpoint of enhancing dust removal efficiency and reducing dust adhesion. For the removal of static electricity, it is possible to use a corona discharge ionizer or a light irradiation ionizer including an UV ionizer and a soft X-ray ionizer. The static voltage of the substrate film prior to and subsequent to the dust removal or coating process is preferably 1,000 V or below, preferably 300 V or below, particularly preferably 100 V or below.

From the viewpoint of retaining film's planarity, it is preferable in these treatments that a cellulose acylate film is kept at temperatures lower than its Tg, specifically 150° C. or below.

When a cellulose acylate film and a polarizer are bonded together as in the case of using the present film as a protective film of the polarizing plate, it is especially preferable in terms of adhesion to the polarizer that acid treatment or alkali treatment, namely saponification treatment, is given in advance to the cellulose acylate film.

From the viewpoint of adhesion, the surface energy of cellulose acylate film is preferably 55 mN/m or above, far preferably from 60 mN/m to 75 mN/m, and can be adjusted by the surface treatment as described above.

4-(3) Coating

Individual layers of the present film can be formed using the following coating methods, but methods usable in the invention should not be construed as being limited to the following ones.

Examples of a usable coating method include known methods, such as a dip coating method, an air knife coating method, a curtain coating method, a roller coating method, a wire bar coating method, a gravure coating method or an extrusion coating method (a die coating method, as described in U.S. Pat. No. 2,681,294), and a microgravure coating method. Of these coating methods, microgravure and die coating methods are used to advantage.

The microgravure coating method usable in the invention is a coating method characterized in that a gravure roll having a diameter of about 10 mm to about 100 mm, preferably about 20 mm to 50 mm, and a gravure pattern engraved around the whole circumference is placed under a substrate and rotated in the direction opposite to a traveling direction of the substrate, and a coating solution is applied to the under side of the substrate at the position where the upper side is in a free state by transfer from the surface of the gravure roll while keeping the amount of the coating solution applied constant by scraping a surplus thereof off the gravure roll surface with a doctor blade. A transparent substrate of roll form is continuously wound off and, on one side of the substrate wound off, at least either a hard coating layer or a low refractive index layer containing a fluorine-containing polymer of olefin type can be coated by use of a microgravure coating method.

As to the coating conditions in the microgravure coating method, the number of lines in a gravure pattern engraved at the gravure roll surface is preferably from 50 to 800 per inch, far preferably from 100 to 300 per inch, the depth of the gravure pattern is preferably from 1 to 600 μm, far preferably from 5 to 200 μm, the number of revolutions of the gravure roll is preferably from 3 to 800 rpm, far preferably from 5 to 200 rpm, and the traveling speed of a substrate is preferably from 0.5 to 100 m/min, far preferably from 1 to 50 m/m.

In order to supply the present film with high productivity, it is preferable to adopt an extrusion method (die coating method). A die coater which can be used to particular advantage in the area reduced in wet coverage (20 ml/m² or below) as in the cases of a hard coating layer and an antireflective layer is explained below.

<Structure of Die Coater>

Figure 5:
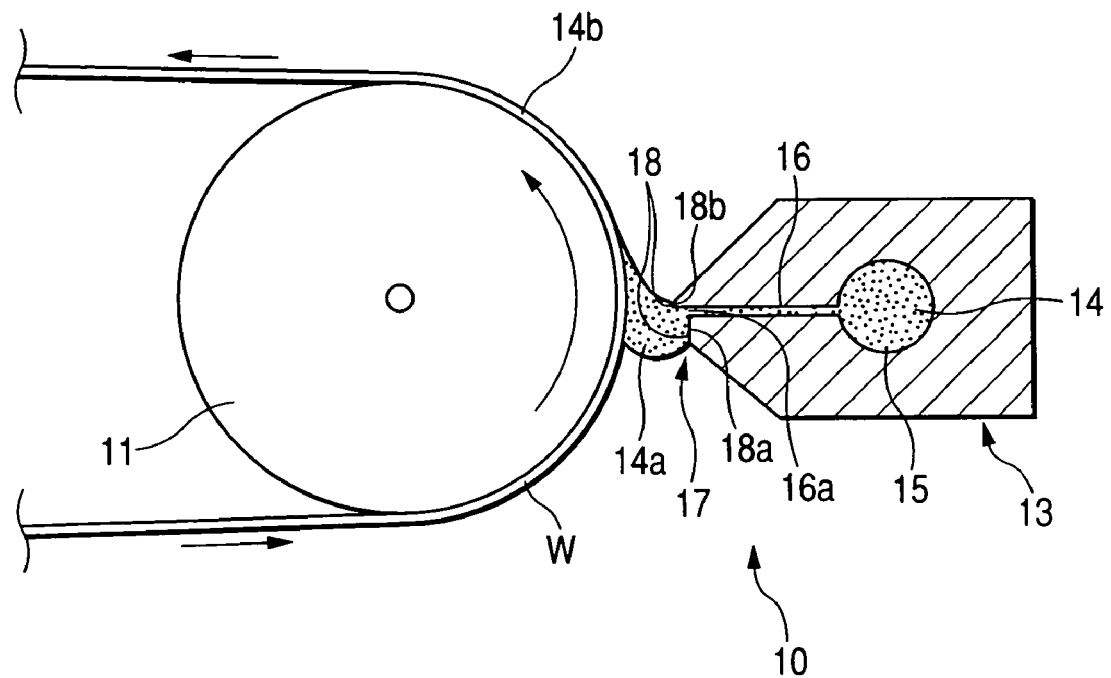
FIG. 5 is a cross-sectional diagram of a slot die-equipped coater used for making an exemplary embodiment of the present film.

FIG. 5 is a cross-sectional diagram of a coater using a slot die, which can be employed for making the present film. The coater 10 forms a coating layer 14b on a web W by a coating solution 14 being discharged in the form of bead 14a from a slot die 13 onto the web W traveling continuously as it is supported by the backup roll.

In the interior of the slot die 13, a pocket 15 and a slot 16 are formed. The cross-section of the pocket 15 is formed with curved or straight lines, and it may be nearly circle or semicircle as shown in FIG. 5. The pocket 15 is a reservoir space for the coating solution, which is extended in the width direction of the slot die while keeping its cross-sectional shape, and the effective extension length thereof is generally adjusted to almost the same as or a little longer than a coating width. The coating solution 14 is supplied to the pocket 15 from a side of the slot die 13 or from the center of the face on the side opposite to the slot mouth 16a. In addition, the pocket 15 is equipped with a stopper for preventing the coating solution 14 from leaking out.

The slot 16 is a channel of the coating solution 14 from the pocket 15 toward the web W, and has its cross-sectional shape in the width direction of the slot die as in the case of the pocket 15. The mouth 16a located on the web side is generally adjusted so as to have almost the same length as the coating width by use of a width regulatory plate or the like (not shown). An angle that the slot 16 makes at the slot tip with the tangent to the backup roll in the web W traveling direction is preferably from 30° to 90°.

The front-end lips 17 of the slot die 13, between which the mouth 16a of the slot is sited, are shaped so as to taper off, and there is a flat part 18 referred to as a land at each of the frond ends thereof. As to this land 18, the land situated on the upstream side of the slot 16 in the traveling direction of a web W is referred to as the upstream side lip land 18a, and the land situated on the downstream side is referred to as the downstream side lip land 18b.

Figure 6A:
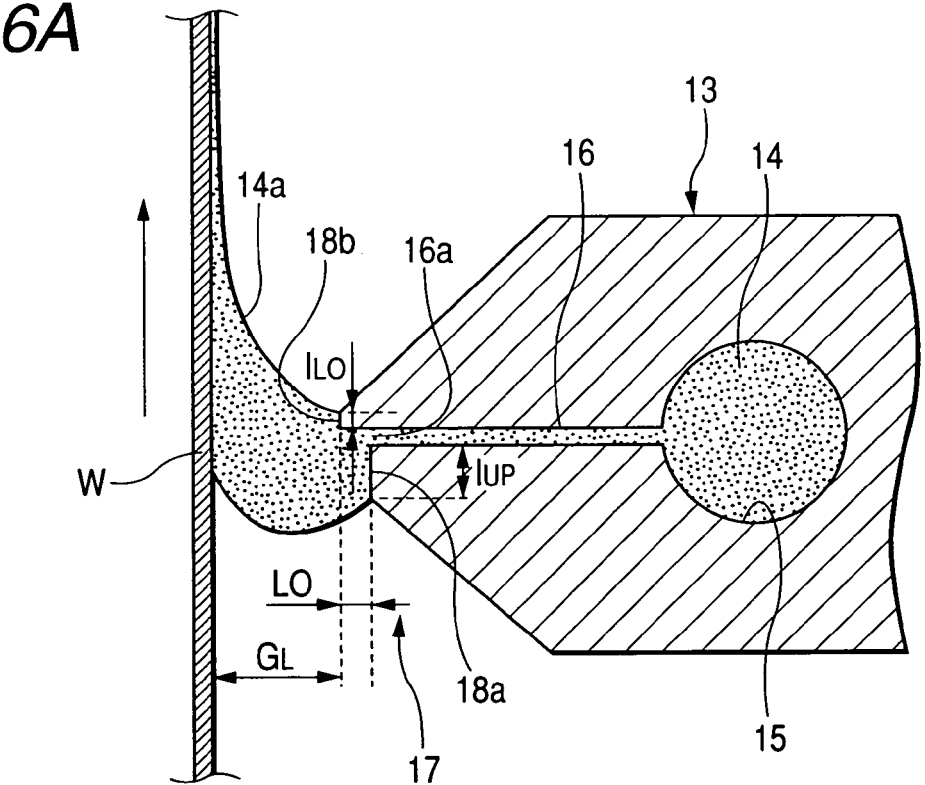
FIGS. 6A and 6B are cross-sectional diagrams showing the profile of the slot die 13 in comparison with a slot die currently in use.
Figure 6B:
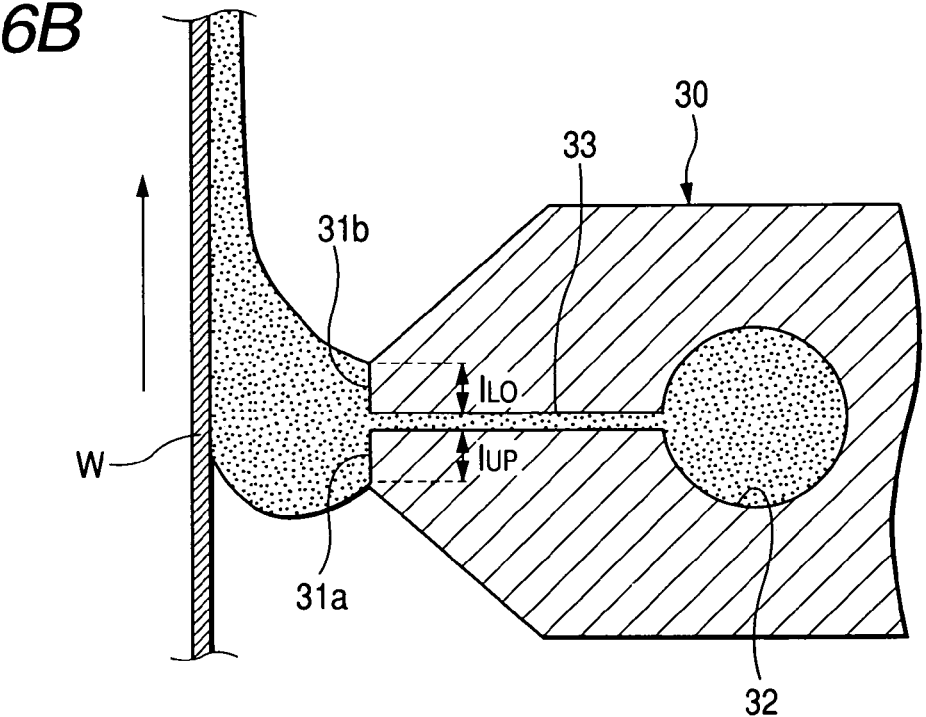

FIGS. 6A and 6B show the cross-sectional shape of the slot die 13 in comparison with that currently in use. FIG. 6A shows the slot die 13 used in the invention, while FIG. 6B shows a slot die 30 currently in use. In the case of the slot die 30 currently in use, the distance between the upstream side lip land 31a and the web is the same as the distance between the downstream side lip land 31b and the web. Additionally, the reference numeral 32 stands for a pocket and the reference numeral 33 stands for a slot. In contrast to such a design, the slot die 13 used in the invention is made shorter in the downstream lip land length $I_{LO}$, and thereby a layer having a wet thickness of 20 μm or below can be coated with high accuracy.

The land length of the upstream lip land 18a, $I_{up}$, has no particular limitations, but it is preferable that $I_{UP}$ is chosen from the range of 500 μm to 1 mm. The land length of the downstream lip land 18b, $I_{LO}$, is preferably from 30 μm to 100 μm, far preferably from 30 μm to 80 μm, especially preferably from 30 μm to 60 μm. When the downstream side lip land length $I_{LO}$ is shorter than 30 μm, the edges or the land of the front-end lip tends to become chipped and the coating layer tends to suffer from streaks. Eventually, it becomes impossible to perform the coating operation. In addition, the setting of wet line position on the downstream side becomes difficult, and there occurs a problem that the coating solution tends to spread out on the downstream side. Spreading the coating solution while wetting therewith on the downstream side means unevenness in wet line, which is known to lead to a problem of incurring a defective surface profile, such as streaks, on the coating layer. On the other hand, the downstream side lip land length $I_{LO}$ longer than 100 μm cannot form a bead 14a itself. So it is impossible to perform thin-layer coating.

Further, the downstream lip land 18b is closer to the web W than the upstream lip land 18a and shaped like overbite. Therefore, the decompression degree can be lowered, and formation of bead 14a suitable for thin-layer coating becomes possible. The difference between the distance of the downstream lip land 18b from the web and the distance of the upstream lip land 18a from the web (hereinafter referred to as "overbite length LO") is preferably 30 µm to 120 µm, far preferably from 40 µm to 100 µm, especially preferably from 30 µm to 80 µm. When the slot die 13 has an overbite shape, the space between the front-end lip 17 and the web W, $G_L$, indicates the space between the downstream lip land 18b and web W.

Figure 7:
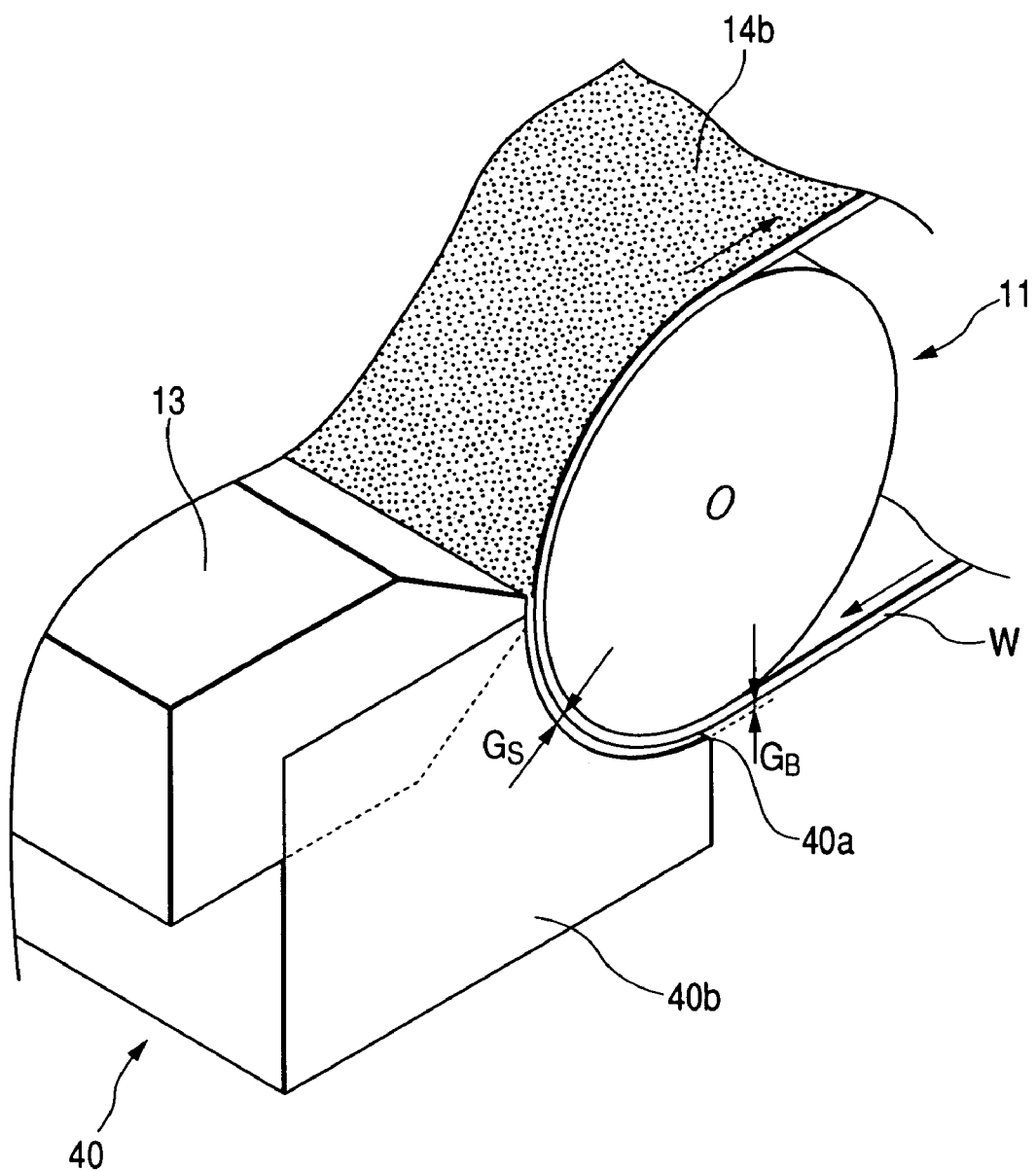
FIG. 7 is a diagrammatic perspective view showing a slot die and its environments used in a coating process for making an exemplary embodiment of the present film.

FIG. 7 is a diagrammatic perspective view showing the slot die and its surroundings adopted in the coating process for manufacturing the present film.

In order to place the bead 14a under sufficient decompression control, a reduced-pressure chamber 40 is installed on the side opposite to the web traveling direction side, and that in a position having no contact. The reduced-pressure chamber 40 is provided with a back plate 40a and a side plate 40b in order to retain its operational efficiency, and there are a gap $G_B$ between the back plate 40a and the web W and a gap Gs between the side plate 40b and the web W.

Figure 8:
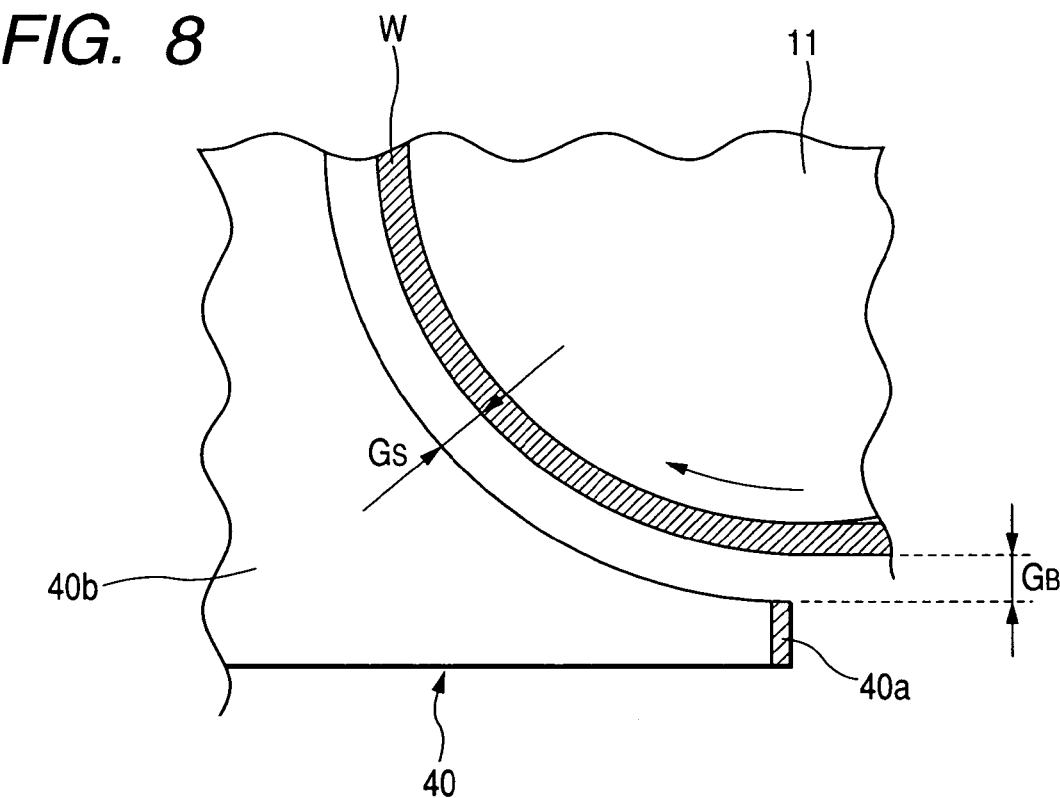
FIG. 8 is a cross-sectional diagram showing a decompression chamber 40 and web W brought in close proximity to each other, in which, a back plate 40a is integral with the body of a chamber 40.
Figure 9:
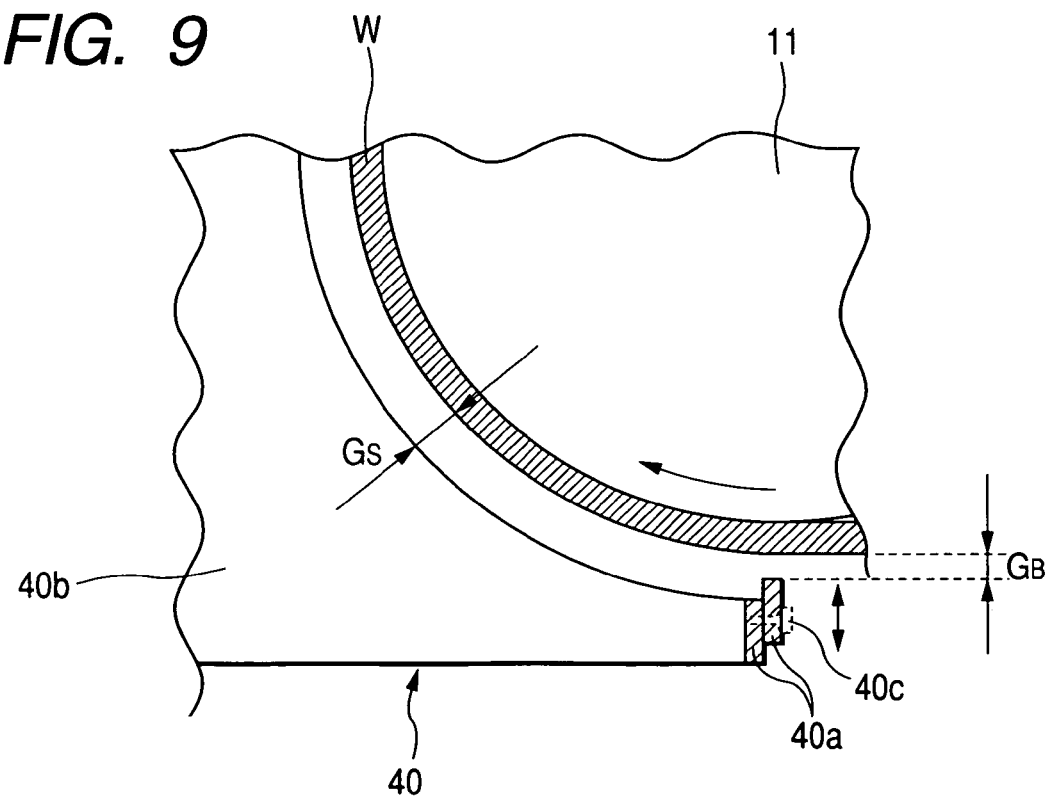
FIG. 9 is the same as above, but a back plate 40a is fastened to a chamber 40 with screws 40c.

FIG. 8 and FIG. 9 are cross-sectional diagrams showing the reduced-pressure chamber 40 and the web W in close proximity to each other. The side plate 40b and the back plate 40a may be integral with the body of the reduced-pressure chamber as shown in FIG. 8, or the reduced-pressure chamber may have the structure that, as shown in FIG. 9, a screw 40c holds the back plate 40a to the chamber so that the gap $G_B$ is varied as appropriate. In every structure, the actual spacing between the back plate 40a and the web W and that between the side plate 40b and the web W are defined as the gap $G_B$ and the gap Gs, respectively. The gap $G_B$ between the back plate 40a of the reduced-pressure chamber 40 and the web W refers to the distance from the topmost end of the back plate 40a to the web W when the reduced-pressure chamber 40 is placed beneath the web W and the solid die 13 as shown in FIG. 8.

It is preferable to set up a configuration that the gap $G_B$ between the back plate 40a and the web W is greater than the gap $G_L$ between the front-end lip 17 and the web W. By doing so, it becomes possible to avoid a decompression degree change caused in the bead neighborhood by eccentricity of the backup roll 11. For instance, when the gap $G_L$ between the front-end lip 17 of the slot die 13 and the web W is from 30 µm to 100 µm, the suitable setting of the gap $G_B$ between the back plate 40a and the web W is from 100 µm to 500 µm.

<Material Quality and Accuracy>

The longer the length ($I_{LO}$) of the front-end lip on the web traveling direction side in the web traveling direction, the more detrimental it becomes to bead formation. When there are variations in the length $I_{LO}$ among points randomly chosen in the direction of the slot die width, the bead becomes unstable by slight external disturbance. Therefore, it is appropriate that the fluctuation range of this length in the direction of the slot die width be controlled to 20 µm or below.

When a material like stainless steel is used as a material for the front-end lip of the slot die, the material suffers from shear droop at the stage of die machining and cannot meet the requirement for the front-end lip accuracy even when the front-end lip length ($I_{LO}$) of the slot die in the web traveling direction is adjusted to the range of 30 to 100 µm. For retention of high machining accuracy, it is therefore important to use the super-hard material as disclosed in Japanese Patent No. 2,817,053. Specifically, it is appropriate that the at least the front-end lip of the slot die be formed from a super-hard alloy produced by binding carbide grains having an average grain size of 5 µm or below. As a super-hard alloy, carbide grains, such as tungsten carbide grains (hereinafter referred to as WC grains), bound together by a bonding metal like cobalt are known. As another bonding metal, titanium, tantalum, niobium or a mixture thereof can also be used. As the average size of WC grains, 3 µm or below is preferred by far.

In order to achieve highly accurate coating, both the land length $I_{LO}$ of the front-end lip on the web traveling side and variations of the gap between the front-end lip and the web in the direction of the slot die width become important factors. And it is preferable to attain straightness to an extent that the variation range of the gap, or the combination of those two factors, can be controlled to a certain point. Specifically, it is preferable to let the front-end lip and the backup roll have straightness that can ensure the gap variation range of 5 µm or below in the direction of the slot die width.

<Coating Speed>

By achieving the accuracies of the backup roll and front-end lip, the coating method preferably used in the invention ensures high consistency of film thickness at the time of high-speed coating. Further, consistent film thickness can be easily achieved during high-speed coating because a prior metric system is adopted in the coating method. In addition, the coating method enables high-speed coating of a small amount of coating solution with high thickness consistency. Although it is also possible to perform coating by other coating methods, a dip coating method tends to bring about step-wise unevenness since vibrations of a coating solution in a receiving tank cannot be avoided, and a reverse roll coating method also tends to bring about stepwise unevenness resulting from eccentricity and bending of rolls pertaining to the coating. In addition, consistent thickness is hard to achieve since a posterior metric system is adopted in those methods. Therefore, from the viewpoint of productivity, it is preferable that the coating is performed at a rate of 25 m/min or above in accordance with the die coating method.

4-(4) <Drying>

After coating on a substrate directly or via other layers, it is preferable that the present film is transported in the form of web into a hot zone for drying a solvent.

As methods for drying solvents, various findings can be utilized. Examples thereof include the findings disclosed in JP-A-2000-286817, JP-A-2001-314798, JP-A-2003-126768, JP-A-2003-315505 and JP-A-2004-34002.

The temperature of a drying zone is preferably from 25° C. to 140° C., and it is appropriate that the first half of the drying zone be kept at a relatively low temperature and the second half be kept at a relatively high temperature. However, the temperature of the drying zone is preferably lower than temperatures at which ingredients in a coating composition for each layer, other than solvents, start to vaporize. Of the ingredients, for instance, some of commercially available photo-radical generators used in combination with UV cure resins cause vaporization in dozens % thereof when exposed to 120° C. hot air for a time shorter than several minutes, and there are some monofunctional or difunctional acrylate monomers whose vaporization progresses in the hot air of 100° C. In these cases, it is preferable that the temperature of the drying zone is lower than temperatures at which ingredients in a coating composition, other than solvents, start to vaporize.

As to the drying air applied after coating on a substrate a coating composition for each layer, it is favorable for prevention of drying unevenness that the air velocity on the coating surface is from 0.1 to 2 m/sec so long as the solids concentration in the coating composition is within the range of 1 to 50%.

In addition, it is preferable that the temperature difference between a transport roll installed in the drying zone so as to contact with a substrate on the side opposite to the side provided with a coating composition for each layer and the substrate is adjusted within the range of 0 to 20° C. This is because drying unevenness arising from nonuniform thermal conduction on the transport roll can be prevented.

4-(5) Curing

After drying the solvents, the coatings of the present film can be cured in the form of web by passage through a zone for curing the coatings by application of ionizing radiation and/or heat.

The ionizing radiation usable in the invention has no particular restriction on its kind, but it can be selected appropriately from ultraviolet rays, electron beams, near ultraviolet rays, visible light, near infrared rays, infrared rays or X rays according to the type of a curable composition used for film formation. However, ultraviolet rays and electron beams are preferred over the others, and ultraviolet rays in particular are used to advantage in terms of convenience in handling and easy obtainment of high energy.

As a light source of ultraviolet rays that can cause photo-polymerization of ultraviolet-reactive compounds, any of ultraviolet-generating sources can be used. For instance, a low-pressure mercury lamp, a medium-pressure mercury lamp, a high-pressure mercury lamp, a ultrahigh-pressure mercury lamp, a carbon arc lamp, a metal halide lamp and a xenon lamp can be used. In addition, ArF excimer laser, KrF excimer laser, an excimer lamp or a synchrotron radiation can be used, too. Of these light sources, a ultrahigh-pressure mercury lamp, a high-pressure mercury lamp, a low-pressure mercury lamp, a carbon arc lamp, a xenon arc lamp and a metal halide lamp are used to advantage.

Similarly to ultraviolet rays, electron beams can also be used. Examples of usable electron beams include those having energy of 50 to 1,000 KeV, preferably 100 to 300 KeV, emitted from a wide variety of electron-beam accelerators, such as a Cockcroft-Walton accelerator, a Van de Graaff accelerator, a resonant transformation accelerator, an insulated-core transformation accelerator, a linear accelerator, a Dynamitron accelerator and a high-frequency accelerator.

Although the irradiation conditions depend on the type of a lamp used, the amount of light irradiation is preferably 10 mJ/cm$^2$ or above, far preferably from 50 mJ/cm$^2$ to 10,000 mJ/cm$^2$, particularly preferably from 50 mJ/cm$^2$ to 2,000 mJ/cm$^2$. Herein, it is favorable that the distribution of amounts of light irradiation in the direction of web width, from the center to both edges, lies in the range of 50% to 100%, preferably 80% to 100%, of the maximum amount of light irradiation at the web center.

In the invention, it is preferable that at least one of layers stacked on a substrate is cured by a process of irradiating the layer with ionizing radiation under an atmosphere having an oxygen concentration of 10 volume % or below, and that in a state of heating the layer surface at a temperature of 60° C. or above for a period of 0.5 second or longer from the start of irradiation with ionizing radiation.

Alternatively, it is also preferable that the heating under an atmosphere having an oxygen concentration of 3 volume % or below is carried out simultaneously with and/or sequentially to irradiation with ionizing radiation.

The curing by this process is suitable for the low refractive index layer in particular, which is the outermost layer and thin in thickness. This is because the curing reaction is promoted by heat to result in formation of film superior in physical strength and chemical resistance.

The ionizing radiation irradiation time is preferably from 0.7 to 60 seconds, far preferably from 0.7 to 10 seconds. When the irradiation time is shorter than 0.5 second, the curing reaction cannot reach completion, so sufficient curing cannot be attained. On the other hand, maintenance of low oxygen conditions for a long time requires upsizing of equipment and a large volume of inert gas, so it is undesirable.

The oxygen concentration of an atmosphere under which the cross-linking reaction or polymerization reaction of ionizing radiation curable compounds is carried out is preferably 6 volume % or below, far preferably 4 volume % or below, further preferably 2 volume % or below, especially preferably 1 volume % or below. It is undesirable to render the oxygen concentration lower than necessary from the viewpoint of manufacturing cost, because it requires the use of an inert gas like nitrogen in a large volume.

As a method of reducing the oxygen concentration to 10 volume % or below, replacement of the air (nitrogen concentration: about 79 volume %, oxygen concentration: about 21 volume %) with another gas is suitable, and replacement with nitrogen (purge by nitrogen) is especially suitable.

By admitting an inert gas into an ionizing-radiation irradiation chamber and, at the same time, imposing a condition that the inert gas somewhat issues from the web entrance side of the irradiation chamber, not only the air brought in by the web transport can be excluded and the oxygen concentration in the reaction chamber can be lowered effectively, but also the substantial oxygen concentration on the extreme surface where cure inhibition by oxygen is great can be reduced with efficiency. The direction of an inert gas flow on the entrance side of the irradiation chamber can be controlled by adjusting balance between admission into and emission from the irradiation chamber.

For removal of the air brought in by web transport, it can be adopted as another suitable method to blow an inert gas directly on the web surface.

By providing an anterior room in front of the reaction chamber and previously excluding oxygen on the web surface, the curing can be pursued with higher efficiency. For using the inert gas efficiently, it is appropriate that the lateral faces forming the web entrance side of the ionizing radiation reaction chamber or the anterior room have a gap of 0.2 to 15 mm, preferably 0.2 to 10 mm, especially preferably 0.2 to 5 mm, on the web surface. For continuous web manufacturing, however, it is required to splice webs end to end in succession, and a method of splicing webs by bonding with tape is prevailingly used. Therefore, when a gap between the entrance of the ionizing radiation reaction chamber or anterior room and the web surface is narrowed overly, there occurs a trouble that a splicing member such as bonding tape are caught on the entrance. For avoiding such a trouble and yet narrowing the gap, it is appropriate that at least part of the entrance face of the ionizing radiation reaction chamber or anterior room is designed to be movable and widen the gap by a distance corresponding to the thickness of a splicing member when the member passes into the entrance. Such a design can be implemented by adopting a way of making the entrance face of the ionizing radiation reaction chamber or anterior room movable in forward and backward directions of web travel and widening the gap by a back-and-forth movement at the time of the passage of a splicing member, or a way of making the entrance face of the ionizing radiation reaction chamber or anterior room movable in a direction perpendicular to the web surface and widening the gap by a up-and-down movement at the time of the passage of a splicing member.

The curing is preferably carried out under a condition that the film surface is heated at temperatures ranging from 60° C. to 170° C. When the heating temperature is lower than 60° C., the heating has little effect on curing; while, when the heating temperature is higher than 170° C., there occurs a problem such as substrate deformation. The surface temperatures ranging from 60° C. to 100° C. are preferred by far. The term "film surface" as used herein refers to the filmy surface of a layer to be cured.

The duration of the film surface temperature kept in the foregoing temperature range is preferably from 0.1 second to 300 seconds, far preferably up to 10 seconds, as gauged from the start of irradiation with ionizing radiation. When the duration of the film surface temperature kept in the foregoing temperature range is too short, the reaction of a curable composition for forming a film cannot be promoted; while too long duration of the surface temperature in the foregoing range causes not only deterioration in optical properties but also a manufacturing problem of requiring upsizing of equipment.

The heating method has no particular restriction, but it is suitable to adopt a method of bringing a heated roll into contact with the film surface, a method of blowing heated nitrogen on the film surface, or a method of irradiation the film surface with far infrared rays or infrared rays. In addition, it is also possible to utilize the method disclosed in Japanese Patent No. 2523574 wherein the heating is carried out with a rotating metallic roll through which a hot medium, such as hot water, steam or oil, is passed. Further, dielectric heating rolls may be used as a heating device.

Ultraviolet irradiation may be carried out either at every time when each individual constituent layer is provided, or in one operation after lamination of all constituent layers, or by a combination of them. In point of productivity, ultraviolet irradiation after lamination of multiple layers is preferred.

In the invention, it is possible to cure at least one layer stacked on a substrate by repeating irradiation with ionizing radiation two or more times. In this case, it is favorable that the irradiation with ionizing radiation is performed at least two times in consecutive reaction chambers having an oxygen concentration lower than 0.3 volume %. The performance of plural-time irradiation with ionizing radiation in reaction chambers similar in low oxygen concentration can effectively ensure a reaction time required for curing.

When the manufacturing speed is increased for high productivity in particular, it becomes necessary to carry out plural-time irradiation with ionizing radiation for securing ionizing radiation energy required for curing reaction.

When a layer has some curing degree (100-a percentage of residual functional groups) lower than 100%, and an upper layer is provided thereon and cured by irradiation with ionizing radiation and/or heating, a rise in curing degree of the lower layer as compared with the curing degree before coating of the upper layer is advantageous because adhesion between the lower layer and the upper layer is improved.

4-(6) Handling

For manufacturing the present film continuously, a process of continuously feeding a substrate film from a roll of substrate film, a process of applying a layer of coating solution to the substrate film and drying the layer, a process of curing the layer applied and a process of winding the substrate film having the cured layer are carried out.

More specifically, a roll of substrate film is continuously wound off and fed into a clean room, electrostatic charge on the substrate film is removed with a static charge neutralization apparatus installed in the clean room, and then extraneous matter adhering to the substrate film is removed with a dust arrester. Subsequently thereto, a layer of coating solution is applied to the substrate film in a coating section placed in the clean room, and the layer-coated substrate film is fed into a drying room and dried therein.

The substrate film having the dried coating layer is fed into a cure room from the drying room and the coating layer is cured through polymerization of monomer(s) contained therein. Further, the substrate film having the cured layer is fed into a setting section, and therein the curing is completed, and then the substrate film having the cure-completed layer is wound into a roll.

The foregoing processes may be carried out for every layer formation, or it is possible to combine as one unit a coating section, a drying room and a curing section and carry out continuous formation of two or more layers by respectively using two or more such units installed in succession.

In order to make the present film, it is appropriate that the microfiltration operation of the coating solution be performed as mentioned above and, at the same time, the coating process in the coating section and the drying process in the drying room be carried out under an air atmosphere of high cleanliness, and besides, dirt and dust on the film be fully eliminated before the coating is carried out. The air cleanliness in the coating and drying processes is, based on the standard of cleanliness in accordance with U.S. Standard 209E, preferably Class 10 or above (which permits 353 or less particles having sizes of 0.5 µm or greater per cubic meter of air), far preferably Class 1 (which permits 35.5 or less particles having sizes of 0.5 µm or greater per cubic meter of air). In addition to the coating and drying processes, it is preferable that the air cleanliness is high in the feeding and winding processes also.

4-(7) Saponification Treatment

When a polarizing plate is made by using the present film as one of two surface protective films for a polarizer, it is preferable that the present film is made hydrophilic at a surface on the side to be bonded to the polarizer and thereby the adhesion at the bonded interface is enhanced.

(1) Method of Immersing in Alkaline Solution

The method of immersing the film in an alkaline solution under an appropriate condition, and thereby saponifying throughout the surface having reactivity with alkalis requires no particular equipment, so it is favorable in terms of cost. The alkaline solution is preferably an aqueous solution of sodium hydroxide. The suitable concentration is from 0.5 to 3 mol/L, especially from 1 to 2 mol/L. The suitable temperature of the alkaline solution is from 30° C. to 75° C., especially from 40° C. to 60° C.

It is preferable that the saponification conditions to be combined are relatively mild conditions chosen from among the conditions recited above, and the settings of saponification conditions can be made according to the materials and makeup of the film and the target contact angle.

After immersion in an alkaline solution, it is preferable that the film is thoroughly washed with water or immersed in a dilute acid for neutralization of the alkali component so as to leave no residual alkali component in the film.

By saponification treatment, the surface opposite to the surface provided with coating layers is rendered hydrophilic. A protective film for a polarizing plate is used in a state that the hydrophilicity-imparted surface of its transparent substrate is bonded to the polarizing plate.

The hydrophilicity-imparted surface is effective in enhancing the adhesion to an adhesive layer containing polyvinyl alcohol as a main component.

Although the smaller the contact angle of the transparent substrate surface on the side opposite to the coating layer-provided side with respect to water, the more favorable the saponification treatment is from the view point of adhesion to a polarizer, the immersion method causes damage in the treated film from the coating layer-provided surface to the interior at the same time. Therefore, it becomes important that the immersion method is carried out under the bare minimum reaction condition. When the contact angle of the opposite surface of a transparent substrate with respect to water is taken as a indicator of damage that each layer suffers by alkali, the contact angle in the special case of using triacetyl cellulose as a transparent substrate is preferably from 10 to 50 degrees, far preferably from 30 to 50 degrees, further preferably from 40 to 50 degrees. The contact angles greater than 50 degrees are undesirable because adhesion to a polarizer becomes a problem. On the other hand, the contact angles smaller than 1° degrees are undesirable because damage caused in the film is too serious and physical strength is impaired.

(2) Method of Applying Alkali Solution

As a measure to avoid the damage to each layer by the immersion method, an alkali solution application method can be suitably used wherein an alkaline solution is applied to only the surface opposite to the surface having coating layers, heated, washed and then dried under appropriate conditions. Incidentally, the expression "applied to" used herein means that an alkaline solution is brought into contact with only the surface to be saponified through not only a coating operation but also other operations including a spraying operation and a contact with a solution-impregnated belt. Adoption of such a method requires additional equipment and process for applying an alkali solution, so it is inferior to the immersion method (1) in point of cost. On the other hand, since the contact with an alkaline solution is only on the surface to be saponified, the method (2) permits having a layer using a material sensitive to an alkaline solution on the opposite side. For instance, although it is undesirable to provide an evaporated film and a sol-gel film in the adoption of the immersion method because an alkaline solution has various detrimental effects on those films and causes therein corrosion, dissolution and delamination, formation of such films has no problem in the adoption of this application method because they have no contact with an alkali solution.

In both methods (1) and (2), saponification can be carried out after formation of various layers on the substrate wound off a substrate roll, so it may be performed in a series of operations by following after the film making process. Further, the process of laminating a polarizer on a film including the substrate wound off a substrate roll is also performed consecutively to those operations, and thereby a polarizing plate can be made with efficiency, compared with the case where the same operations are given to multiple sheets of substrate.

(3) Method of Saponification under Protection of Film Stacked When a coating layer is lacking in resistance to an alkali solution, a film is stacked on the surface of a finally formed layer after forming the final layer, and then immersed in an alkali solution. Thus, as is the case with the method (2), only the triacetyl cellulose film surface opposite to the final layer-formed side is made hydrophilic, and then the stacked film is peeled away. By using this method also, hydrophilicity required of a protective film for a polarizing plate can be given to only the surface of a triacetyl cellulose film opposite to the final layer-formed side without damage to any coating layer. This method has an advantage over the method (2) in that it requires no particular apparatus for applying an alkali solution, although the film stacked is disposed of as waste.

(4) Method of Immersion in Alkaline Solution after Forming up to Middle Layer

When upper layers are lacking in resistance to an alkaline solution although lower layers are resistant to an alkaline solution, it is possible to immerse a substrate in the alkaline solution after forming thereon up to the lower layers and thereby make the both sides hydrophilic, and then forming the upper layers on the thus treated layer. Although it complicates the manufacturing process, this method can offer a film made up of, e.g., an antiglare layer and a fluorine containing sol-gel film as a low refractive index layer an advantage of enhancing interlayer adhesion force between the antiglare layer and the low refractive index layer by the presence of hydrophilic groups.

(5) Method of Forming Coating Layers on Previously Saponified Triacetyl Cellulose Film After previous saponification of a triacetyl cellulose film by immersion in an alkaline solution, a coating layer may be formed on one side of the film directly or via another layer. In the saponification by immersion in an alkaline solution, there sometimes occurs deterioration in interlayer adhesion between a coating layer to be formed and the triacetyl cellulose film surface made hydrophilic by saponification. Such a deterioration problem can be countered by removing the hydrophilic surface from only the saponified film surface to be provided with a coating layer by corona discharge or glow discharge treatment, and then forming the coating layer. When a layer to be coated has hydrophilic groups, good interlayer adhesion may be produced.

4-(8) Making of Polarizing Plate

The present film can be used as a protective film provided on one side or both sides of a polarizer, and made into a polarizing plate.

Although the present film is used as a protective film provided on one side and a currently used cellulose acetate film may be used as a protective film provided on the other side, it is preferable to use a specific cellulose acetate film formed by the solvent cast method described hereinbefore, and besides, stretched at a magnification of 10 to 100% in the direction of the width in the form of roll film.

Alternatively, it is favorable that the polarizing plate has the present antiglare antireflective film on one side and, as its protective film on the other side, an optical compensation film having an optically anisotropic layer made up of a liquid crystalline compound. Further, the optical compensation film may be coated with a pressure-sensitive adhesive layer, and bonded to the polarizing plate according to the invention via this layer, thereby forming a composite polarizing plate.

The optically anisotropic layer is preferably a layer in which the alignment of liquid crystal compound molecules are fixed, and far preferably a layer made up of a compound having a discotic structural unit. Examples of a discotic liquid crystal compound forming such a structural unit include the compounds described in a voluminous literature, such as C. Destrade et al., *Mol. Cryst. Liq. Cryst.*, vol. 71, p. 111 (1981); *Kikan Kagaku Sosetsu* (Quarterly Review of Chemistry, edited by The Chemical Society of Japan), No. 22 (entitled "Chemistry of Liquid Crystal"), chap. 5 and chap. 10, par. 2 (1994); B. Kohne et al., *Angew. Chem. Soc. Chem. Comm.*, p. 1794 (1985); and J. Zhang et al., *J. Am. Chem. Soc.*, vol. 116, p. 2655 (1994).

It is most appropriate that discotic liquid crystalline molecules be in a state of being fixed via polymerization reaction. Descriptions about polymerization of discotic liquid crystalline molecules can be found in JP-A-8-27284. For fixation of discotic liquid crystalline molecules by polymerization, it is required to combine polymerizable groups as substituents with discotic cores of the discotic liquid crystalline molecules. However, direct binding of polymerizable groups to each discotic core makes it difficult to keep the aligned state during the polymerization reaction. This being the case, linkage groups are introduced between the discotic core and polymerizable groups. Such discotic liquid crystalline molecules having polymerizable groups are disclosed in JP-A-2001-4387.

As polarizers, there are known an iodine polarizer, a dye polarizer using a dichroic dye and a polyene polarizer. The iodine polarizer and the dye polarizer are generally formed using polyvinyl alcohol film.

The retardation axis of the transparent substrate of the antireflective film, the retardation axis of cellulose acetate film and the transmission axis of the polarizer are placed so as to be substantially parallel to one another.

Moisture permeability of a protective film is important for productivity of a polarizing plate. The polarizer and the protective film are bonded together by use of an aqueous-based adhesive, and this adhesive is dried through diffusion into the protective film. So the higher the moisture permeability of the protective film, the faster the drying and the higher the productivity. However, too high moisture permeability allows entering of moisture into the polarizer depending on the use environment (a humid environment) of a liquid crystal display to result in lowering of polarizing power.

The moisture permeability of a protective film is determined by the thickness of a transparent substrate or a polymer film (and a polymerizable liquid crystalline compound), the free volume and the hydrophile-lipophile balance.

When the present film is used as the protective film of a polarizing plate, its moisture permeability is preferably from 100 to 1,000 g/m²·24 hrs, far preferably from 300 to 700 g/m²·24 hrs.

The thickness of the transparent substrate can be adjusted by controlling the lip flow and the line speed, or stretch and compression. Since the moisture permeability differs according to the main material used, it can be adjusted to an appropriate range by thickness control.

The hydrophile-lipophile balance of the transparent substrate can be adjusted by use of additives. The moisture permeability can be made high by addition of hydrophilic additives to the free volume, while it can be made low by addition of hydrophobic additives to the free volume.

By independent control of the moisture permeability, it becomes possible to make polarizing plates having optical compensation power at a low price with high productivity.

The polarizer may be any of known polarizers, or may be a polarizer cut from a long length of polarizer whose absorption axis is neither parallel nor perpendicular to the direction of the length. The polarizer whose absorption axis is neither parallel nor perpendicular to the direction of the length is formed in the following manner.

Specifically, such a polarizer can be formed by stretching a continuously fed polymer film under a tension while holding both edges thereof with holding tools. Herein, the polymer film is stretched to 1.1 to 20.0 times its original dimension in at least the width direction. Further, the longitudinally traveling speed difference between the film-edge holding tools is controlled to within 3%, and the traveling direction of the film is bend as the film edges are held with the holding tools so that the film traveling direction at the exit from the film edge holding process tilts 20 to 70 degrees toward the substantial stretch direction of the film. The 45° tilt of the film traveling direction is especially favorable from the viewpoint of productivity.

Detailed description of the polymer film stretching method can be found in JP-A-2002-86554, paragraphs [0020] to [0030].

As mentioned above, it is also favorable that one of two protective films of a polarizer, other than the antiglare antireflective film, is an optical compensation film having an optical compensation layer including an optically anisotropic layer. The optical compensation film (retardation film) can improve viewing-angle characteristics of a liquid crystal display screen.

Although known optical compensation films can be used herein, the optical compensation films disclosed in JP-A-2001-100042 are preferred in point of viewing angle extension.

6. Usage Pattern of the Invention

The present film can be used in image display apparatus, such as a liquid crystal display (LCD), a plasma display panel (PDP), an electroluminescent display (ELD) and a cathode ray tube display (CRT). An optical filter according to the invention can be used on a known display, such as a plasma display panel (PDP) or a cathode ray tube display (CRT).

6-(1) Liquid Crystal Display

The present film and polarizing plate can be used to advantage in a image display apparatus including a liquid crystal display, and preferably used at the topmost position of the display.

A liquid crystal display has a liquid crystal cell and two polarizing plates disposed on both sides of the liquid crystal cell. The liquid crystal cell holds a liquid crystal between two electrode substrates. Further, an optically anisotropic layer is arranged between the liquid crystal cell and one of the polarizing plates or, in some cases, two optically anisotropic layers are arranged between the liquid crystal cell and the two polarizing plates each.

The crystal cells to which the invention is applied are preferably a TN-mode crystal cell, a VA-mode crystal cell, an OCB-mode crystal cell, an IPS-mode crystal cell and an ECB-mode crystal cell.

<TN Mode>

In a TN-mode liquid crystal cell, rod-shape liquid crystalline molecules are aligned in a substantially horizontal direction, and that in a state of being twisted by 60 to 120 degrees, when no voltage is applied thereto. TN-mode crystal cells are prevailingly utilized for color TFT liquid crystal displays and described in an abundant technical literature.

<VA Mode>

In a VA-mode liquid crystal cell, rod-shaped liquid crystalline molecules are aligned in a substantially vertical direction when no voltage is applied.

Examples of a VA-mode liquid crystal cell include (1) a strict sense of VA-mode liquid crystal cell in which rod-shaped liquid crystalline molecules are aligned in a substantially vertical direction when no voltage is applied thereto, but they are forced to align in a substantially horizontal direction by application of a voltage thereto (as disclosed in JP-A-2-176625), (2) a multidomain VA-mode (MVA-mode) liquid crystal cell which ensures viewing angle extension (as described in *SID* 97 Digest of Tech. Papers (preprints) 28, p. 845(1997)), (3) an n-ASM-mode liquid crystal cell in which rod-shaped liquid crystalline molecules are aligned in a substantially vertical direction when no voltage is applied thereto, but they are brought into a twisted multidomain alignment by application of a voltage thereto (as described in preprints of Nippon Ekisho Toronkai (Symposium on Liquid Crystal), pp. 58-59 (1998)), and (4) a SURVAIVAL-mode liquid crystal cell (announced at LCD International 98).

<OCB Mode>

OCB-mode liquid crystal cells are liquid crystal cells of a bend alignment mode in which rod-shape liquid crystalline molecules in the upper part of a liquid crystal cell and those in the lower part are forced to align (symmetrically) in substantially opposite directions, and they are disclosed in U.S. Pat. Nos. 4,583,825 and 5,410,422. Since the rod-like liquid crystal molecules are symmetrically aligned in an upper part and a lower part of the liquid crystal cell, the bend alignment mode liquid crystal cell has an optically self-compensation function. Therefore, this liquid crystal mode is referred to as an OCB (Optically Compensatory Bend) liquid crystal mode. The liquid crystal display of the bend alignment mode has an advantage of high response speed.

<IPS Mode>

An IPS-mode liquid crystal cell adopts a mode of switching by application of a lateral electric field to a nematic liquid crystal, and details thereof are described in *Proc. IDRC* (Asia Display '95), pp. 577-580 and pp. 707-710.

<ECB Mode>

In a ECB-mode liquid crystal cell, rod-shape liquid crystalline molecules are aligned in a substantially horizontal direction. The ECB mode is one of liquid crystal display modes having the most simple structures, and described, e.g., in JP-A-5-203946.

The following is a liquid crystal display in which the present film and polarizing plate can be used to particular advantage.

The liquid crystal display includes at least a polarizing plate, a liquid crystal cell for display and a backlight, and has a maximum brightness of 300 cd/m$^2$ or above. Its darkroom contrast ratio in white/black display is 500 or above in the direction of the normal to the liquid crystal cell, 150 or above in the area covering angles up to 30 degrees from the normal, and 15 or above in the area covering angles up to 60 degrees from the normal.

Although the present film and polarizing plate can be applied to any of displays including those described below, the application of the present film and polarizing plate to the foregoing display in particular, which has high brightness, a high contrast ratio and a wide viewing angle, can provide reinforced and highly modulated black images on the screen and therefore shows white blue even by slight intrusion of extraneous light, can fully achieve the effects of the invention because the present film and polarizing plate can control appropriately the scattering and reflection of extraneous light.

5-(2) Displays other than Liquid Crystal Display

<PDP>

A plasma display panel (PDP) is generally made up of a gas, glass substrates, electrodes, an electrode lead material, a thick-film print material and fluorescent substances. The glass substrates are a front glass substrate and a rear glass substrate. Each glass substrate is provided with an electrode and an insulation layer. The rear glass substrate is further provided with fluorescent-substance layers. These two glass substrates are assembled, and a gas is sealed into a space between them.

Plasma display panels are already commercially available. Descriptions thereof can be found in JP-A-5-205643 and JP-A-9-306366.

In some cases, a front plate is placed in front of a plasma display panel. It is appropriate that the front plate be strong enough to protect the plasma display panel. The front plate can be used in a state that there is a clearance between the front plate and the plasma display panel, or in a state that the front plate is bonded directly to the plasma display panel itself.

In image displays including a plasma display panel, an optical filter can be stacked directly on the display surface. When a front plate is provided in front of the display, the optical filter may be stacked on either the front side (outside) or rear side (display side) of the front plate.

<Touch Panel>

The present film can be applied to touch panels as disclosed in JP-A-5-127822 and JP-A-2002-48913.

<Organic Electroluminescent Device>

The present film can be used as a substrate (base film) and a protective film of an organic electroluminescent device.

When the present film is used in an organic electroluminescent device, the descriptions in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617 and JP-A-2002-056876 are applicable. Further, it is preferable that the descriptions in JP-A-2001-148291, JP-A-2001-221916 *and JP-A*-2001-231443 can also be used in combination with those cited above.

6. Various Characteristic Values

Various methods of measurements and suitable characteristic values, other than those mentioned above, relating to the invention are described below.

6-(1) Reflectivity

Specular reflectivity and hue measurements are made by use of a spectrophotometer V-550 (made by JASO Corporation) to which an adaptor ARV-474 was fitted. Specular reflectivities of light incident on each sample film surface at an incident angle of 5 degrees were measured at an outgoing angle of −5 degrees over the wavelength range of 380 nm to 780 nm, and from which the average reflectivity in the 450- to 650-nm range was calculated, thereby evaluating antireflectivity of each sample.

6-(2) Hue

Hue of the present polarizing plate having antireflective quality can be evaluated by directing light with wavelengths of 380 nm to 780 nm from a CIE standard light source D65 onto the polarizing plate surface at an incident angle of 5 degrees and determining the hue of regularly reflected light, namely L*, a* and b* values in the CIE1976 L*a*b* color space. The L*, a* and b* values are preferably within the ranges $3 \leq L^* \leq 20$, $-7 \leq a^* \leq 7$ and $-10 \leq b^* \leq 10$, respectively. By adjusting to these ranges, the reflected light can be reduced in reddish violet to bluish violet hues which are problems of polarizing plates currently in use. These hues can be reduced significantly by adjustments to the ranges $3 \leq L^* \leq 10$, $0 \leq a^* \leq 5$ and $-7 \leq b^* \leq 0$, respectively. When the thus adjusted polarizing plate is applied in a liquid crystal display, the hues in a case where extraneous high-intensity light, such as a fluorescent lamp, is slightly reflected become neutral and inconspicuous. More specifically, those adjustments are appropriate because too intense reddish tint does not develop so long as a* is 7 or below, while too intense cyan tint does not develop so long as a* is −7 or above, and besides, too intense bluish tint does not develop so long as b* is −7 or above, while too intense yellowish tint does not develop so long as b* is 0 or below.

Further, the hue uniformity of reflected light can be determined as change rates of hues from a*b* on the L*a*b* chromaticity diagram drawn on the basis of a 380- to 680-nm portion of reflection spectrum of reflected light in accordance with the following mathematical expression (21).

Change rate of hue $(a^*) = \{(a^*_{max} - a^*_{min})/a^*_{av}\} \times 100$

Change rate of hue $(b^*) = \{(b^*_{max} - b^*_{min})/b^*_{av}\} \times 100$  Expression (21):

Herein, $a^*_{max}$ and $a^*_{min}$ are maximum and minimum of a* value, respectively; $b^*_{max}$ and $b^*_{min}$ are maximum and minimum of b* value, respectively; and $a^*_{av}$ and $b^*_{av}$ are average of a* value and b* value, respectively. Each of the change rates of hues is preferably 30% or below, far preferably 20% or below, especially preferably 8% or below.

Further, it is advantageous for the present film to reduce a difference between hues before and after a weather-resistance test ΔEw to 15 or below, preferably 10 or below, particularly preferably 5 or below. In such a range, both low reflection and reduction in hues of reflected light can be attained. Therefore, application of the present film to the topmost surface of an image display is favorable because the hues in a case where extraneous high-intensity light, such as a fluorescent lamp, is slightly reflected are made neutral and the quality of display images is enhanced.

The difference between hues ΔEw can be determined in accordance with the following mathematical expression (22).

$$\Delta Ew = [(\Delta Lw)^2 + (\Delta aw)^2 + (\Delta bw)^2]^{1/2}$$  Expression (22)

Herein, ΔLw, Δaw and Δbw are differences in L* values, a* values and b* values, respectively, between before and after weather-resistance test.

6-(3) Transmission Image Sharpness

The transmission image sharpness can be measured with an image clarity measuring device (Model ICM-2D, made by Suga Test Instrument Co., Ltd.) wherein an optical comb having a slit width of 0.5 mm is used in accordance with JIS K7105.

It is preferable that the transmission image sharpness of the present film is 60% or above. The transmission image sharpness is generally an indicator showing a blurred condition of images projected via passage through a film. The greater this value, the sharper and the better the images viewed through the film.

6-(4) Surface Roughness

Measurements of surface roughness parameters, including center-line average roughness (Ra), can be made in accordance with JIS-B0601.

As to the geometry of asperities on the surface of the present film, it is favorable from the viewpoint of attaining sufficient antiglare quality and a uniform matte feeling under visual observation to design the present film so that the center-line average roughness Ra is from 0.08 to 0.30 μm, the ten-point average roughness Rz is at most 10 times the Ra value, the average peak-to-valley distance Sm is from 1 to 100 μm, the standard deviation of salient heights measured from the deepest recess is 0.5 μm or below and the standard deviation of the average peak-to-valley distance Sm with reference to the center line is 20 μm or below. When Ra is below 0.08, sufficient antiglare quality cannot be achieved; while, when Ra is increased beyond 0.30, there occur problems of glare and white blur by extraneous light reflected off the display surface.

6-(5) Haze

The haze of the present film refers to the haze value defined in JIS-K7105, and the value used herein is a value obtained by automatic meter reading as haze=(diffused light/total transmitted light)×100 measured with a turbidimeter, NDH-1001DP made by Nippon Denshoku, on the basis of the measurement method specified in JIS-K7361-1.

The haze arising from internal scattering (referred to as internal haze hereinafter) as one of optical properties of the present antiglare antireflective film is preferably from 3% to 35%, far preferably from 0% to 10%, especially preferably from 0% to 5%. On the other hand, the haze arising from surface scattering (referred to as surface haze hereinafter) is preferable from 2% to 15%, far preferably from 5% to 10%.

The internal haze can be measured, e.g., by eliminating the scattering by surface asperities from a medium having substantially the same refractive index as the film surface. The surface haze can be determined as a value given by subtraction of the internal haze from the total haze of the film.

6-(6) Goniophotometer Scattered Light Intensity Ratio

An antireflective film is placed vertically to incident light, and the all-directional scattered light profile thereof is measured with an automatic variable-angle photometer (Goniophotometer GP-5, made by Murakami Color Research Laboratory Co., Ltd.). The scattered light intensity ratio is determined as the intensity of light with an outgoing angle of 30 degrees relative to the intensity of light with an outgoing angle of 0 degree.

6-(7) Scratch Resistance

<Steel Wool Scratch Resistance Evaluation>

Results of a rubbing test carried out using a rubbing tester under the following conditions can be used as an indication of scratch resistance.

Environmental conditions for evaluation: 25° C., 60% RH
Rubbing material: Steel wool (Nippon Steel Wool K.K., grade No. 0000) wound around the rubbing tip (1 cm×1 cm) of a tester brought into contact with a sample and fastened with a band.
Range of motion (each way): 13 cm
Rubbing speed: 13 cm/sec
Load: 500 g/cm² and 200 g/cm²
Tip contact area: 1 cm×1 cm
Number of rubbings: 10 reciprocations After the rubbing of a sample is finished, the back of the sample is coated with oil-based black ink, and scratch resistance is evaluated by visual observation of light reflected from scratches on the rubbed area and a difference in reflected light quantity between the rubbed area and areas other than the rubbed area.

<Scrub Eraser Scratch Resistance Evaluation>

Results of a rubbing test carried out using a rubbing tester under the following conditions can be used as an indication of scratch resistance.

Environmental conditions for evaluation: 25° C., 60% RH
Rubbing material: A plastic eraser (MONO, made by Tombow Pencil Co., Ltd.) fixed to the rubbing tip (1 cm×1 cm) of a tester brought into contact with a sample
Range of motion (each way): 4 cm
Rubbing speed: 2 cm/sec
Load: 500 g/cm²
Tip contact area: 1 cm×1 cm
Number of rubbings: 100 reciprocations After the rubbing of a sample is finished, the back of the sample is coated with oil-based black ink, and scratch resistance is evaluated by visual observation of light reflected from scratches on the rubbed area and a difference in reflected light quantity between the rubbed area and areas other than the rubbed area.

<Taber Test>

Scratch resistance can also be evaluated from an abrasion loss determined from sample pieces after and before the Taber test performed in compliance with JIS K5400.

The smaller he abrasion loss, the better the scratch resistance.

6-(8) Hardness

<Pencil Hardness>

The strength of the present film can be evaluated by the pencil hardness test adhering to JIS-K5400.

The pencil hardness is preferably at least H, far preferably at least 2H, especially preferably at least 3H.

<Surface Elasticity Modulus>

The surface elasticity modulus in the invention is a value measured with a microscopic surface hardness tester (FISCHERSCOPE H100VP-HCU, made by Fischer Instruments). More specifically, an indentation depth is measured under such a moderate test load as to effect a depth of below 1 μm by use of a diamond-made square pyramid indenter (tip face angle: 136°), and the elasticity modulus is determined from the load-free indenter weight and a change in displacement.

Further, the surface hardness can also be determined as universal hardness by use of the microscopic surface hardness tester. The universal hardness is a value obtained by dividing a test load, under which the indentation depth of a square pyramid indenter is measured, by the surface area of indentation calculated from a geometric form of indentation made by the test load. It is known that there is a positive correlation between the surface electricity modulus and the universal hardness.

The universal hardness of a cross-linked polymer as defined in the invention is represented by a universal hardness (N/mm$^2$) of the cross-linked polymer film having a thickness of about 20 μm to about 30 μm formed and hardened on a glass plate, which is determined by using a micro hardness tester H100 made by Fischer Instruments in the following measurement procedure.

A coating solution containing a cross-linkable polymer and other required ingredients including a catalyst, a cross-linking agent and a polymerization initiator in a solids concentration of about 25% is coated on a polished slide glass (26 mm×76 mm×1.2 mm) made by Toshinriko Co., Ltd. by use of a properly chosen bar coater so as to have a thickness of about 20 μm to about 30 μm after curing. When the cross-linkable polymer is a thermosetting polymer, thermosetting conditions for performing sufficient cure of the film are evaluated in advance (e.g., 125° C. and 10 min.). Likewise, when the cross-linkable polymer is an ionizing radiation curable polymer, curing conditions for performing sufficient cure of the film are evaluated in advance (e.g., oxygen concentration of 12 ppm and UV exposure of 750 mJ/cm$^2$). While increasing a load continuously from 0 to 4 mN, a circular cone diamond indenter is pressed in each film to a depth of 1/10 the film thickness at the maximum, which corresponds to the region undergoing no influence by hardness of the glass plate as a base material. Herein, indentation areas A (mm$^2$) against various loads F are determined, and the universal hardness is calculated from the measurement average F/A at N=6.

In addition, the surface hardness can be determined by the nanoindentation described in JP-A-2004-354828. In this case, the hardness is preferably from 2 GPa to 4 GPa, and the nanoindentation elasticity modulus is preferably from 10 GPa to 30 GPa.

6-(9) Soil Resistance Test

<Magic Marker Wipe-Off Test>

A film is fixed to a glass surface by means of an adhesive, a triple turn of circle 5 mm in diameter is drawn on the film with the nip of a black magic marker (Macky Gokuboso, trade name, made by Zebra Co., Ltd.) under conditions of 25° C. and 60% RH, and after a lapse of 5 seconds the black magic marker is wiped off by shuttling Bemcot (trade name, a product of Asahi Kasei Corporation) folded into 10 layers to and fro for 20 times while imposing such a load as to make a dent on the bunch of Bemcot. The write and wipe operations are repeated under the same conditions until the magic marker mark cannot be erased by the wipe. The soil resistance can be evaluated by the number of wipe operations enabling wipe of the mark.

The number of wipe operations repeated until the mark cannot be erased is preferably at least 5, far preferably at least 10.

Alternatively, the soil resistance can also be evaluated by whether or not a 1-cm-dia solid circle drawn on a film with a superfine black magic marker No. 700 (M700-T1 black) and allowed to stand for 24 hours is wiped off by rubbing with Bemcot (made by Asahi Kasei Corporation).

6-(10) Surface Tension

As to the surface tension measure and evaluated in the invention, the surface tension of a coating solution for forming a functional layer can be measured with a surface tensiometer (KYOWA CBVP SURFACE TENSIOMETER, made by Kyowa Interface Science Co., Ltd.) at a temperature of 25° C.

6-(11) Contact Angle

A contact angle meter (a contact angle meter CA-X made by Kyowa Interface Science Co., Ltd.) is used in the dry atmosphere (20° C., 65% RH), and purified water is used as liquid. A 1.0-mm-dia drop of water is made on the tip of stylus and brought into contact with a film surface, and this drop is transferred to the film surface. The contact angle is defined as the angle that the line tangent to the liquid surface at a film-liquid contact point forms with the film surface on the side including the liquid.

6-(12) Surface Free Energy

The surface energy can be determined by a contact angle method, a wetting heat method or an adsorption method, as described in Nure no Kiso to Oyo (which might be translated "Fundamentals and Applications of Wettability"), Realize Inc. (Dec. 12, 1989). In the case of the present film, a contact angle method is preferably applied.

More specifically, two kinds of solutions whose surface energies are known are used, and a drop of each solution is put on a film. The surface free energy of the film can be calculated from contact angles which are each defined as the angle that the line tangent to each individual solution drop at an intersection of the film surface and the solution drop surface forms with the film surface on the side including the solution drop.

The surface free energy ($\gamma s^v$, expressed in the unit mN/m) of the present film represents the surface tension of an antireflective film that is defined as the sum of $\gamma s^d$ and $\gamma s^h$, namely $\gamma s^v = \gamma s^d + \gamma s^h$, wherein $\gamma s^d$ and $\gamma s^h$ are values determined from the following simultaneous equations a and b relating respectively to the contact angles $\theta H_2O$ and $\theta CH_2I_2$ of purified water $H_2O$ and methylene iodide $CH_2I_2$ on the antireflective film. These contact angles are determined experimentally by reference to D. K. Owens, J. Appl. Polym. Sci., 13, 1741 (1969). The smaller the value $\gamma s^v$, or the lower the surface free energy, the higher the repellency of the surface, or the higher soil resistance the film surface generally can have.

$$1+\cos\theta H_2O = 2(\gamma s^d)^{1/2}(\gamma H_2O^d/\gamma H_2O^v)^{1/2} + 2(\gamma s^h)^{1/2}(\gamma H_2O^h/\gamma H_2O^v)^{1/2} \quad \text{a.}$$

$$1+\cos\theta CH_2I_2 = 2(\gamma s^d)^{1/2}(\gamma CH_2I_2{}^d/\gamma CH_2I_2{}^v)^{1/2} + 2(\gamma s^h)^{1/2}(\gamma CH_2I_2{}^h/\gamma CH_2I_2{}^v)^{1/2} \quad \text{b.}$$

In the above equations, $\gamma H_2O^d$ is 21.8, $\gamma H_2O^h$ is 51.0, $\gamma H_2O^v$ is 72.8, $\gamma CH_2I_2{}^d$ is 49.5, $\gamma CH_2I_2{}^h$ is 1.3, and $\gamma CH_2I_2{}^v$ is 50.8.

Each of the contact angles is measured with an automatic contact angle meter CA-V150 made by Kyowa Interface Science Co., Ltd. in the following manner: After a film undergoes moisture control for at least 24 hours under conditions of 25° C. and 60% RH, a 2 μ of liquid drop is put on the film and, after a lapse of 30 seconds, the contact angle thereof is measured.

The surface free energy of the present film is preferably 25 mN/m or below, particularly preferably 20 mN/m or below.

6-(13) Curl

Curl measurements are carried out using a template for curl measurement defined by Method A of "Curl Measurement Methods for Photographic Films" in JIS-K7619-1988.

The measurements are performed under conditions that the temperature is 25° C., the relative humidity is 60% and the moisture control time is 10 hours.

The curl values of films in the invention fall within the range of preferably −15 to +15, far preferably −12 to +12, further preferably −10 to +10, when represented by the following mathematical expression. Herein, the direction of in-sample curl measurement is a transport direction of a base material when the coating is carried out in the web form.

$$\text{Curl} = 1/R \quad (R: \text{radius of curvature measured in meters}) \quad \text{(Mathematical Expression)}$$

The curl is an important characteristic to be considered in avoiding cracking and delamination during the manufacture, processing and market handling of films. It is preferable that the curl value is within the foregoing range and small.

Herein, the curl of a positive value signifies a curl that the coated side of a film falls on the inside of the curvature, and the curl of a negative value signifies a curl that the coated side of a film falls on the outside of the curvature.

Further, curl values are determined in accordance with the foregoing curl measurement method under the same conditions, except that the relative humidity is changed to 80% and 10%, respectively. The absolute value of a difference between each of the curl values under these humidity conditions and the foregoing one is preferably from 24 to 0, far preferably from 15 to 0, especially preferably from 8 to 0. This is a characteristic relating to the handling quality, delamination and cracking in cases where the film is stacked under various humidity conditions.

6-(14) Adhesion Evaluation

Adhesion between layers in a film or adhesion between a substrate and a coating layer can be evaluated in the following manner.

A film surface on the coating layer side is cut with a cutter knife in a grid pattern having 100 squares formed from 11 lines running vertically and 11 lines running transversely in 1 mm intervals, and a polyester adhesive tape (No. 31B made by Nitto Denko Corporation) is pressed against the surface and allowed to stand for 24 hours. Thereafter, the tape is peeled off. This operation is repeated 3 times on the same place, and then whether any of the squares are peeled off or not is checked by visual observation.

Among the 100 squares, the number of squares peeled off is preferably smaller than 10, far preferably smaller than 2.

6-(15) Brittleness Test (Cracking Resistance)

Cracking resistance is an important characteristic to be considered in preventing flaws from developing on a film during the coating of constituent layers, processing and cutting of the film, application of a pressure-sensitive adhesive to the film, and handling of the film for, e.g., lamination with various kinds of substances.

A sample film is cut to the size of 35 mm×140 mm, and allowed to stand for 24 hours under conditions of 25° C. and 60% RH. Thereafter, while rolling up the cut film in a cylindrical form, the diameter of curvature at which cracks begin to develop is examined, and thereby the cracking resistance of the film surface can be evaluated.

As to the cracking resistance of the present film, it is appropriate that, when the film is rolled up with the coating layer side outward, the diameter of curvature at which cracks begin to develop is 50 mm or below, preferably 40 mm or below, especially preferably 30 mm or below. As to the cracks in the edge portions of the film, it is preferable that no crack develops or the average crack length is shorter than 1 mm.

6-(17) Dust Rejection Capability

The present film is stuck to a monitor, and dust (lint of bedding or cloth) is sprinkled on the monitor surface. Then, the dust is wiped off with cleaning cloth. By doing so, the dust rejection capability of the film can be evaluated.

It is preferable that the dust is completely eliminated by wiping 6 times, and it is preferable by far that the dust is completely eliminated by wiping within 3 times.

6-(18) Performance of Liquid Crystal Display

Quality evaluation methods and suitable conditions in a situation that the present film is used on a display are described below.

The viewing-side polarizing plate mounted in a liquid crystal display is peeled away, and in place of this plate the present film or polarizing plate is stacked via an adhesive so that the coating surface thereof is situated on the viewing side and the transmission axis of the present polarizing plate matches up with that of the polarizing plate mounted before in the display product. The resulting liquid crystal display is placed in a 500-lux lighted room, and brought into a black-state display. In this state, the following qualities can be evaluated by visual observations from various viewing angles.

Examples of a commercially available liquid crystal display used for the evaluations on the present film include TN-mode liquid crystal displays, Syncmaster172X made by Samsung, MDT191S made by Mitsubishi Electric Corporation and TH-15TA2 made by Matsushita Electric Industrial Co., Ltd.; a VA-mode liquid crystal display, LC15S4 made by Sharp Corporation; an IPS-mode liquid crystal display, TH32LX-500 made by Matsushita Electric Industrial Co., Ltd.; and an OCB-mode liquid crystal display, VT23XD1 made by EIZO Nanao Corporation.

<Unevenness and Hue Evaluations of Images>

By use of a liquid crystal display made in the foregoing manner, unevenness and hue changes in black-state display are evaluated by visual observations of more than one observer.

It is preferable that at most 3 persons, especially no person, among 10 persons perceive unevenness, lateral change in hue, hue change by temperature and humidity, and white blur.

In addition, reflection of extraneous light is examined by use of a fluorescent lamp, and changes in reflection can be evaluated relatively by visual observations.

<Light Leak in Black-state Display>

In the black-state display, light leak rates in the azimuth direction of 45 degrees from the front of a liquid crystal display and in the polar angle direction of 70 degrees are measured. These light leak rates are preferably 0.4% or below, far preferably 0.1% or below.

<Contrast and Viewing Angle>

As to the contrast and the viewing angle, contrast ratios and a viewing angle (the width of an angle range providing contrast ratios greater than 10) in the lateral direction (the direction orthogonal to the rubbing direction of a cell) can be examined with a measuring device (EZ-Contrast 160D, made by ELDIM SA).

The invention will now be illustrated in detail by reference to the following examples, but these examples should not be construed as limiting the scope of the invention in any way. Additionally, all parts and % in the following examples are by mass unless otherwise indicated.

(Synthesis of Perfluoroolefin Copolymer (1))

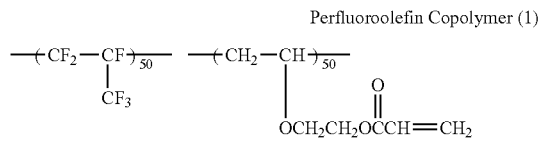

Perfluoroolefin Copolymer (1)

(ratio of 50:50 is by mole)

In a 100-ml capacity stainless autoclave equipped with a stirrer, 40 ml of ethyl acetate, 14.7 g of hydroxyethyl vinyl ether and 0.55 g of dilauroyl peroxide were placed. The air in the autoclave was evacuated and replaced with nitrogen gas. Hexafluoropropylene (HFP) in an amount of 25 g was further introduced to the autoclave, and the temperature inside the autoclave was raised up to 65° C. The pressure at the time when the temperature inside the autoclave reached 65° C. was 0.53 MPa (5.4 kg/cm$^2$). In this reaction system, reaction was continued for 8 hours as the temperature was kept at 65° C., and the heating was stopped at the time when the pressure reached 0.31 MPa (3.2 kg/cm$^2$). The resultant reaction system was cooled down by dissipating heat into the atmosphere. When the interior temperature dropped to room temperature, the monomers remaining unreacted were expelled, and the autoclave was opened and the reaction solution was taken out. The reaction solution obtained was poured into a large excess of hexane, and a polymer thus deposited was taken by decanting the solvent. This polymer is dissolved in a small amount of ethyl acetate, and reprecipitated twice from hexane to result in complete elimination of residual monomers. After drying, the polymer was obtained in an amount of 28 g. A 20 g portion of this polymer was dissolved in 100 ml of N,N-dimethylacetamide, and thereto 11.4 g of acrylic acid chloride was added dropwise under cooling in an ice bath, and then stirred for 10 hours at room temperature. This reaction solution was mixed with ethyl acetate, and washed with water. The organic layer was extracted from the thus treated solution, and concentrated. The polymer obtained was reprecipitated from hexane to yield 19 g of perfluoroolefin copolymer (1). The refractive index of the thus obtained polymer was found to be 1.421.

(Preparation of Sol (a))

In a reaction vessel equipped with a stirrer and a reflux condenser, 120 parts of methyl ethyl ketone, 100 parts of acryloyloxypropyltrimethoxysilane (KBM-5103, produced by Shin-Etsu Chemical Co., Ltd.) and 3 parts of diisopropoxyaluminum ethylacetoacetate were placed and mixed, and thereto 30 parts of ion exchange water was further added. Therein, reaction was continued for 4 hours at 60° C., and then the reaction solution was cooled to room temperature. Thus, a sol (a) was obtained, and it was found that the mass average molecular weight of this sol was 1,600 and the proportion of components having their molecular weights in the range of 1,000 to 20,000 in the total polymeric components including oligomers was 100%. Further, the gas chromatographic analysis of this sol showed that the acryloyloxypropyltrimethoxysilane used as a starting material didn't remain at all.

(Preparation of Coating Solution A for Antiglare Layer)

A mixture of dipentaerythritol hexaacrylate and dipentaerythritol pentaacrylate (DPHA, produced by Nippon Kayaku Co., Ltd.) in an amount of 31 g was diluted with 38 g of methyl isobutyl ketone. Thereto, 1.5 g of a polymerization initiator (IRGACURE 184, produced by Ciba Specialty Chemicals) was further added, and stirred. Subsequently thereto, 0.04 g of a fluorine-containing surface modifier (FP-149) and 6.2 g of a silane coupling agent (KBM-5130, produced by Shin-Etsu Chemical Co., Ltd.) were added. The refractive index of a coating formed by application and UV curing of this solution was found to be 1.520.

Finally to this solution was added 21.0 g of a 30% cyclohexanone dispersion of cross-linked poly(acrylic-styrene) particles having an average particle diameter of 3.5 μm (copolymerization ratio between monomers=50/50, refractive index=1.540), which was prepared by 20-minute dispersion at 10,000 rpm with a Polytrone dispersing machine. The resulting mixture was taken as the final solution.

This mixture was passed through a polypropylene filter having a pore size of 30 μm. Thus, a coating solution A for an antiglare layer was prepared.

(Preparation of Coating Solution B for Antiglare Layer)

A coating solution B for an antiglare layer was prepared in the same manner as the coating solution A, except that the addition amount of the 30% cyclohexanone dispersion of cross-linked poly(acrylic-styrene) particles was changed to 14.0 g.

(Preparation of Coating Solution C for Antiglare Layer)

A coating solution C for an antiglare layer was prepared in the same manner as the coating solution A, except that the addition amount of the 30% cyclohexanone dispersion of cross-linked poly(acrylic-styrene) particles was changed to 10.0 g.

(Preparation of Coating Solution D for Antiglare Layer)

A coating solution D for an antiglare layer was prepared in the same manner as the coating solution A, except that the addition amount of the 30% cyclohexanone dispersion of cross-linked poly(acrylic-styrene) particles was changed to 17.0 g.

(Preparation of Coating Solution E for Antiglare Layer)

A coating solution E for an antiglare layer was prepared in the same manner as the coating solution A, except that the addition amount of the 30% cyclohexanone dispersion of cross-linked poly(acrylic-styrene) particles was changed to 28.0 g.

(Preparation of Coating Solution F for Antiglare Layer)

A coating solution F for an antiglare layer was prepared in the same manner as the coating solution A, except that the average particle size of the cross-linked poly(acrylic-styrene) particles (copolymerization ratio between monomers=50/50, refractive index=1.540) was changed to 5 μm from 35 μm and the addition amount of these particles was changed to 28.0 g as the 30% cyclohexanone dispersion.

(Preparation of Coating Solution G for Antiglare Layer)

A coating solution G for an antiglare layer was prepared in the same manner as the coating solution A, except that the 30% cyclohexanone dispersion of cross-linked poly(acrylic-styrene) particles having the average particle size of 35 μm was not added.

(Preparation of Coating Solution A for Low Refractive Index Layer)

After 13 g of a heat-crosslinkable fluoropolymer containing polysiloxane and hydroxyl groups and having an refractive index of 1.44 (JTA113, solids concentration: 6%, produced by JSR Corporation) was admixed with 1.3 g of a colloidal silica dispersion MEK-ST-L (trade name, average particle size: 45 nm, solids concentration: 30%, produced by Nissan Chemical Industries, Ltd.), 0.6 g of the sol (a), 5 g of methyl ethyl ketone and 0.6 g of cyclohexanone, and stirred, the resulting admixture was passed through a polypropylene filter having a pore size of 1 μm. Thus, a coating solution A for a low refractive index layer was prepared. The refractive index of a layer formed from this coating solution was found to be 1.45.

(Preparation of Coating Solution B for Low Refractive Index Layer)

A coating solution B for a low refractive index layer was prepared in the same manner, including the addition amounts, as the coating solution A for a low refractive index layer, except that 1.95 g of a hollow silica sol (refractive index: 1.31, average particle size: 60 nm, solids concentration: 20%) was used in place of the silica sol. The refractive index of a layer formed from this coating solution was found to be 1.39.

(Preparation of Coating Solution C for Low Refractive Index Layer)

After 15.2 g of the perfluoroolefin copolymer (1) was admixed with 1.4 g of a silica sol (silica: a product differing in particle diameter from MEK-ST, average particle size: 45 nm, solids concentration: 30%, produced by Nissan Chemical Industries, Ltd.), 0.3 g of a reactive silicone X-22-164B (trade name, produced by Shin-Etsu Chemical Co., Ltd.), 7.3 g of the sol (a), 0.76 g of a photopolymerization initiator (IRGA-CURE 907, trade name, produced by Ciba Specialty Chemicals ), 301 g of methyl ethyl ketone and 9.0 g of cyclohexanone, and stirred, the resulting admixture was passed through a polypropylene filter having a pore size of 5 μm. Thus, a coating solution C for a low refractive index layer was prepared. The refractive index of a layer formed from this coating solution was found to be 1.44.

EXAMPLE 1

(1) Coating of Antiglare Layer

A roll of 80-μm-thick triacetyl cellulose film (TAC-TD80U, produced by Fuji Photo Film Co., Ltd.) was wound off, and thereon the coating solution A for an antiglare layer was coated in accordance with the die coating method specified by the apparatus configuration as shown in FIGS. 5 to 8 and the coating conditions mentioned below. After the solvent was dried, the layer coated was further cured under a nitrogen-purged atmosphere by irradiation with ultraviolet rays from a 160 W/cm air-cooled metallic halide lamp (made by Eyegraphics Co., Ltd.) at an exposure of 90 mJ/cm$^2$, thereby forming a 6-μm-thick antiglare layer having an antiglare quality, and then wound.

Basic conditions: The slot die 13 having an upstream-side lip land length IUP of 0.5 mm, a downstream-side lip land length ILO of 50 μm, a slot mouth 16a length of 150 μm in the web traveling direction and a slot 16 length of 50 mm was used. The gap between the upstream-side lip land 18a and the web W was made 50 μm greater than the gap between the downstream-side lip land 18b and the web W (Hereinafter, this situation was referred to as "overbite length of 50 μm"), and the gap GL between the downstream-side lip land 18b and the web W was adjusted to 50 μm. In addition, the gap Gs between the side plate 40b of the decompression chamber 40 and the web W and the gap GB between the back plate 40a and the web W were both adjusted to 20 μm. In order to suit physical properties of individual coating solutions, the coating operation was carried out at a coating speed of 50 m/min and at a wet coverage of 17 ml/m$^2$, and the coating layer formed was dried for 15 seconds at 30° C. and further for 20 seconds at 90° C. Further, the coating width was adjusted to 1,300 mm, and the effective-coating width was 1,280 mm.

(2) Coating of Low Refractive Index Layer

The triacetyl cellulose film provided with the antiglare layer by application of the coating solution A for antiglare layer use and wound into a roll was wound off again, and on the antiglare layer the coating solution A for low refractive index layer use was coated at a coating speed of 40 m/min and at a wet coverage of 5 ml/m$^2$. The coating layer formed was dried for 150 seconds at 120° C. and further for 8 minutes at 140° C., and then cured under a nitrogen-purged atmosphere having 0.1% of oxygen concentration by irradiation with ultraviolet rays from a 240 W/cm air-cooled metallic halide lamp (made by Eyegraphics Co., Ltd.) at an exposure of 900 mJ/cm$^2$, thereby forming a 100-nm-thick low refractive index layer, and further wound.

(3) Saponification Treatment for Antireflective Film

After formation of the low refractive index layer, the following treatment was given to the sample.

An aqueous solution containing 1.5 mol/l of sodium hydroxide was prepared, and kept at 55° C. An dilute aqueous solution containing 0.01 mol/l of sulfuric acid was prepared, and kept at 35° C. The antireflective film formed was immersed in the aqueous solution of sodium hydroxide for 2 minutes, and then immersed in water to wash out the sodium hydroxide thoroughly. Then, the film was immersed in the dilute aqueous solution of sulfuric acid for 1 minute, and further immersed in water to wash out the dilute sulfuric acid thoroughly. Finally, the sample was fully dried at 120° C.

Thus, an antiglare antireflective film having undergone saponification was made. This film was designated as Example 1F.

Antiglare layers were formed in the same manner as in Example 1F, except that the coating solution A for antiglare layer use was replaced with the coating solutions B and C for antiglare layer use, respectively, and further the low refractive index layer was coated on each of the antiglare layers and subjected to saponification in the same manner as in Example 1F. The thus obtained film having the antiglare layer formed from the coating solution B was designated as Example 2F, and the film having the antiglare layer formed from the coating solution C was designated as Comparative Example 1F.

An antiglare antireflective film was made in the same manner as Example 1F, except that the coating solution A for low refractive index layer use was replaced with the coating solution B for low refractive index layer use. The antiglare antireflective film thus made was designated as Example 3F.

An antiglare antireflective film was made in the same manner as Example 1F, except that the coating solution A for low refractive index layer use was replaced with the coating solution C for low refractive index layer use and the drying condition after coating was changed to 2 minutes at 100° C. The antiglare antireflective film thus made was designated as Example 4F.

An antiglare layer was formed in the same manner as in Example 1F, except that the coating solution A for antiglare layer use was replaced with the coating solution D for antiglare layer use and the wet coverage was changed to 10 ml/m², and further the low refractive index layer was coated on the antiglare layer and subjected to saponification in the same manner as in Example 1F. The thus obtained film was designated as Comparative Example 2F.

An antiglare layer was formed in the same manner as in Example 1F, except that the coating solution A for antiglare layer use was replaced with the coating solution E for antiglare layer use and the wet coverage was changed to 15 ml/m², and further the low refractive index layer was coated on the antiglare layer and subjected to saponification in the same manner as in Example 1F. The thus obtained film was designated as Comparative Example 3F.

An antiglare layer was formed in the same manner as in Example 1F, except that the coating solution A for antiglare layer use was replaced with the coating solution F for antiglare layer use and the wet coverage was changed to 15 ml/m², and further the low refractive index layer was coated on the antiglare layer and subjected to saponification in the same manner as in Example 1F. The thus obtained film was designated as Comparative Example 4F.

An antiglare layer was formed in the same manner as in Example 1F, except that the coating solution A for antiglare layer use was replaced with the coating solution G for antiglare layer use, the wet coverage at the time of the coating of the antiglare layer was changed to 15 ml/m² and the UV exposure was changed to 40 mJ/cm². Then, the coating surface of the antiglare layer formed was brought into close contact with a mold glass surface that was roughened so as to have the desired roughness, and exposed to ultraviolet rays at an exposure of 100 mJ/cm² from the side of the triacetyl cellulose film. Subsequently thereto, the low refractive index layer was coated on the thus treated antiglare layer and subjected to saponification in the same manner as in Example 1F, thereby making an antiglare antireflective film. Herein, three varieties of mold glass differing in surface roughness were prepared, and independently brought into contact with the antiglare layer surface to contribute three different antiglare layers. The thus made three different antiglare antireflective films were designated as Example 5F, Comparative Example 5F and Comparative Example 6F, respectively.

(Evaluation of Antiglare Antireflective Film)

Evaluations of the following items were made on the films thus obtained. Evaluation results are shown in Table 1 and Table 2.

(1) Tilt Angle Distribution Profile

Each of the films obtained was measured with Model SXM520-AS150 made by Micromap Corporation (USA). The light source used herein was a halogen lamp into which an interference filter having its center wavelength at 560 nm was inserted. The object lens used had a power of 10×, and the data was captured by ⅔-inch CCD of 640×480 pixels. By these settings, measurement pitches in the vertical and horizontal directions were both 1.3 micrometers, the measurement unit for the tilt angle was 0.8 square micrometers and the area to be measured became 500,000 square micrometers (0.5 square millimeters).

The tilt angle was calculated from height data on three points as a measurement unit, and from the all measurement data were determined the tilt angle distribution, the proportion of tilt angles of 1° or below and the proportion of tilt angles of 10° or above.

(2) Haze

Total haze (H), internal haze (Hi) and surface haze (Hs) of each of the films obtained were measured in the following manner.

The value of total haze (H) of a film obtained is measured in conformance with JIS-K7136.

A haze measurement of a film obtained is made in a state that the surface haze is removed by placing an adhesive tape (Cellotape, trade name, made by Nichiban Co., Ltd.) on the low refractive index layer surface of the film, and a difference between this measurement value and the adhesive tape's haze value measured separately is calculated as the value of internal haze (Hi).

The value obtained by subtracting the haze value (Hi) calculated in (ii) from the total haze (H) measured in (i) is defined as surface haze (Hs) of the film.

(3) Center-line Average Roughness

The center-line average roughness of a film obtained was determined in conformance with JIS-B0601.

(4) Antiglare Quality

When a louver-free bare fluorescent lamp (8,000 cd/m²) sited in the direction of 45 degrees was reflected by a film obtained, the extent of blur of the reflected image of the lamp viewed from the direction of −45 degree was evaluated in accordance with the following criteria.

No outline of the fluorescent lamp image is perceived at all: Excellent

The outline of the fluorescent lamp image is slightly perceived: Good

The fluorescent lamp image appears blurred, but the outline thereof is perceivable: Fair The fluorescent lamp image appears almost clear: Bad (4) White blur A film obtained was placed on a black acrylic resin board via an adhesive so that it faced the board on the side opposite to the antiglare layer-coated side, and the degree of black appearance of the board (whether the board appears clearly black, or appears grayish due to scattered light) was visually observed under 500-lux bright light. The samples as Examples and Comparative Examples were rated relatively on a 1-to-10 scale (1 being the most whitish appearance and 10 being the black appearance of the acrylic board).

TABLE 1

| Sample No. | Tilt Angle Distribution Profile | | | | Ra (μ/m) | Haze | |
|---|---|---|---|---|---|---|---|
| | Proportion of tilt angles of 1° or below (%) | Proportion of tilt angles of 10° or above (%) | Absolute value of greatest slope that plot of frequency distribution vs. tilt angle has(/°) | Tilt angle giving maximum peak in frequency distribution(°) | | Surface haze (%) | Internal haze (%) |
| Example 1F | 40 | 2.0 | 0.06 | 0.8 | 0.19 | 9.5 | 2.3 |
| Example 2F | 60 | 1.2 | 0.06 | 0.7 | 0.16 | 7.1 | 2.0 |
| Example 3F | 42 | 1.9 | 0.06 | 0.8 | 0.17 | 8.3 | 2.1 |
| Example 4F | 41 | 1.9 | 0.06 | 0.7 | 0.17 | 9.1 | 2.5 |
| Example 5F | 35 | 1.6 | 0.06 | 0.8 | 0.21 | 12 | — |
| Comparative Example 1F | 75 | 0.8 | 0.11 | 0.5 | 0.12 | 4.1 | 1.8 |
| Comparative Example 2F | 40 | 3.5 | 0.06 | 1.2 | 0.26 | 21 | 5.4 |
| Comparative Example 3F | 18 | 4.5 | 0.03 | 1.1 | 0.24 | 38 | 27 |
| Comparative Example 4F | 76 | 0.2 | 0.10 | 0.1 | 0.08 | 4.4 | 3.6 |
| Comparative Example 5F | 11 | 0.9 | 0.24 | 3.0 | 0.47 | 23 | — |
| Comparative Example 6F | 13 | 2.7 | 0.07 | 1.8 | 0.23 | 18 | — |

TABLE 2

| Sample No. | Antiglare Quality | White blur | |
|---|---|---|---|
| Example 1F | Excellent | 8 | |
| Example 2F | Excellent | 9 | |
| Example 3F | Excellent | 9 | |
| Example 4F | Excellent | 8 | |
| Example 5F | Excellent | 8 | |
| Comparative Example 1F | Bad | 9 | |
| Comparative Example 2F | Good | 1 | Considerably whitish in every direction |
| Comparative Example 3F | Good | 3 | Regularly reflected light was dark but white blur continued in a wide range of angles |
| Comparative Example 4F | Fair | 7 | Image remained in blur |
| Comparative Example 5F | Fair | 8 | Image appeared blurred but gave a sense of incongruity |
| Comparative Example 6F | Fair | 6 | Image appeared blurred but shaky |

EXAMPLE 2

(Making of Polarizing Plate)

An 80-μm-thick triacetyl cellulose film (TAC-TD80U, made by Fuji Photo Film Cp., Ltd.) having undergone 2-minute immersion in an aqueous solution containing 1.5 mol/L of NaOH at 55° C., neutralization and washing with water in sequence and each of the antiglare antireflective films made in Example 1 (Example 1F to Example 5F and Comparative Example 1F to Comparative Example 6F, which had already undergone the saponification treatment) were bonded to both sides of a polarizer formed by making polyvinyl alcohol adsorb iodine and stretching the resultant polyvinyl alcohol, and gave protection to the polarizer. The thus made polarizing plates were designated as Example 1P to Example 5P and Comparative Example 1P to Comparative Example 6P, respectively. Incidentally, each antiglare antireflective film was placed so that the triacetyl cellulose film thereof was bonded to the polarizer.

In addition, a polarizing plate was made using the foregoing saponified triacetyl cellulose film as protective films for both sides of the polarizer, and it was designated as Comparative Example 7P.

EXAMPLE 3

(Evaluation of Polarizing Plate)

Part of the viewing-side polarizing plate mounted in a liquid crystal TV (LC20S4, made by Sharp Corporation) was peeled away, and in place of this plate each of the polarizing plates Example 1P to Example 5P and Comparative Example 1P to Comparative Example 6P made in Example 2 was stacked via an adhesive. Incidentally, each antiglare antireflective film was placed so as to form the viewing-side topmost surface of the liquid crystal TV. Evaluations of the following items were made on the displays thus obtained. Evaluation results are shown in Table 3.

(1) Image Blur

A sequence of 25 complex Min-cho type characters ""薔薇"" of ten-point size was displayed in ten lines on a white background of each of the LCD panels. These displayed characters were compared with those displayed on the LCD panel using the polarizing plate having no antiglare quality. The extent of blur of the character outline (image blur) was evaluated in accordance with the following criteria.

Blur is not obtrusive at all and on a desirable level: A

Blue is slightly obtrusive, but on a somewhat-desirable condition: B

Blur is a little obtrusive: C

Blur is conspicuous, and on an undesirable level: F (2) Reflection of Image

A louver-free bare fluorescent lamp (8,000 cd/m$^2$) sited in the direction of 45 degrees was reflected in each screen of the liquid crystal TVs obtained, and the extent of reflection of the lamp in the TV screen when viewed from the direction of −45 degree was evaluated in accordance with the following criteria.

The outline of the fluorescent lamp is not perceived at all, and there is no reflection: A The outline of the fluorescent lamp is slightly perceived, but reflection is negligible: B The fluorescent lamp appears blurred, but there is a little reflection: C There is full reflection of the fluorescent lamp: F (3) White Blur Each of the liquid crystal TVs obtained was placed in a 500 lux-lighted room having a ceiling-mounted fluorescent lamp, and a black display and a display of moving images including low-tone images were made to appear on each individual TV screen. White blur were evaluated on these displays. The degree of black appearance in the case of the black display and whether or not the images were clearly visible or not (light room contrast) in the case of the moving images were visually observed in accordance with the following criteria.

Black display appears black, and moving images are clearly visible: A

Both black display and moving images appear somewhat dull: B

Whitish blue is conspicuous in black display, and moving images are not lucid, too: C Obviously moving images lack inflection: F

TABLE 3

| Polarizing Plate | Image Blur | Reflection of Image | White Blur |
|---|---|---|---|
| Example 1P | A | A | A |
| Example 2P | A | A | A |
| Example 3P | A | A | A |
| Example 4P | A | A | A |
| Example 5P | B | A | B |
| Comparative Example 1P | A | F | B |
| Comparative Example 2P | C | B | F |
| Comparative Example 3P | F | B | F |
| Comparative Example 4P | C | C | C |
| Comparative Example 5P | A | B | C |
| Comparative Example 6P | B | C | B |
| Comparative Example 7P | A | F | A |

The results shown in Table 3 prove the following.

The antiglare antireflective films according to the invention can ensure not only high antiglare quality but also improvement in image blur and white blur when applied in liquid crystal TVs with 20-inch diagonal or bigger screens.

EXAMPLE 4

When, in the polarizing plate mounted on the backlight side of a transmission TN-mode liquid crystal cell (Syncmaster 172X, made by Samsung), plain TAC (TD-80UL, made by Fuji Photo Film Co., Ltd.) was used as a protective film on the backlight side and a viewing angle broadening film (Wide View Film SA 128, made by Fuji Photo Film Co., Ltd.) was used as a protective film on the liquid crystal cell side, while in the polarizing plate mounted on the viewing side the antiglare antireflective film Example 1F was used as the protective film provided at the topmost surface on the viewing side and a viewing angle broadening film (Wide View Film SA 128, made by Fuji Photo Film Co., Ltd.) was used as a protective film on the liquid crystal cell side, the liquid crystal display obtained was able to have very wide viewing angles in both vertical and horizontal directions, extremely excellent visibility and high display quality.

EXAMPLE 5

When, in the polarizing plate mounted on the backlight side of a transmission TN-mode liquid crystal cell (RDT191S, made by Mitsubishi Electric Corporation), plain TAC (TD-80UL, made by Fuji Photo Film Co., Ltd.) was used as a protective film on the backlight side and a viewing angle broadening film (Wide View Film SA 128, made by Fuji Photo Film Co., Ltd.) was used as a protective film on the liquid crystal cell side, while in the polarizing plate mounted on the viewing side the antiglare antireflective film Example 1F was used as the protective film provided at the topmost surface on the viewing side and a viewing angle broadening film (Wide View Film SA 128, made by Fuji Photo Film Co., Ltd.) was used as a protective film on the liquid crystal cell side, the liquid crystal display obtained was able to have very wide viewing angles in both vertical and horizontal directions and ensure high brightness when viewed from the front and a vivid display, and besides, to avoid white blur even in a bright room and have very high contrast even in the dark, extremely excellent visibility and high display quality.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-269877 filed Sep. 16, 2005, the contents of which are incorporated herein by reference.

What is claimed is:

1. An antiglare antireflective film comprising: a transparent substrate; and at least one layer, the antiglare antireflective film having a surface having asperities,
    wherein 15% to 70% of the total asperities are asperities, each having a tilt angle of 1° or below, which a line normal to each asperity profile form with a line normal to the transparent substrate; and at most 3% of the total asperities are asperities, each having the tilt angle of 10° or above.

2. The antiglare antireflective film according to claim 1, wherein when a frequency distribution of the tilt angle is plotted at intervals of 0.1°, the frequency distribution with respect to the tilt angle has an absolute value of a greatest slope of 0.1/degree or below.

3. The antiglare antireflective film according to claim 1, wherein when a frequency distribution of the tilt angles is plotted at intervals of 0.1°, the frequency distribution has a maximum frequency peak between 0.3° and 2.0° of the tilt angle.

4. The antiglare antireflective film according to claim 1, wherein a haze value attributable to scattering inside the antiglare antireflective film is from 0 to 35%, and a haze value attributable to scattering from the surface of the antiglare antireflective film is from 2 to 15%.

5. The antiglare antireflective film according to claim 1, which has a center-line-average surface roughness Ra of 0.08 to 0.30 µm.

6. The antiglare antireflective film according to claim 1, which has a transmission image definition, which conforms to JIS K7105, of 5% to 30% when measured under an optical comb width of 0.5 mm.

7. The antiglare antireflective film according to claim 1, wherein the at least one layer comprises an antiglare layer, the antiglare layer comprising a translucent resin and translucent particles.

8. The antiglare antireflective film according to claim 7, wherein the translucent resin has at least one of acrylate and methacrylate monomers with trifunctionality or more as a main repeating unit, and the translucent particles are particles of a cross-linked copolymer having an acrylic content of 50 to 100 mass %.

9. The antiglare antireflective film according to claim 7, wherein the translucent resin has at least one of acrylate and methacrylate monomers with trifunctionality or more as a main repeating unit, and the translucent particles are particles of a cross-linked acrylic-styrene copolymer having an acrylic content of 50 to less than 100 mass %.

10. A polarizing plate comprising: a polarizer; and two protective films, the polarizer being between the two protective films, wherein at least one of the two protective films is an antiglare antireflective film according to claim 1.

11. The polarizing plate according to claim 10, wherein at least one of the two protective films is an optical compensation film comprising an optically anisotropic layer.

12. The polarizing plate according to claim 10, wherein one of the two protective films is the antiglare antireflective film, and the other of the two protective films is an optical compensation film comprising an optically anisotropic layer in which orientation of a liquid crystalline compound is fixed.

13. The polarizing plate according to claim 10, wherein one of the two protective films is the antiglare antireflective film, and the other of the two protective films is an optical compensation film comprising an optically anisotropic layer on a side opposite to the polarizer, the optically anisotropic layer containing a compound having a discotic structural unit.

14. The polarizing plate comprising an optical compensation film and a polarizing plate which are bonded together via an adhesive layer, wherein the polarizing plate is a polarizing plate according to claim 10.

15. A liquid crystal display comprising a polarizing plate according to claim 10.

16. The liquid crystal display according to claim 15, which comprises: the polarizing plate placed at a viewer-side outermost surface of the liquid crystal display; a liquid crystal cell for display; and a backlight, wherein the liquid crystal display has a maximum brightness of 300 cd/m$^2$ or above and a darkroom contrast ratios of: 500 or above in white and black displays in a normal direction to the liquid crystal cell; 150 or above at an angle from 0° to 30° with respect to the normal direction; and 15 or above at an angle from 0° to 60° with respect to the normal direction.

17. The liquid crystal display according to claim 15, which has a display screen measuring 20 inches or above in diagonal.

* * * * *